US009111423B2

(12) United States Patent
Kitamura et al.

(10) Patent No.: US 9,111,423 B2
(45) Date of Patent: Aug. 18, 2015

(54) GAMING MACHINE CONDUCTING INDICATION EFFECT

(71) Applicants: Universal Entertainment Corporation, Tokyo (JP); Aruze Gaming America, Inc., Las Vegas, NV (US)

(72) Inventors: Kenta Kitamura, Tokyo (JP); Tatsuya Teranishi, Tokyo (JP); Akira Osawa, Tokyo (JP); Kenji Enokido, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 0 days.

(21) Appl. No.: 13/746,391

(22) Filed: Jan. 22, 2013

(65) Prior Publication Data

US 2013/0196737 A1 Aug. 1, 2013

(30) Foreign Application Priority Data

Jan. 27, 2012 (JP) ................................ 2012-015837

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 19/00*** | (2006.01) |
| ***G07F 17/34*** | (2006.01) |
| ***G07F 17/32*** | (2006.01) |

(52) U.S. Cl.
CPC .............. *G07F 17/34* (2013.01); *G07F 17/326* (2013.01)

(58) Field of Classification Search
CPC ...... A63F 13/00; A63F 13/10; G07F 17/3213
USPC .................................................. 463/20; 3/20
See application file for complete search history.

(56) References Cited

U.S. PATENT DOCUMENTS

| | | | | |
|---|---|---|---|---|
| 4,097,048 A | 6/1978 | Poulsen | | |
| 4,508,345 A | 4/1985 | Okada | | |
| 6,306,034 B1 * | 10/2001 | Sakamoto et al. | .............. | 463/20 |
| 7,871,327 B2 | 1/2011 | Walker | | |
| 7,942,733 B2 | 5/2011 | Sakuma | | |
| 2008/0039197 A1 * | 2/2008 | Walker et al. | .................. | 463/30 |
| 2013/0035151 A1 * | 2/2013 | Owen et al. | ..................... | 463/20 |

* cited by examiner

*Primary Examiner* — Milap Shah
*Assistant Examiner* — Jason Pinheiro
(74) *Attorney, Agent, or Firm* — Lexyoume IP Meister, PLLC

(57) ABSTRACT

A gaming machine executes a process of randomly determining symbols to be rearranged on a reel unit. The gaming machine executes a process of determining a combination formed by the symbols. The gaming machine executes a process of selecting from a plurality of choices an indication effect which is executed before the rearrangement of the symbols on the reel unit, based on the determined combination. The gaming machine executes a process of executing the selected indication effect by a notification device.

16 Claims, 64 Drawing Sheets

FIG.25

NORMAL MODE SYMBOL RANDOM DETERMINATION TABLE

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 13 | 2BAR | 16 | 1BAR | 30 | 2BAR | 3 | 1BAR | 23 |
| 1 | BLANK | 9 | BLANK | 10 | BLANK | 7 | BLANK | 14 | BLANK | 10 |
| 2 | RED7 | 9 | RED7 | 5 | RED7 | 6 | RED7 | 34 | RED7 | 9 |
| 3 | BLANK | 9 | BLANK | 9 | BLANK | 7 | BLANK | 15 | BLANK | 10 |
| 4 | 3BAR | 14 | 3BAR | 17 | 3BAR | 28 | 3BAR | 3 | 3BAR | 23 |
| 5 | BLANK | 2 | BLANK | 3 | BLANK | 3 | BLANK | 4 | BLANK | 4 |
| 6 | CHERRY | 1 | CHERRY | 4 | CHERRY | 4 | CHERRY | 5 | CHERRY | 5 |
| 7 | BLANK | 2 | BLANK | 3 | BLANK | 3 | BLANK | 4 | BLANK | 4 |
| 8 | 2BAR | 10 | 1BAR | 23 | 2BAR | 31 | 1BAR | 11 | 2BAR | 21 |
| 9 | BLANK | 14 | BLANK | 13 | BLANK | 3 | BLANK | 16 | BLANK | 17 |
| 10 | 3BAR | 16 | 3BAR | 22 | F_CHERRY | 3 | 3BAR | 14 | 3BAR | 19 |
| 11 | BLANK | 14 | BLANK | 15 | BLANK | 3 | BLANK | 14 | BLANK | 17 |
| 12 | 2BAR | 10 | 1BAR | 22 | 2BAR | 34 | 1BAR | 10 | 2BAR | 19 |
| 13 | BLANK | 9 | BLANK | 10 | BLANK | 7 | BLANK | 14 | BLANK | 7 |
| 14 | RED7 | 9 | RED7 | 6 | RED7 | 6 | RED7 | 23 | RED7 | 7 |
| 15 | BLANK | 9 | BLANK | 10 | BLANK | 7 | BLANK | 14 | BLANK | 7 |
| 16 | 2BAR | 24 | 1BAR | 22 | 2BAR | 35 | 1BAR | 6 | 2BAR | 20 |
| 17 | BLANK | 46 | BLANK | 14 | BLANK | 120 | BLANK | 16 | BLANK | 19 |
| 18 | 1BAR | 25 | 2BAR | 23 | 1BAR | 34 | 2BAR | 7 | 1BAR | 22 |
| 19 | BLANK | 10 | BLANK | 12 | BLANK | 7 | BLANK | 15 | BLANK | 9 |
| 20 | RED7 | 11 | RED7 | 5 | RED7 | 5 | RED7 | 32 | RED7 | 8 |
| 21 | BLANK | 10 | BLANK | 10 | BLANK | 6 | BLANK | 14 | BLANK | 8 |
| | | 276 | | 274 | | 389 | | 288 | | 288 |

FIG.26

EXPECTING DEGREE RANDOM DETERMINATION TABLE

| No. | EXPECTING DEGREE | WEIGHT |
|---|---|---|
| 0 | HIGH | 1 |
| 1 | MIDDLE | 2 |
| 2 | LOW | 3 |
| | | 10 |

FIG.27

CHANCE MODE SYMBOL RANDOM DETERMINATION TABLE (EXPECTING DEGREE HIGH : FIRST SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 8 | 2BAR | 5 | 1BAR | 20 | 2BAR | 8 | 1BAR | 15 |
| 1 | BLANK | 58 | BLANK | 98 | BLANK | 30 | BLANK | 56 | BLANK | 33 |
| 2 | RED7 | 58 | RED7 | 109 | RED7 | 40 | RED7 | 44 | RED7 | 45 |
| 3 | BLANK | 58 | BLANK | 100 | BLANK | 30 | BLANK | 55 | BLANK | 32 |
| 4 | 3BAR | 7 | 3BAR | 5 | 3BAR | 15 | 3BAR | 7 | 3BAR | 14 |
| 5 | BLANK | 0 | BLANK | 0 | BLANK | 0 | BLANK | 0 | BLANK | 0 |
| 6 | CHERRY | 0 | CHERRY | 0 | CHERRY | 0 | CHERRY | 0 | CHERRY | 0 |
| 7 | BLANK | 0 | BLANK | 0 | BLANK | 0 | BLANK | 0 | BLANK | 0 |
| 8 | 2BAR | 4 | 1BAR | 16 | 2BAR | 16 | 1BAR | 12 | 2BAR | 14 |
| 9 | BLANK | 4 | BLANK | 15 | BLANK | 0 | BLANK | 10 | BLANK | 15 |
| 10 | 3BAR | 4 | 3BAR | 15 | F_CHERRY | 0 | 3BAR | 10 | 3BAR | 16 |
| 11 | BLANK | 7 | BLANK | 15 | BLANK | 0 | BLANK | 10 | BLANK | 16 |
| 12 | 2BAR | 8 | 1BAR | 15 | 2BAR | 18 | 1BAR | 13 | 2BAR | 14 |
| 13 | BLANK | 2 | BLANK | 6 | BLANK | 6 | BLANK | 4 | BLANK | 3 |
| 14 | RED7 | 1 | RED7 | 5 | RED7 | 6 | RED7 | 4 | RED7 | 3 |
| 15 | BLANK | 2 | BLANK | 5 | BLANK | 6 | BLANK | 4 | BLANK | 3 |
| 16 | 2BAR | 7 | 1BAR | 25 | 2BAR | 22 | 1BAR | 12 | 2BAR | 14 |
| 17 | BLANK | 8 | BLANK | 22 | BLANK | 45 | BLANK | 8 | BLANK | 15 |
| 18 | 1BAR | 7 | 2BAR | 25 | 1BAR | 22 | 2BAR | 12 | 1BAR | 14 |
| 19 | BLANK | 2 | BLANK | 5 | BLANK | 3 | BLANK | 4 | BLANK | 3 |
| 20 | RED7 | 2 | RED7 | 5 | RED7 | 2 | RED7 | 4 | RED7 | 3 |
| 21 | BLANK | 2 | BLANK | 5 | BLANK | 3 | BLANK | 4 | BLANK | 3 |
| | | 249 | | 496 | | 284 | | 281 | | 275 |

FIG.28

CHANCE MODE SYMBOL RANDOM DETERMINATION TABLE (EXPECTING DEGREE HIGH : SECOND SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 4 | 2BAR | 5 | 1BAR | 16 | 2BAR | 9 | 1BAR | 14 |
| 1 | BLANK | 2 | BLANK | 5 | BLANK | 5 | BLANK | 5 | BLANK | 3 |
| 2 | RED7 | 2 | RED7 | 5 | RED7 | 5 | RED7 | 5 | RED7 | 3 |
| 3 | BLANK | 2 | BLANK | 5 | BLANK | 5 | BLANK | 5 | BLANK | 3 |
| 4 | 3BAR | 5 | 3BAR | 5 | 3BAR | 14 | 3BAR | 7 | 3BAR | 14 |
| 5 | BLANK | 0 | BLANK | 2 | BLANK | 2 | BLANK | 2 | BLANK | 2 |
| 6 | CHERRY | 0 | CHERRY | 2 | CHERRY | 2 | CHERRY | 2 | CHERRY | 2 |
| 7 | BLANK | 0 | BLANK | 2 | BLANK | 2 | BLANK | 2 | BLANK | 2 |
| 8 | 2BAR | 4 | 1BAR | 15 | 2BAR | 14 | 1BAR | 9 | 2BAR | 14 |
| 9 | BLANK | 4 | BLANK | 14 | BLANK | 0 | BLANK | 7 | BLANK | 14 |
| 10 | 3BAR | 4 | 3BAR | 14 | F_CHERRY | 0 | 3BAR | 9 | 3BAR | 16 |
| 11 | BLANK | 7 | BLANK | 14 | BLANK | 0 | BLANK | 10 | BLANK | 15 |
| 12 | 2BAR | 7 | 1BAR | 13 | 2BAR | 17 | 1BAR | 14 | 2BAR | 16 |
| 13 | BLANK | 66 | BLANK | 100 | BLANK | 34 | BLANK | 55 | BLANK | 33 |
| 14 | RED7 | 66 | RED7 | 108 | RED7 | 42 | RED7 | 44 | RED7 | 45 |
| 15 | BLANK | 66 | BLANK | 100 | BLANK | 35 | BLANK | 55 | BLANK | 35 |
| 16 | 2BAR | 4 | 1BAR | 23 | 2BAR | 17 | 1BAR | 12 | 2BAR | 15 |
| 17 | BLANK | 4 | BLANK | 22 | BLANK | 43 | BLANK | 12 | BLANK | 16 |
| 18 | 1BAR | 4 | 2BAR | 20 | 1BAR | 17 | 2BAR | 12 | 1BAR | 14 |
| 19 | BLANK | 2 | BLANK | 5 | BLANK | 4 | BLANK | 5 | BLANK | 3 |
| 20 | RED7 | 2 | RED7 | 5 | RED7 | 4 | RED7 | 5 | RED7 | 3 |
| 21 | BLANK | 2 | BLANK | 5 | BLANK | 4 | BLANK | 5 | BLANK | 3 |
| | | 257 | | 489 | | 282 | | 291 | | 285 |

FIG.29

CHANCE MODE SYMBOL RANDOM DETERMINATION TABLE (EXPECTING DEGREE HIGH : THIRD SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 5 | 2BAR | 10 | 1BAR | 14 | 2BAR | 8 | 1BAR | 15 |
| 1 | BLANK | 2 | BLANK | 6 | BLANK | 5 | BLANK | 4 | BLANK | 4 |
| 2 | RED7 | 2 | RED7 | 6 | RED7 | 5 | RED7 | 4 | RED7 | 4 |
| 3 | BLANK | 2 | BLANK | 6 | BLANK | 5 | BLANK | 4 | BLANK | 4 |
| 4 | 3BAR | 4 | 3BAR | 9 | 3BAR | 12 | 3BAR | 8 | 3BAR | 14 |
| 5 | BLANK | 0 | BLANK | 2 | BLANK | 5 | BLANK | 2 | BLANK | 3 |
| 6 | CHERRY | 0 | CHERRY | 2 | CHERRY | 5 | CHERRY | 2 | CHERRY | 3 |
| 7 | BLANK | 0 | BLANK | 2 | BLANK | 5 | BLANK | 2 | BLANK | 3 |
| 8 | 2BAR | 4 | 1BAR | 11 | 2BAR | 12 | 1BAR | 10 | 2BAR | 15 |
| 9 | BLANK | 5 | BLANK | 12 | BLANK | 0 | BLANK | 8 | BLANK | 20 |
| 10 | 3BAR | 4 | 3BAR | 11 | F_CHERRY | 0 | 3BAR | 11 | 3BAR | 14 |
| 11 | BLANK | 5 | BLANK | 12 | BLANK | 0 | BLANK | 8 | BLANK | 14 |
| 12 | 2BAR | 4 | 1BAR | 11 | 2BAR | 15 | 1BAR | 14 | 2BAR | 14 |
| 13 | BLANK | 2 | BLANK | 5 | BLANK | 3 | BLANK | 4 | BLANK | 4 |
| 14 | RED7 | 2 | RED7 | 5 | RED7 | 3 | RED7 | 4 | RED7 | 4 |
| 15 | BLANK | 2 | BLANK | 5 | BLANK | 3 | BLANK | 4 | BLANK | 4 |
| 16 | 2BAR | 4 | 1BAR | 14 | 2BAR | 15 | 1BAR | 12 | 2BAR | 14 |
| 17 | BLANK | 5 | BLANK | 17 | BLANK | 33 | BLANK | 11 | BLANK | 14 |
| 18 | 1BAR | 4 | 2BAR | 15 | 1BAR | 15 | 2BAR | 10 | 1BAR | 14 |
| 19 | BLANK | 65 | BLANK | 102 | BLANK | 44 | BLANK | 55 | BLANK | 35 |
| 20 | RED7 | 65 | RED7 | 120 | RED7 | 44 | RED7 | 45 | RED7 | 46 |
| 21 | BLANK | 65 | BLANK | 102 | BLANK | 44 | BLANK | 55 | BLANK | 35 |
| | | 251 | | 485 | | 287 | | 285 | | 297 |

FIG.30

CHANCE MODE SYMBOL RANDOM DETERMINATION TABLE (EXPECTING DEGREE HIGH : FOURTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 4 | 2BAR | 5 | 1BAR | 8 | 2BAR | 8 | 1BAR | 14 |
| 1 | BLANK | 70 | BLANK | 120 | BLANK | 55 | BLANK | 55 | BLANK | 35 |
| 2 | RED7 | 72 | RED7 | 140 | RED7 | 55 | RED7 | 45 | RED7 | 50 |
| 3 | BLANK | 70 | BLANK | 120 | BLANK | 55 | BLANK | 55 | BLANK | 35 |
| 4 | 3BAR | 4 | 3BAR | 5 | 3BAR | 8 | 3BAR | 5 | 3BAR | 15 |
| 5 | BLANK | 0 | BLANK | 2 | BLANK | 6 | BLANK | 2 | BLANK | 2 |
| 6 | CHERRY | 0 | CHERRY | 2 | CHERRY | 6 | CHERRY | 2 | CHERRY | 2 |
| 7 | BLANK | 0 | BLANK | 2 | BLANK | 6 | BLANK | 2 | BLANK | 2 |
| 8 | 2BAR | 3 | 1BAR | 8 | 2BAR | 5 | 1BAR | 8 | 2BAR | 14 |
| 9 | BLANK | 3 | BLANK | 8 | BLANK | 0 | BLANK | 10 | BLANK | 14 |
| 10 | 3BAR | 3 | 3BAR | 8 | F_CHERRY | 0 | 3BAR | 8 | 3BAR | 14 |
| 11 | BLANK | 3 | BLANK | 10 | BLANK | 0 | BLANK | 10 | BLANK | 14 |
| 12 | 2BAR | 3 | 1BAR | 10 | 2BAR | 7 | 1BAR | 15 | 2BAR | 14 |
| 13 | BLANK | 2 | BLANK | 5 | BLANK | 5 | BLANK | 5 | BLANK | 3 |
| 14 | RED7 | 2 | RED7 | 5 | RED7 | 5 | RED7 | 5 | RED7 | 3 |
| 15 | BLANK | 2 | BLANK | 5 | BLANK | 5 | BLANK | 5 | BLANK | 3 |
| 16 | 2BAR | 3 | 1BAR | 12 | 2BAR | 14 | 1BAR | 12 | 2BAR | 14 |
| 17 | BLANK | 3 | BLANK | 12 | BLANK | 25 | BLANK | 14 | BLANK | 14 |
| 18 | 1BAR | 3 | 2BAR | 12 | 1BAR | 14 | 2BAR | 12 | 1BAR | 14 |
| 19 | BLANK | 2 | BLANK | 5 | BLANK | 3 | BLANK | 4 | BLANK | 3 |
| 20 | RED7 | 2 | RED7 | 5 | RED7 | 3 | RED7 | 4 | RED7 | 3 |
| 21 | BLANK | 2 | BLANK | 5 | BLANK | 3 | BLANK | 4 | BLANK | 3 |
| | | 256 | | 506 | | 288 | | 290 | | 285 |

FIG.31

CHANCE MODE SYMBOL RANDOM DETERMINATION TABLE (EXPECTING DEGREE HIGH : FIFTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 2 | 2BAR | 5 | 1BAR | 10 | 2BAR | 8 | 1BAR | 12 |
| 1 | BLANK | 2 | BLANK | 5 | BLANK | 5 | BLANK | 4 | BLANK | 3 |
| 2 | RED7 | 2 | RED7 | 5 | RED7 | 5 | RED7 | 4 | RED7 | 3 |
| 3 | BLANK | 2 | BLANK | 5 | BLANK | 5 | BLANK | 4 | BLANK | 3 |
| 4 | 3BAR | 2 | 3BAR | 5 | 3BAR | 10 | 3BAR | 7 | 3BAR | 12 |
| 5 | BLANK | 0 | BLANK | 2 | BLANK | 6 | BLANK | 3 | BLANK | 3 |
| 6 | CHERRY | 0 | CHERRY | 2 | CHERRY | 6 | CHERRY | 3 | CHERRY | 3 |
| 7 | BLANK | 0 | BLANK | 2 | BLANK | 6 | BLANK | 3 | BLANK | 3 |
| 8 | 2BAR | 2 | 1BAR | 5 | 2BAR | 6 | 1BAR | 7 | 2BAR | 10 |
| 9 | BLANK | 2 | BLANK | 5 | BLANK | 0 | BLANK | 7 | BLANK | 10 |
| 10 | 3BAR | 2 | 3BAR | 7 | F_CHERRY | 0 | 3BAR | 7 | 3BAR | 12 |
| 11 | BLANK | 2 | BLANK | 7 | BLANK | 0 | BLANK | 12 | BLANK | 12 |
| 12 | 2BAR | 2 | 1BAR | 7 | 2BAR | 8 | 1BAR | 13 | 2BAR | 14 |
| 13 | BLANK | 72 | BLANK | 125 | BLANK | 60 | BLANK | 55 | BLANK | 40 |
| 14 | RED7 | 70 | RED7 | 150 | RED7 | 60 | RED7 | 44 | RED7 | 60 |
| 15 | BLANK | 75 | BLANK | 125 | BLANK | 60 | BLANK | 55 | BLANK | 40 |
| 16 | 2BAR | 2 | 1BAR | 5 | 2BAR | 15 | 1BAR | 12 | 2BAR | 14 |
| 17 | BLANK | 2 | BLANK | 5 | BLANK | 20 | BLANK | 11 | BLANK | 14 |
| 18 | 1BAR | 2 | 2BAR | 5 | 1BAR | 15 | 2BAR | 13 | 1BAR | 14 |
| 19 | BLANK | 2 | BLANK | 5 | BLANK | 3 | BLANK | 4 | BLANK | 3 |
| 20 | RED7 | 2 | RED7 | 5 | RED7 | 3 | RED7 | 5 | RED7 | 3 |
| 21 | BLANK | 2 | BLANK | 5 | BLANK | 3 | BLANK | 4 | BLANK | 3 |
| | | 249 | | 492 | | 306 | | 285 | | 291 |

FIG.32

CHANCE MODE SYMBOL RANDOM DETERMINATION TABLE (EXPECTING DEGREE HIGH : SIXTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 2 | 2BAR | 5 | 1BAR | 3 | 2BAR | 4 | 1BAR | 9 |
| 1 | BLANK | 2 | BLANK | 5 | BLANK | 5 | BLANK | 4 | BLANK | 3 |
| 2 | RED7 | 2 | RED7 | 5 | RED7 | 6 | RED7 | 4 | RED7 | 3 |
| 3 | BLANK | 2 | BLANK | 5 | BLANK | 5 | BLANK | 4 | BLANK | 3 |
| 4 | 3BAR | 2 | 3BAR | 5 | 3BAR | 3 | 3BAR | 4 | 3BAR | 10 |
| 5 | BLANK | 0 | BLANK | 2 | BLANK | 14 | BLANK | 8 | BLANK | 7 |
| 6 | CHERRY | 0 | CHERRY | 2 | CHERRY | 15 | CHERRY | 8 | CHERRY | 7 |
| 7 | BLANK | 0 | BLANK | 2 | BLANK | 14 | BLANK | 8 | BLANK | 7 |
| 8 | 2BAR | 2 | 1BAR | 5 | 2BAR | 2 | 1BAR | 8 | 2BAR | 10 |
| 9 | BLANK | 2 | BLANK | 5 | BLANK | 0 | BLANK | 8 | BLANK | 10 |
| 10 | 3BAR | 2 | 3BAR | 8 | F_CHERRY | 0 | 3BAR | 8 | 3BAR | 12 |
| 11 | BLANK | 2 | BLANK | 7 | BLANK | 0 | BLANK | 11 | BLANK | 12 |
| 12 | 2BAR | 2 | 1BAR | 8 | 2BAR | 4 | 1BAR | 10 | 2BAR | 12 |
| 13 | BLANK | 2 | BLANK | 5 | BLANK | 3 | BLANK | 4 | BLANK | 3 |
| 14 | RED7 | 2 | RED7 | 5 | RED7 | 3 | RED7 | 4 | RED7 | 3 |
| 15 | BLANK | 2 | BLANK | 5 | BLANK | 3 | BLANK | 4 | BLANK | 3 |
| 16 | 2BAR | 2 | 1BAR | 5 | 2BAR | 5 | 1BAR | 10 | 2BAR | 9 |
| 17 | BLANK | 2 | BLANK | 5 | BLANK | 10 | BLANK | 12 | BLANK | 10 |
| 18 | 1BAR | 2 | 2BAR | 4 | 1BAR | 5 | 2BAR | 10 | 1BAR | 9 |
| 19 | BLANK | 80 | BLANK | 120 | BLANK | 60 | BLANK | 60 | BLANK | 45 |
| 20 | RED7 | 80 | RED7 | 150 | RED7 | 60 | RED7 | 45 | RED7 | 55 |
| 21 | BLANK | 80 | BLANK | 120 | BLANK | 60 | BLANK | 60 | BLANK | 42 |
| | | 272 | | 483 | | 280 | | 298 | | 284 |

FIG.33

CHANCE MODE SYMBOL RANDOM DETERMINATION TABLE (EXPECTING DEGREE HIGH : SEVENTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 2 | 2BAR | 5 | 1BAR | 2 | 2BAR | 5 | 1BAR | 7 |
| 1 | BLANK | 74 | BLANK | 128 | BLANK | 65 | BLANK | 65 | BLANK | 45 |
| 2 | RED7 | 70 | RED7 | 150 | RED7 | 66 | RED7 | 55 | RED7 | 55 |
| 3 | BLANK | 75 | BLANK | 130 | BLANK | 65 | BLANK | 65 | BLANK | 45 |
| 4 | 3BAR | 2 | 3BAR | 5 | 3BAR | 2 | 3BAR | 5 | 3BAR | 7 |
| 5 | BLANK | 0 | BLANK | 2 | BLANK | 15 | BLANK | 15 | BLANK | 16 |
| 6 | CHERRY | 0 | CHERRY | 2 | CHERRY | 14 | CHERRY | 15 | CHERRY | 16 |
| 7 | BLANK | 0 | BLANK | 2 | BLANK | 15 | BLANK | 15 | BLANK | 16 |
| 8 | 2BAR | 2 | 1BAR | 6 | 2BAR | 2 | 1BAR | 2 | 2BAR | 7 |
| 9 | BLANK | 2 | BLANK | 5 | BLANK | 0 | BLANK | 2 | BLANK | 7 |
| 10 | 3BAR | 2 | 3BAR | 6 | F_CHERRY | 0 | 3BAR | 2 | 3BAR | 7 |
| 11 | BLANK | 2 | BLANK | 6 | BLANK | 0 | BLANK | 2 | BLANK | 7 |
| 12 | 2BAR | 2 | 1BAR | 6 | 2BAR | 0 | 1BAR | 4 | 2BAR | 5 |
| 13 | BLANK | 2 | BLANK | 5 | BLANK | 5 | BLANK | 4 | BLANK | 1 |
| 14 | RED7 | 2 | RED7 | 5 | RED7 | 5 | RED7 | 5 | RED7 | 1 |
| 15 | BLANK | 2 | BLANK | 5 | BLANK | 5 | BLANK | 5 | BLANK | 1 |
| 16 | 2BAR | 2 | 1BAR | 5 | 2BAR | 2 | 1BAR | 5 | 2BAR | 7 |
| 17 | BLANK | 2 | BLANK | 6 | BLANK | 2 | BLANK | 5 | BLANK | 7 |
| 18 | 1BAR | 2 | 2BAR | 6 | 1BAR | 2 | 2BAR | 4 | 1BAR | 7 |
| 19 | BLANK | 2 | BLANK | 6 | BLANK | 4 | BLANK | 2 | BLANK | 3 |
| 20 | RED7 | 2 | RED7 | 6 | RED7 | 3 | RED7 | 5 | RED7 | 3 |
| 21 | BLANK | 2 | BLANK | 6 | BLANK | 4 | BLANK | 2 | BLANK | 3 |
| | | 251 | | 503 | | 278 | | 289 | | 273 |

FIG.34

CHANCE MODE SYMBOL RANDOM DETERMINATION TABLE (EXPECTING DEGREE HIGH : EIGHTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 0 | 2BAR | 0 | 1BAR | 0 | 2BAR | 0 | 1BAR | 0 |
| 1 | BLANK | 0 | BLANK | 0 | BLANK | 0 | BLANK | 90 | BLANK | 110 |
| 2 | RED7 | 190 | RED7 | 190 | RED7 | 110 | RED7 | 75 | RED7 | 40 |
| 3 | BLANK | 0 | BLANK | 0 | BLANK | 0 | BLANK | 90 | BLANK | 110 |
| 4 | 3BAR | 0 | 3BAR | 0 | 3BAR | 0 | 3BAR | 0 | 3BAR | 0 |
| 5 | BLANK | 0 | BLANK | 0 | BLANK | 0 | BLANK | 0 | BLANK | 0 |
| 6 | CHERRY | 0 | CHERRY | 0 | CHERRY | 130 | CHERRY | 0 | CHERRY | 0 |
| 7 | BLANK | 0 | BLANK | 0 | BLANK | 0 | BLANK | 0 | BLANK | 0 |
| 8 | 2BAR | 0 | 1BAR | 0 | 2BAR | 0 | 1BAR | 0 | 2BAR | 0 |
| 9 | BLANK | 0 | BLANK | 0 | BLANK | 0 | BLANK | 0 | BLANK | 0 |
| 10 | 3BAR | 0 | 3BAR | 0 | F_CHERRY | 0 | 3BAR | 0 | 3BAR | 0 |
| 11 | BLANK | 0 | BLANK | 0 | BLANK | 0 | BLANK | 0 | BLANK | 0 |
| 12 | 2BAR | 0 | 1BAR | 0 | 2BAR | 0 | 1BAR | 0 | 2BAR | 0 |
| 13 | BLANK | 0 | BLANK | 0 | BLANK | 0 | BLANK | 4 | BLANK | 2 |
| 14 | RED7 | 35 | RED7 | 35 | RED7 | 16 | RED7 | 4 | RED7 | 2 |
| 15 | BLANK | 0 | BLANK | 0 | BLANK | 0 | BLANK | 4 | BLANK | 2 |
| 16 | 2BAR | 0 | 1BAR | 0 | 2BAR | 0 | 1BAR | 0 | 2BAR | 0 |
| 17 | BLANK | 0 | BLANK | 0 | BLANK | 0 | BLANK | 0 | BLANK | 0 |
| 18 | 1BAR | 0 | 2BAR | 0 | 1BAR | 0 | 2BAR | 0 | 1BAR | 0 |
| 19 | BLANK | 0 | BLANK | 0 | BLANK | 0 | BLANK | 2 | BLANK | 2 |
| 20 | RED7 | 30 | RED7 | 60 | RED7 | 16 | RED7 | 2 | RED7 | 2 |
| 21 | BLANK | 0 | BLANK | 0 | BLANK | 0 | BLANK | 2 | BLANK | 2 |
| | | 255 | | 285 | | 272 | | 273 | | 272 |

FIG.35

CHANCE MODE SYMBOL RANDOM DETERMINATION TABLE (EXPECTING DEGREE MIDDLE : FIRST SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 8 | 2BAR | 3 | 1BAR | 15 | 2BAR | 7 | 1BAR | 20 |
| 1 | BLANK | 60 | BLANK | 50 | BLANK | 29 | BLANK | 55 | BLANK | 30 |
| 2 | RED7 | 60 | RED7 | 50 | RED7 | 40 | RED7 | 45 | RED7 | 40 |
| 3 | BLANK | 60 | BLANK | 50 | BLANK | 29 | BLANK | 55 | BLANK | 30 |
| 4 | 3BAR | 8 | 3BAR | 4 | 3BAR | 16 | 3BAR | 7 | 3BAR | 20 |
| 5 | BLANK | 0 | BLANK | 0 | BLANK | 0 | BLANK | 0 | BLANK | 0 |
| 6 | CHERRY | 0 | CHERRY | 0 | CHERRY | 0 | CHERRY | 0 | CHERRY | 0 |
| 7 | BLANK | 0 | BLANK | 0 | BLANK | 0 | BLANK | 0 | BLANK | 0 |
| 8 | 2BAR | 4 | 1BAR | 12 | 2BAR | 20 | 1BAR | 15 | 2BAR | 15 |
| 9 | BLANK | 4 | BLANK | 9 | BLANK | 0 | BLANK | 6 | BLANK | 15 |
| 10 | 3BAR | 4 | 3BAR | 7 | F_CHERRY | 0 | 3BAR | 15 | 3BAR | 15 |
| 11 | BLANK | 8 | BLANK | 7 | BLANK | 0 | BLANK | 8 | BLANK | 15 |
| 12 | 2BAR | 8 | 1BAR | 7 | 2BAR | 22 | 1BAR | 15 | 2BAR | 15 |
| 13 | BLANK | 2 | BLANK | 3 | BLANK | 6 | BLANK | 2 | BLANK | 3 |
| 14 | RED7 | 2 | RED7 | 3 | RED7 | 6 | RED7 | 3 | RED7 | 3 |
| 15 | BLANK | 2 | BLANK | 3 | BLANK | 6 | BLANK | 2 | BLANK | 3 |
| 16 | 2BAR | 8 | 1BAR | 10 | 2BAR | 20 | 1BAR | 12 | 2BAR | 12 |
| 17 | BLANK | 8 | BLANK | 15 | BLANK | 45 | BLANK | 6 | BLANK | 30 |
| 18 | 1BAR | 8 | 2BAR | 10 | 1BAR | 20 | 2BAR | 11 | 1BAR | 12 |
| 19 | BLANK | 2 | BLANK | 3 | BLANK | 4 | BLANK | 4 | BLANK | 3 |
| 20 | RED7 | 2 | RED7 | 4 | RED7 | 4 | RED7 | 4 | RED7 | 3 |
| 21 | BLANK | 2 | BLANK | 3 | BLANK | 4 | BLANK | 4 | BLANK | 3 |
| | | 260 | | 253 | | 286 | | 276 | | 287 |

FIG.36

CHANCE MODE SYMBOL RANDOM DETERMINATION TABLE (EXPECTING DEGREE MIDDLE : SECOND SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 8 | 2BAR | 5 | 1BAR | 18 | 2BAR | 8 | 1BAR | 14 |
| 1 | BLANK | 2 | BLANK | 5 | BLANK | 5 | BLANK | 5 | BLANK | 3 |
| 2 | RED7 | 2 | RED7 | 5 | RED7 | 6 | RED7 | 5 | RED7 | 3 |
| 3 | BLANK | 2 | BLANK | 5 | BLANK | 5 | BLANK | 5 | BLANK | 3 |
| 4 | 3BAR | 8 | 3BAR | 5 | 3BAR | 15 | 3BAR | 5 | 3BAR | 15 |
| 5 | BLANK | 0 | BLANK | 2 | BLANK | 5 | BLANK | 2 | BLANK | 2 |
| 6 | CHERRY | 0 | CHERRY | 2 | CHERRY | 5 | CHERRY | 2 | CHERRY | 2 |
| 7 | BLANK | 0 | BLANK | 2 | BLANK | 5 | BLANK | 2 | BLANK | 2 |
| 8 | 2BAR | 4 | 1BAR | 22 | 2BAR | 15 | 1BAR | 15 | 2BAR | 15 |
| 9 | BLANK | 4 | BLANK | 15 | BLANK | 0 | BLANK | 5 | BLANK | 15 |
| 10 | 3BAR | 4 | 3BAR | 14 | F.CHERRY | 0 | 3BAR | 15 | 3BAR | 15 |
| 11 | BLANK | 7 | BLANK | 14 | BLANK | 0 | BLANK | 5 | BLANK | 15 |
| 12 | 2BAR | 7 | 1BAR | 14 | 2BAR | 18 | 1BAR | 15 | 2BAR | 15 |
| 13 | BLANK | 60 | BLANK | 100 | BLANK | 35 | BLANK | 55 | BLANK | 30 |
| 14 | RED7 | 60 | RED7 | 100 | RED7 | 40 | RED7 | 44 | RED7 | 40 |
| 15 | BLANK | 60 | BLANK | 100 | BLANK | 35 | BLANK | 55 | BLANK | 30 |
| 16 | 2BAR | 7 | 1BAR | 20 | 2BAR | 20 | 1BAR | 12 | 2BAR | 12 |
| 17 | BLANK | 7 | BLANK | 18 | BLANK | 45 | BLANK | 10 | BLANK | 25 |
| 18 | 1BAR | 7 | 2BAR | 20 | 1BAR | 20 | 2BAR | 11 | 1BAR | 15 |
| 19 | BLANK | 2 | BLANK | 6 | BLANK | 3 | BLANK | 4 | BLANK | 3 |
| 20 | RED7 | 2 | RED7 | 5 | RED7 | 3 | RED7 | 5 | RED7 | 3 |
| 21 | BLANK | 2 | BLANK | 6 | BLANK | 3 | BLANK | 4 | BLANK | 3 |
| | | 255 | | 485 | | 301 | | 289 | | 280 |

FIG.37

CHANCE MODE SYMBOL RANDOM DETERMINATION TABLE (EXPECTING DEGREE MIDDLE : THIRD SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 7 | 2BAR | 6 | 1BAR | 15 | 2BAR | 7 | 1BAR | 14 |
| 1 | BLANK | 2 | BLANK | 6 | BLANK | 5 | BLANK | 4 | BLANK | 3 |
| 2 | RED7 | 2 | RED7 | 6 | RED7 | 5 | RED7 | 4 | RED7 | 3 |
| 3 | BLANK | 2 | BLANK | 6 | BLANK | 5 | BLANK | 4 | BLANK | 3 |
| 4 | 3BAR | 7 | 3BAR | 6 | 3BAR | 12 | 3BAR | 7 | 3BAR | 14 |
| 5 | BLANK | 0 | BLANK | 2 | BLANK | 6 | BLANK | 3 | BLANK | 3 |
| 6 | CHERRY | 0 | CHERRY | 2 | CHERRY | 6 | CHERRY | 3 | CHERRY | 3 |
| 7 | BLANK | 0 | BLANK | 2 | BLANK | 6 | BLANK | 3 | BLANK | 3 |
| 8 | 2BAR | 4 | 1BAR | 25 | 2BAR | 15 | 1BAR | 10 | 2BAR | 11 |
| 9 | BLANK | 4 | BLANK | 15 | BLANK | 0 | BLANK | 5 | BLANK | 15 |
| 10 | 3BAR | 4 | 3BAR | 15 | F_CHERRY | 0 | 3BAR | 13 | 3BAR | 15 |
| 11 | BLANK | 5 | BLANK | 15 | BLANK | 0 | BLANK | 5 | BLANK | 15 |
| 12 | 2BAR | 5 | 1BAR | 15 | 2BAR | 11 | 1BAR | 15 | 2BAR | 15 |
| 13 | BLANK | 2 | BLANK | 5 | BLANK | 3 | BLANK | 5 | BLANK | 3 |
| 14 | RED7 | 2 | RED7 | 5 | RED7 | 3 | RED7 | 5 | RED7 | 3 |
| 15 | BLANK | 2 | BLANK | 5 | BLANK | 3 | BLANK | 5 | BLANK | 3 |
| 16 | 2BAR | 2 | 1BAR | 20 | 2BAR | 19 | 1BAR | 11 | 2BAR | 10 |
| 17 | BLANK | 2 | BLANK | 20 | BLANK | 40 | BLANK | 9 | BLANK | 25 |
| 18 | 1BAR | 2 | 2BAR | 20 | 1BAR | 20 | 2BAR | 11 | 1BAR | 18 |
| 19 | BLANK | 60 | BLANK | 100 | BLANK | 35 | BLANK | 55 | BLANK | 30 |
| 20 | RED7 | 60 | RED7 | 100 | RED7 | 35 | RED7 | 44 | RED7 | 40 |
| 21 | BLANK | 60 | BLANK | 100 | BLANK | 35 | BLANK | 55 | BLANK | 30 |
| | | 234 | | 496 | | 279 | | 283 | | 279 |

FIG.38

CHANCE MODE SYMBOL RANDOM DETERMINATION TABLE (EXPECTING DEGREE MIDDLE : FOURTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 7 | 2BAR | 5 | 1BAR | 11 | 2BAR | 8 | 1BAR | 21 |
| 1 | BLANK | 60 | BLANK | 110 | BLANK | 40 | BLANK | 55 | BLANK | 37 |
| 2 | RED7 | 60 | RED7 | 110 | RED7 | 40 | RED7 | 45 | RED7 | 50 |
| 3 | BLANK | 60 | BLANK | 110 | BLANK | 40 | BLANK | 55 | BLANK | 40 |
| 4 | 3BAR | 8 | 3BAR | 5 | 3BAR | 11 | 3BAR | 7 | 3BAR | 22 |
| 5 | BLANK | 0 | BLANK | 2 | BLANK | 9 | BLANK | 4 | BLANK | 5 |
| 6 | CHERRY | 0 | CHERRY | 2 | CHERRY | 8 | CHERRY | 5 | CHERRY | 4 |
| 7 | BLANK | 0 | BLANK | 2 | BLANK | 9 | BLANK | 4 | BLANK | 4 |
| 8 | 2BAR | 4 | 1BAR | 22 | 2BAR | 8 | 1BAR | 5 | 2BAR | 10 |
| 9 | BLANK | 4 | BLANK | 15 | BLANK | 0 | BLANK | 5 | BLANK | 10 |
| 10 | 3BAR | 4 | 3BAR | 13 | F_CHERRY | 0 | 3BAR | 15 | 3BAR | 11 |
| 11 | BLANK | 7 | BLANK | 13 | BLANK | 0 | BLANK | 5 | BLANK | 12 |
| 12 | 2BAR | 7 | 1BAR | 13 | 2BAR | 12 | 1BAR | 15 | 2BAR | 7 |
| 13 | BLANK | 2 | BLANK | 5 | BLANK | 5 | BLANK | 4 | BLANK | 3 |
| 14 | RED7 | 2 | RED7 | 5 | RED7 | 5 | RED7 | 5 | RED7 | 3 |
| 15 | BLANK | 2 | BLANK | 5 | BLANK | 5 | BLANK | 4 | BLANK | 3 |
| 16 | 2BAR | 5 | 1BAR | 17 | 2BAR | 17 | 1BAR | 11 | 2BAR | 10 |
| 17 | BLANK | 5 | BLANK | 15 | BLANK | 39 | BLANK | 10 | BLANK | 10 |
| 18 | 1BAR | 5 | 2BAR | 17 | 1BAR | 18 | 2BAR | 11 | 1BAR | 10 |
| 19 | BLANK | 2 | BLANK | 5 | BLANK | 3 | BLANK | 4 | BLANK | 3 |
| 20 | RED7 | 2 | RED7 | 5 | RED7 | 3 | RED7 | 5 | RED7 | 3 |
| 21 | BLANK | 2 | BLANK | 5 | BLANK | 3 | BLANK | 4 | BLANK | 3 |
| | | 248 | | 501 | | 286 | | 286 | | 281 |

FIG.39

CHANCE MODE SYMBOL RANDOM DETERMINATION TABLE (EXPECTING DEGREE MIDDLE : FIFTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 7 | 2BAR | 5 | 1BAR | 7 | 2BAR | 7 | 1BAR | 15 |
| 1 | BLANK | 2 | BLANK | 5 | BLANK | 5 | BLANK | 4 | BLANK | 3 |
| 2 | RED7 | 2 | RED7 | 5 | RED7 | 5 | RED7 | 4 | RED7 | 3 |
| 3 | BLANK | 2 | BLANK | 5 | BLANK | 5 | BLANK | 4 | BLANK | 3 |
| 4 | 3BAR | 7 | 3BAR | 5 | 3BAR | 3 | 3BAR | 4 | 3BAR | 5 |
| 5 | BLANK | 0 | BLANK | 2 | BLANK | 15 | BLANK | 4 | BLANK | 6 |
| 6 | CHERRY | 0 | CHERRY | 2 | CHERRY | 15 | CHERRY | 4 | CHERRY | 6 |
| 7 | BLANK | 0 | BLANK | 2 | BLANK | 15 | BLANK | 4 | BLANK | 6 |
| 8 | 2BAR | 2 | 1BAR | 11 | 2BAR | 3 | 1BAR | 4 | 2BAR | 8 |
| 9 | BLANK | 2 | BLANK | 11 | BLANK | 0 | BLANK | 4 | BLANK | 8 |
| 10 | 3BAR | 2 | 3BAR | 11 | F_CHERRY | 0 | 3BAR | 4 | 3BAR | 10 |
| 11 | BLANK | 4 | BLANK | 11 | BLANK | 0 | BLANK | 4 | BLANK | 11 |
| 12 | 2BAR | 4 | 1BAR | 13 | 2BAR | 11 | 1BAR | 15 | 2BAR | 13 |
| 13 | BLANK | 65 | BLANK | 110 | BLANK | 40 | BLANK | 55 | BLANK | 38 |
| 14 | RED7 | 70 | RED7 | 110 | RED7 | 40 | RED7 | 45 | RED7 | 50 |
| 15 | BLANK | 65 | BLANK | 110 | BLANK | 40 | BLANK | 55 | BLANK | 37 |
| 16 | 2BAR | 4 | 1BAR | 20 | 2BAR | 16 | 1BAR | 15 | 2BAR | 10 |
| 17 | BLANK | 4 | BLANK | 15 | BLANK | 32 | BLANK | 10 | BLANK | 12 |
| 18 | 1BAR | 4 | 2BAR | 20 | 1BAR | 16 | 2BAR | 15 | 1BAR | 12 |
| 19 | BLANK | 2 | BLANK | 5 | BLANK | 3 | BLANK | 5 | BLANK | 3 |
| 20 | RED7 | 3 | RED7 | 5 | RED7 | 3 | RED7 | 5 | RED7 | 3 |
| 21 | BLANK | 2 | BLANK | 5 | BLANK | 3 | BLANK | 5 | BLANK | 3 |
| | | 253 | | 488 | | 277 | | 276 | | 265 |

FIG.40

CHANCE MODE SYMBOL RANDOM DETERMINATION TABLE (EXPECTING DEGREE MIDDLE : SIXTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 5 | 2BAR | 12 | 1BAR | 10 | 2BAR | 4 | 1BAR | 10 |
| 1 | BLANK | 2 | BLANK | 5 | BLANK | 5 | BLANK | 4 | BLANK | 3 |
| 2 | RED7 | 2 | RED7 | 5 | RED7 | 5 | RED7 | 4 | RED7 | 3 |
| 3 | BLANK | 2 | BLANK | 5 | BLANK | 5 | BLANK | 4 | BLANK | 3 |
| 4 | 3BAR | 2 | 3BAR | 11 | 3BAR | 10 | 3BAR | 4 | 3BAR | 10 |
| 5 | BLANK | 0 | BLANK | 2 | BLANK | 18 | BLANK | 11 | BLANK | 11 |
| 6 | CHERRY | 0 | CHERRY | 2 | CHERRY | 18 | CHERRY | 11 | CHERRY | 11 |
| 7 | BLANK | 0 | BLANK | 2 | BLANK | 18 | BLANK | 11 | BLANK | 12 |
| 8 | 2BAR | 4 | 1BAR | 8 | 2BAR | 6 | 1BAR | 7 | 2BAR | 7 |
| 9 | BLANK | 4 | BLANK | 8 | BLANK | 0 | BLANK | 9 | BLANK | 8 |
| 10 | 3BAR | 4 | 3BAR | 8 | F-CHERRY | 0 | 3BAR | 7 | 3BAR | 8 |
| 11 | BLANK | 4 | BLANK | 8 | BLANK | 0 | BLANK | 7 | BLANK | 8 |
| 12 | 2BAR | 4 | 1BAR | 8 | 2BAR | 10 | 1BAR | 6 | 2BAR | 8 |
| 13 | BLANK | 2 | BLANK | 5 | BLANK | 3 | BLANK | 5 | BLANK | 3 |
| 14 | RED7 | 2 | RED7 | 5 | RED7 | 3 | RED7 | 4 | RED7 | 3 |
| 15 | BLANK | 2 | BLANK | 5 | BLANK | 3 | BLANK | 5 | BLANK | 3 |
| 16 | 2BAR | 4 | 1BAR | 13 | 2BAR | 13 | 1BAR | 8 | 2BAR | 13 |
| 17 | BLANK | 4 | BLANK | 12 | BLANK | 17 | BLANK | 9 | BLANK | 10 |
| 18 | 1BAR | 4 | 2BAR | 11 | 1BAR | 13 | 2BAR | 10 | 1BAR | 14 |
| 19 | BLANK | 65 | BLANK | 120 | BLANK | 44 | BLANK | 55 | BLANK | 40 |
| 20 | RED7 | 65 | RED7 | 120 | RED7 | 44 | RED7 | 45 | RED7 | 52 |
| 21 | BLANK | 65 | BLANK | 120 | BLANK | 44 | BLANK | 55 | BLANK | 38 |
| | | 246 | | 495 | | 289 | | 285 | | 278 |

FIG.41

CHANCE MODE SYMBOL RANDOM DETERMINATION TABLE (EXPECTING DEGREE MIDDLE : SEVENTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 2 | 2BAR | 11 | 1BAR | 7 | 2BAR | 4 | 1BAR | 5 |
| 1 | BLANK | 75 | BLANK | 120 | BLANK | 47 | BLANK | 65 | BLANK | 44 |
| 2 | RED7 | 70 | RED7 | 120 | RED7 | 47 | RED7 | 47 | RED7 | 54 |
| 3 | BLANK | 72 | BLANK | 120 | BLANK | 47 | BLANK | 65 | BLANK | 44 |
| 4 | 3BAR | 2 | 3BAR | 11 | 3BAR | 6 | 3BAR | 4 | 3BAR | 5 |
| 5 | BLANK | 0 | BLANK | 2 | BLANK | 17 | BLANK | 14 | BLANK | 15 |
| 6 | CHERRY | 0 | CHERRY | 2 | CHERRY | 17 | CHERRY | 14 | CHERRY | 15 |
| 7 | BLANK | 0 | BLANK | 2 | BLANK | 17 | BLANK | 14 | BLANK | 15 |
| 8 | 2BAR | 2 | 1BAR | 7 | 2BAR | 7 | 1BAR | 3 | 2BAR | 5 |
| 9 | BLANK | 2 | BLANK | 7 | BLANK | 0 | BLANK | 3 | BLANK | 5 |
| 10 | 3BAR | 2 | 3BAR | 7 | F_CHERRY | 0 | 3BAR | 3 | 3BAR | 5 |
| 11 | BLANK | 2 | BLANK | 8 | BLANK | 0 | BLANK | 3 | BLANK | 6 |
| 12 | 2BAR | 2 | 1BAR | 8 | 2BAR | 6 | 1BAR | 3 | 2BAR | 11 |
| 13 | BLANK | 2 | BLANK | 5 | BLANK | 5 | BLANK | 4 | BLANK | 3 |
| 14 | RED7 | 2 | RED7 | 5 | RED7 | 6 | RED7 | 4 | RED7 | 3 |
| 15 | BLANK | 2 | BLANK | 5 | BLANK | 6 | BLANK | 4 | BLANK | 3 |
| 16 | 2BAR | 2 | 1BAR | 11 | 2BAR | 12 | 1BAR | 6 | 2BAR | 11 |
| 17 | BLANK | 2 | BLANK | 10 | BLANK | 12 | BLANK | 6 | BLANK | 9 |
| 18 | 1BAR | 2 | 2BAR | 10 | 1BAR | 12 | 2BAR | 6 | 1BAR | 9 |
| 19 | BLANK | 2 | BLANK | 5 | BLANK | 3 | BLANK | 4 | BLANK | 3 |
| 20 | RED7 | 2 | RED7 | 5 | RED7 | 3 | RED7 | 4 | RED7 | 3 |
| 21 | BLANK | 2 | BLANK | 5 | BLANK | 3 | BLANK | 4 | BLANK | 3 |
| | | 249 | | 486 | | 280 | | 284 | | 276 |

FIG.42

CHANCE MODE SYMBOL RANDOM DETERMINATION TABLE (EXPECTING DEGREE MIDDLE : EIGHTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 0 | 2BAR | 0 | 1BAR | 0 | 2BAR | 0 | 1BAR | 0 |
| 1 | BLANK | 0 | BLANK | 0 | BLANK | 0 | BLANK | 100 | BLANK | 110 |
| 2 | RED7 | 180 | RED7 | 180 | RED7 | 110 | RED7 | 50 | RED7 | 35 |
| 3 | BLANK | 0 | BLANK | 0 | BLANK | 0 | BLANK | 100 | BLANK | 110 |
| 4 | 3BAR | 0 | 3BAR | 0 | 3BAR | 0 | 3BAR | 0 | 3BAR | 0 |
| 5 | BLANK | 0 | BLANK | 0 | BLANK | 0 | BLANK | 0 | BLANK | 0 |
| 6 | CHERRY | 0 | CHERRY | 0 | CHERRY | 130 | CHERRY | 0 | CHERRY | 0 |
| 7 | BLANK | 0 | BLANK | 0 | BLANK | 0 | BLANK | 0 | BLANK | 0 |
| 8 | 2BAR | 0 | 1BAR | 0 | 2BAR | 0 | 1BAR | 0 | 2BAR | 0 |
| 9 | BLANK | 0 | BLANK | 0 | BLANK | 0 | BLANK | 0 | BLANK | 0 |
| 10 | 3BAR | 0 | 3BAR | 0 | F_CHERRY | 0 | 3BAR | 0 | 3BAR | 0 |
| 11 | BLANK | 0 | BLANK | 0 | BLANK | 0 | BLANK | 0 | BLANK | 0 |
| 12 | 2BAR | 0 | 1BAR | 0 | 2BAR | 0 | 1BAR | 0 | 2BAR | 0 |
| 13 | BLANK | 0 | BLANK | 0 | BLANK | 0 | BLANK | 5 | BLANK | 5 |
| 14 | RED7 | 30 | RED7 | 30 | RED7 | 15 | RED7 | 5 | RED7 | 2 |
| 15 | BLANK | 0 | BLANK | 0 | BLANK | 0 | BLANK | 5 | BLANK | 5 |
| 16 | 2BAR | 0 | 1BAR | 0 | 2BAR | 0 | 1BAR | 0 | 2BAR | 0 |
| 17 | BLANK | 0 | BLANK | 0 | BLANK | 0 | BLANK | 0 | BLANK | 0 |
| 18 | 1BAR | 0 | 2BAR | 0 | 1BAR | 0 | 2BAR | 0 | 1BAR | 0 |
| 19 | BLANK | 0 | BLANK | 0 | BLANK | 0 | BLANK | 5 | BLANK | 5 |
| 20 | RED7 | 30 | RED7 | 30 | RED7 | 15 | RED7 | 5 | RED7 | 2 |
| 21 | BLANK | 0 | BLANK | 0 | BLANK | 0 | BLANK | 5 | BLANK | 5 |
| | | 240 | | 240 | | 270 | | 280 | | 279 |

FIG.43

CHANCE MODE SYMBOL RANDOM DETERMINATION TABLE (EXPECTING DEGREE LOW : FIRST SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 8 | 2BAR | 3 | 1BAR | 16 | 2BAR | 8 | 1BAR | 18 |
| 1 | BLANK | 55 | BLANK | 50 | BLANK | 28 | BLANK | 55 | BLANK | 30 |
| 2 | RED7 | 55 | RED7 | 50 | RED7 | 38 | RED7 | 45 | RED7 | 40 |
| 3 | BLANK | 55 | BLANK | 50 | BLANK | 27 | BLANK | 55 | BLANK | 30 |
| 4 | 3BAR | 8 | 3BAR | 3 | 3BAR | 17 | 3BAR | 8 | 3BAR | 20 |
| 5 | BLANK | 0 | BLANK | 0 | BLANK | 0 | BLANK | 0 | BLANK | 0 |
| 6 | CHERRY | 0 | CHERRY | 0 | CHERRY | 0 | CHERRY | 0 | CHERRY | 0 |
| 7 | BLANK | 0 | BLANK | 0 | BLANK | 0 | BLANK | 0 | BLANK | 0 |
| 8 | 2BAR | 9 | 1BAR | 11 | 2BAR | 22 | 1BAR | 12 | 2BAR | 15 |
| 9 | BLANK | 9 | BLANK | 9 | BLANK | 0 | BLANK | 9 | BLANK | 15 |
| 10 | 3BAR | 9 | 3BAR | 8 | F_CHERRY | 0 | 3BAR | 13 | 3BAR | 15 |
| 11 | BLANK | 7 | BLANK | 7 | BLANK | 0 | BLANK | 9 | BLANK | 15 |
| 12 | 2BAR | 8 | 1BAR | 8 | 2BAR | 22 | 1BAR | 13 | 2BAR | 15 |
| 13 | BLANK | 2 | BLANK | 3 | BLANK | 5 | BLANK | 4 | BLANK | 3 |
| 14 | RED7 | 2 | RED7 | 4 | RED7 | 5 | RED7 | 4 | RED7 | 3 |
| 15 | BLANK | 2 | BLANK | 3 | BLANK | 5 | BLANK | 4 | BLANK | 3 |
| 16 | 2BAR | 7 | 1BAR | 10 | 2BAR | 22 | 1BAR | 11 | 2BAR | 12 |
| 17 | BLANK | 8 | BLANK | 12 | BLANK | 45 | BLANK | 5 | BLANK | 25 |
| 18 | 1BAR | 7 | 2BAR | 10 | 1BAR | 22 | 2BAR | 11 | 1BAR | 12 |
| 19 | BLANK | 2 | BLANK | 3 | BLANK | 3 | BLANK | 4 | BLANK | 3 |
| 20 | RED7 | 2 | RED7 | 3 | RED7 | 3 | RED7 | 4 | RED7 | 3 |
| 21 | BLANK | 2 | BLANK | 3 | BLANK | 3 | BLANK | 4 | BLANK | 3 |
| | | 257 | | 250 | | 283 | | 278 | | 280 |

FIG.44

CHANCE MODE SYMBOL RANDOM DETERMINATION TABLE (EXPECTING DEGREE LOW : SECOND SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 8 | 2BAR | 5 | 1BAR | 16 | 2BAR | 7 | 1BAR | 14 |
| 1 | BLANK | 2 | BLANK | 5 | BLANK | 5 | BLANK | 4 | BLANK | 3 |
| 2 | RED7 | 2 | RED7 | 6 | RED7 | 5 | RED7 | 4 | RED7 | 3 |
| 3 | BLANK | 2 | BLANK | 6 | BLANK | 5 | BLANK | 4 | BLANK | 3 |
| 4 | 3BAR | 7 | 3BAR | 5 | 3BAR | 15 | 3BAR | 7 | 3BAR | 14 |
| 5 | BLANK | 0 | BLANK | 2 | BLANK | 2 | BLANK | 2 | BLANK | 2 |
| 6 | CHERRY | 0 | CHERRY | 2 | CHERRY | 2 | CHERRY | 2 | CHERRY | 2 |
| 7 | BLANK | 0 | BLANK | 2 | BLANK | 2 | BLANK | 2 | BLANK | 2 |
| 8 | 2BAR | 6 | 1BAR | 22 | 2BAR | 15 | 1BAR | 14 | 2BAR | 15 |
| 9 | BLANK | 6 | BLANK | 15 | BLANK | 0 | BLANK | 7 | BLANK | 15 |
| 10 | 3BAR | 7 | 3BAR | 15 | F_CHERRY | 0 | 3BAR | 15 | 3BAR | 15 |
| 11 | BLANK | 8 | BLANK | 15 | BLANK | 0 | BLANK | 7 | BLANK | 17 |
| 12 | 2BAR | 8 | 1BAR | 15 | 2BAR | 20 | 1BAR | 14 | 2BAR | 15 |
| 13 | BLANK | 60 | BLANK | 110 | BLANK | 32 | BLANK | 55 | BLANK | 30 |
| 14 | RED7 | 60 | RED7 | 110 | RED7 | 40 | RED7 | 45 | RED7 | 40 |
| 15 | BLANK | 60 | BLANK | 110 | BLANK | 32 | BLANK | 55 | BLANK | 30 |
| 16 | 2BAR | 8 | 1BAR | 20 | 2BAR | 20 | 1BAR | 12 | 2BAR | 12 |
| 17 | BLANK | 8 | BLANK | 18 | BLANK | 47 | BLANK | 6 | BLANK | 25 |
| 18 | 1BAR | 8 | 2BAR | 20 | 1BAR | 20 | 2BAR | 12 | 1BAR | 15 |
| 19 | BLANK | 2 | BLANK | 6 | BLANK | 3 | BLANK | 5 | BLANK | 3 |
| 20 | RED7 | 2 | RED7 | 6 | RED7 | 3 | RED7 | 5 | RED7 | 3 |
| 21 | BLANK | 2 | BLANK | 6 | BLANK | 3 | BLANK | 5 | BLANK | 3 |
| | | 266 | | 521 | | 287 | | 289 | | 281 |

FIG.45

CHANCE MODE SYMBOL RANDOM DETERMINATION TABLE (EXPECTING DEGREE LOW : THIRD SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 8 | 2BAR | 5 | 1BAR | 15 | 2BAR | 8 | 1BAR | 15 |
| 1 | BLANK | 2 | BLANK | 5 | BLANK | 5 | BLANK | 4 | BLANK | 3 |
| 2 | RED7 | 2 | RED7 | 5 | RED7 | 5 | RED7 | 4 | RED7 | 3 |
| 3 | BLANK | 2 | BLANK | 5 | BLANK | 5 | BLANK | 4 | BLANK | 3 |
| 4 | 3BAR | 7 | 3BAR | 5 | 3BAR | 15 | 3BAR | 7 | 3BAR | 15 |
| 5 | BLANK | 0 | BLANK | 2 | BLANK | 6 | BLANK | 3 | BLANK | 2 |
| 6 | CHERRY | 0 | CHERRY | 2 | CHERRY | 6 | CHERRY | 3 | CHERRY | 2 |
| 7 | BLANK | 0 | BLANK | 2 | BLANK | 6 | BLANK | 3 | BLANK | 2 |
| 8 | 2BAR | 4 | 1BAR | 22 | 2BAR | 14 | 1BAR | 10 | 2BAR | 15 |
| 9 | BLANK | 4 | BLANK | 15 | BLANK | 0 | BLANK | 9 | BLANK | 15 |
| 10 | 3BAR | 4 | 3BAR | 14 | F.CHERRY | 0 | 3BAR | 11 | 3BAR | 15 |
| 11 | BLANK | 7 | BLANK | 13 | BLANK | 0 | BLANK | 9 | BLANK | 15 |
| 12 | 2BAR | 7 | 1BAR | 14 | 2BAR | 14 | 1BAR | 11 | 2BAR | 15 |
| 13 | BLANK | 2 | BLANK | 5 | BLANK | 3 | BLANK | 4 | BLANK | 3 |
| 14 | RED7 | 2 | RED7 | 5 | RED7 | 3 | RED7 | 4 | RED7 | 3 |
| 15 | BLANK | 2 | BLANK | 5 | BLANK | 3 | BLANK | 4 | BLANK | 3 |
| 16 | 2BAR | 5 | 1BAR | 20 | 2BAR | 20 | 1BAR | 10 | 2BAR | 10 |
| 17 | BLANK | 5 | BLANK | 18 | BLANK | 35 | BLANK | 7 | BLANK | 26 |
| 18 | 1BAR | 5 | 2BAR | 20 | 1BAR | 20 | 2BAR | 10 | 1BAR | 20 |
| 19 | BLANK | 65 | BLANK | 105 | BLANK | 35 | BLANK | 55 | BLANK | 30 |
| 20 | RED7 | 65 | RED7 | 110 | RED7 | 40 | RED7 | 45 | RED7 | 45 |
| 21 | BLANK | 65 | BLANK | 105 | BLANK | 35 | BLANK | 55 | BLANK | 30 |
| | | 263 | | 502 | | 285 | | 280 | | 290 |

FIG.46

CHANCE MODE SYMBOL RANDOM DETERMINATION TABLE (EXPECTING DEGREE LOW : FOURTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 5 | 2BAR | 14 | 1BAR | 12 | 2BAR | 8 | 1BAR | 12 |
| 1 | BLANK | 65 | BLANK | 115 | BLANK | 35 | BLANK | 55 | BLANK | 35 |
| 2 | RED7 | 65 | RED7 | 125 | RED7 | 35 | RED7 | 45 | RED7 | 50 |
| 3 | BLANK | 65 | BLANK | 115 | BLANK | 35 | BLANK | 55 | BLANK | 35 |
| 4 | 3BAR | 5 | 3BAR | 12 | 3BAR | 11 | 3BAR | 7 | 3BAR | 12 |
| 5 | BLANK | 0 | BLANK | 2 | BLANK | 12 | BLANK | 9 | BLANK | 10 |
| 6 | CHERRY | 0 | CHERRY | 2 | CHERRY | 13 | CHERRY | 9 | CHERRY | 9 |
| 7 | BLANK | 0 | BLANK | 2 | BLANK | 12 | BLANK | 9 | BLANK | 9 |
| 8 | 2BAR | 5 | 1BAR | 9 | 2BAR | 12 | 1BAR | 6 | 2BAR | 10 |
| 9 | BLANK | 4 | BLANK | 8 | BLANK | 0 | BLANK | 6 | BLANK | 9 |
| 10 | 3BAR | 4 | 3BAR | 9 | F_CHERRY | 0 | 3BAR | 6 | 3BAR | 9 |
| 11 | BLANK | 4 | BLANK | 8 | BLANK | 0 | BLANK | 6 | BLANK | 10 |
| 12 | 2BAR | 5 | 1BAR | 15 | 2BAR | 12 | 1BAR | 6 | 2BAR | 11 |
| 13 | BLANK | 2 | BLANK | 5 | BLANK | 5 | BLANK | 4 | BLANK | 3 |
| 14 | RED7 | 2 | RED7 | 6 | RED7 | 5 | RED7 | 4 | RED7 | 3 |
| 15 | BLANK | 2 | BLANK | 5 | BLANK | 5 | BLANK | 4 | BLANK | 3 |
| 16 | 2BAR | 4 | 1BAR | 14 | 2BAR | 16 | 1BAR | 10 | 2BAR | 13 |
| 17 | BLANK | 5 | BLANK | 12 | BLANK | 40 | BLANK | 9 | BLANK | 14 |
| 18 | 1BAR | 5 | 2BAR | 14 | 1BAR | 20 | 2BAR | 10 | 1BAR | 13 |
| 19 | BLANK | 2 | BLANK | 5 | BLANK | 3 | BLANK | 4 | BLANK | 3 |
| 20 | RED7 | 2 | RED7 | 5 | RED7 | 3 | RED7 | 4 | RED7 | 4 |
| 21 | BLANK | 2 | BLANK | 5 | BLANK | 3 | BLANK | 4 | BLANK | 3 |
| | | 253 | | 507 | | 289 | | 280 | | 280 |

FIG.47

CHANCE MODE SYMBOL RANDOM DETERMINATION TABLE (EXPECTING DEGREE LOW : FIFTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 5 | 2BAR | 14 | 1BAR | 12 | 2BAR | 5 | 1BAR | 10 |
| 1 | BLANK | 2 | BLANK | 5 | BLANK | 5 | BLANK | 5 | BLANK | 3 |
| 2 | RED7 | 2 | RED7 | 5 | RED7 | 5 | RED7 | 5 | RED7 | 3 |
| 3 | BLANK | 2 | BLANK | 5 | BLANK | 5 | BLANK | 5 | BLANK | 3 |
| 4 | 3BAR | 5 | 3BAR | 15 | 3BAR | 12 | 3BAR | 5 | 3BAR | 10 |
| 5 | BLANK | 0 | BLANK | 2 | BLANK | 20 | BLANK | 15 | BLANK | 14 |
| 6 | CHERRY | 0 | CHERRY | 2 | CHERRY | 20 | CHERRY | 15 | CHERRY | 14 |
| 7 | BLANK | 0 | BLANK | 2 | BLANK | 20 | BLANK | 15 | BLANK | 14 |
| 8 | 2BAR | 5 | 1BAR | 9 | 2BAR | 7 | 1BAR | 6 | 2BAR | 9 |
| 9 | BLANK | 4 | BLANK | 7 | BLANK | 0 | BLANK | 5 | BLANK | 9 |
| 10 | 3BAR | 4 | 3BAR | 8 | F_CHERRY | 0 | 3BAR | 4 | 3BAR | 8 |
| 11 | BLANK | 4 | BLANK | 7 | BLANK | 0 | BLANK | 5 | BLANK | 9 |
| 12 | 2BAR | 5 | 1BAR | 15 | 2BAR | 12 | 1BAR | 5 | 2BAR | 11 |
| 13 | BLANK | 65 | BLANK | 115 | BLANK | 38 | BLANK | 55 | BLANK | 35 |
| 14 | RED7 | 65 | RED7 | 125 | RED7 | 38 | RED7 | 45 | RED7 | 50 |
| 15 | BLANK | 65 | BLANK | 115 | BLANK | 38 | BLANK | 55 | BLANK | 35 |
| 16 | 2BAR | 4 | 1BAR | 14 | 2BAR | 13 | 1BAR | 6 | 2BAR | 12 |
| 17 | BLANK | 7 | BLANK | 15 | BLANK | 30 | BLANK | 5 | BLANK | 9 |
| 18 | 1BAR | 4 | 2BAR | 13 | 1BAR | 15 | 2BAR | 7 | 1BAR | 9 |
| 19 | BLANK | 2 | BLANK | 5 | BLANK | 3 | BLANK | 4 | BLANK | 3 |
| 20 | RED7 | 2 | RED7 | 6 | RED7 | 4 | RED7 | 5 | RED7 | 3 |
| 21 | BLANK | 2 | BLANK | 6 | BLANK | 3 | BLANK | 4 | BLANK | 3 |
| | | 254 | | 510 | | 300 | | 281 | | 276 |

FIG.48

CHANCE MODE SYMBOL RANDOM DETERMINATION TABLE (EXPECTING DEGREE LOW : SIXTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 3 | 2BAR | 11 | 1BAR | 12 | 2BAR | 5 | 1BAR | 12 |
| 1 | BLANK | 2 | BLANK | 5 | BLANK | 6 | BLANK | 4 | BLANK | 3 |
| 2 | RED7 | 2 | RED7 | 5 | RED7 | 7 | RED7 | 4 | RED7 | 3 |
| 3 | BLANK | 3 | BLANK | 5 | BLANK | 6 | BLANK | 4 | BLANK | 3 |
| 4 | 3BAR | 4 | 3BAR | 11 | 3BAR | 12 | 3BAR | 4 | 3BAR | 11 |
| 5 | BLANK | 0 | BLANK | 2 | BLANK | 20 | BLANK | 15 | BLANK | 15 |
| 6 | CHERRY | 0 | CHERRY | 2 | CHERRY | 20 | CHERRY | 15 | CHERRY | 15 |
| 7 | BLANK | 0 | BLANK | 2 | BLANK | 18 | BLANK | 15 | BLANK | 15 |
| 8 | 2BAR | 3 | 1BAR | 9 | 2BAR | 6 | 1BAR | 6 | 2BAR | 7 |
| 9 | BLANK | 4 | BLANK | 5 | BLANK | 0 | BLANK | 5 | BLANK | 9 |
| 10 | 3BAR | 3 | 3BAR | 9 | F_CHERRY | 0 | 3BAR | 5 | 3BAR | 8 |
| 11 | BLANK | 4 | BLANK | 5 | BLANK | 0 | BLANK | 5 | BLANK | 9 |
| 12 | 2BAR | 3 | 1BAR | 9 | 2BAR | 12 | 1BAR | 5 | 2BAR | 12 |
| 13 | BLANK | 2 | BLANK | 5 | BLANK | 4 | BLANK | 4 | BLANK | 3 |
| 14 | RED7 | 2 | RED7 | 5 | RED7 | 5 | RED7 | 4 | RED7 | 3 |
| 15 | BLANK | 2 | BLANK | 5 | BLANK | 4 | BLANK | 4 | BLANK | 3 |
| 16 | 2BAR | 3 | 1BAR | 11 | 2BAR | 12 | 1BAR | 4 | 2BAR | 11 |
| 17 | BLANK | 3 | BLANK | 9 | BLANK | 24 | BLANK | 5 | BLANK | 6 |
| 18 | 1BAR | 3 | 2BAR | 11 | 1BAR | 14 | 2BAR | 6 | 1BAR | 6 |
| 19 | BLANK | 70 | BLANK | 115 | BLANK | 45 | BLANK | 55 | BLANK | 40 |
| 20 | RED7 | 70 | RED7 | 130 | RED7 | 45 | RED7 | 45 | RED7 | 45 |
| 21 | BLANK | 70 | BLANK | 115 | BLANK | 45 | BLANK | 55 | BLANK | 40 |
| | | 256 | | 486 | | 317 | | 274 | | 279 |

FIG.49

CHANCE MODE SYMBOL RANDOM DETERMINATION TABLE (EXPECTING DEGREE LOW : SEVENTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 2 | 2BAR | 10 | 1BAR | 10 | 2BAR | 5 | 1BAR | 7 |
| 1 | BLANK | 80 | BLANK | 120 | BLANK | 50 | BLANK | 70 | BLANK | 40 |
| 2 | RED7 | 80 | RED7 | 145 | RED7 | 50 | RED7 | 45 | RED7 | 60 |
| 3 | BLANK | 80 | BLANK | 120 | BLANK | 50 | BLANK | 70 | BLANK | 40 |
| 4 | 3BAR | 2 | 3BAR | 10 | 3BAR | 10 | 3BAR | 5 | 3BAR | 7 |
| 5 | BLANK | 0 | BLANK | 2 | BLANK | 20 | BLANK | 20 | BLANK | 18 |
| 6 | CHERRY | 0 | CHERRY | 2 | CHERRY | 20 | CHERRY | 20 | CHERRY | 18 |
| 7 | BLANK | 0 | BLANK | 2 | BLANK | 20 | BLANK | 20 | BLANK | 18 |
| 8 | 2BAR | 2 | 1BAR | 5 | 2BAR | 5 | 1BAR | 2 | 2BAR | 6 |
| 9 | BLANK | 2 | BLANK | 5 | BLANK | 0 | BLANK | 2 | BLANK | 6 |
| 10 | 3BAR | 2 | 3BAR | 5 | F_CHERRY | 0 | 3BAR | 2 | 3BAR | 6 |
| 11 | BLANK | 2 | BLANK | 6 | BLANK | 0 | BLANK | 2 | BLANK | 6 |
| 12 | 2BAR | 2 | 1BAR | 5 | 2BAR | 5 | 1BAR | 4 | 2BAR | 11 |
| 13 | BLANK | 2 | BLANK | 5 | BLANK | 5 | BLANK | 4 | BLANK | 3 |
| 14 | RED7 | 2 | RED7 | 5 | RED7 | 5 | RED7 | 4 | RED7 | 3 |
| 15 | BLANK | 2 | BLANK | 5 | BLANK | 5 | BLANK | 4 | BLANK | 3 |
| 16 | 2BAR | 2 | 1BAR | 11 | 2BAR | 6 | 1BAR | 4 | 2BAR | 11 |
| 17 | BLANK | 2 | BLANK | 11 | BLANK | 15 | BLANK | 4 | BLANK | 9 |
| 18 | 1BAR | 2 | 2BAR | 11 | 1BAR | 6 | 2BAR | 4 | 1BAR | 9 |
| 19 | BLANK | 2 | BLANK | 5 | BLANK | 3 | BLANK | 4 | BLANK | 3 |
| 20 | RED7 | 2 | RED7 | 5 | RED7 | 3 | RED7 | 4 | RED7 | 3 |
| 21 | BLANK | 2 | BLANK | 5 | BLANK | 3 | BLANK | 4 | BLANK | 3 |
| | | 272 | | 500 | | 291 | | 303 | | 290 |

FIG.50

CHANCE MODE SYMBOL RANDOM DETERMINATION TABLE (EXPECTING DEGREE LOW : EIGHTH SPIN)

| | 1ST | | 2ND | | 3RD | | 4TH | | 5TH | |
|---|---|---|---|---|---|---|---|---|---|---|
| No. | SYMBOL | WEIGHT | SYMBOL | WEIGHT | SYMBOL | WEIGHT | SYMBOL | WEIGHT | SYMBOL | WEIGHT |
| 0 | 1BAR | 0 | 2BAR | 0 | 1BAR | 0 | 2BAR | 0 | 1BAR | 0 |
| 1 | BLANK | 0 | BLANK | 0 | BLANK | 0 | BLANK | 100 | BLANK | 120 |
| 2 | RED7 | 190 | RED7 | 190 | RED7 | 65 | RED7 | 52 | RED7 | 40 |
| 3 | BLANK | 0 | BLANK | 0 | BLANK | 0 | BLANK | 100 | BLANK | 120 |
| 4 | 3BAR | 0 | 3BAR | 0 | 3BAR | 0 | 3BAR | 0 | 3BAR | 0 |
| 5 | BLANK | 0 | BLANK | 0 | BLANK | 0 | BLANK | 0 | BLANK | 0 |
| 6 | CHERRY | 0 | CHERRY | 0 | CHERRY | 180 | CHERRY | 0 | CHERRY | 0 |
| 7 | BLANK | 0 | BLANK | 0 | BLANK | 0 | BLANK | 0 | BLANK | 0 |
| 8 | 2BAR | 0 | 1BAR | 0 | 2BAR | 0 | 1BAR | 0 | 2BAR | 0 |
| 9 | BLANK | 0 | BLANK | 0 | BLANK | 0 | BLANK | 0 | BLANK | 0 |
| 10 | 3BAR | 0 | 3BAR | 0 | F_CHERRY | 0 | 3BAR | 0 | 3BAR | 0 |
| 11 | BLANK | 0 | BLANK | 0 | BLANK | 0 | BLANK | 0 | BLANK | 0 |
| 12 | 2BAR | 0 | 1BAR | 0 | 2BAR | 0 | 1BAR | 0 | 2BAR | 0 |
| 13 | BLANK | 0 | BLANK | 0 | BLANK | 0 | BLANK | 4 | BLANK | 5 |
| 14 | RED7 | 35 | RED7 | 35 | RED7 | 17 | RED7 | 4 | RED7 | 2 |
| 15 | BLANK | 0 | BLANK | 0 | BLANK | 0 | BLANK | 4 | BLANK | 5 |
| 16 | 2BAR | 0 | 1BAR | 0 | 2BAR | 0 | 1BAR | 0 | 2BAR | 0 |
| 17 | BLANK | 0 | BLANK | 0 | BLANK | 0 | BLANK | 0 | BLANK | 0 |
| 18 | 1BAR | 0 | 2BAR | 0 | 1BAR | 0 | 2BAR | 0 | 1BAR | 0 |
| 19 | BLANK | 0 | BLANK | 0 | BLANK | 0 | BLANK | 4 | BLANK | 5 |
| 20 | RED7 | 35 | RED7 | 35 | RED7 | 18 | RED7 | 4 | RED7 | 2 |
| 21 | BLANK | 0 | BLANK | 0 | BLANK | 0 | BLANK | 4 | BLANK | 5 |
| | | 260 | | 260 | | 280 | | 276 | | 304 |

FIG.51

EFFECT COMBINATION TABLE (1)

| No. | EFFECT COMBINATION | | | | | COMBINATION CONDITION | | | | | | | |
|---|---|---|---|---|---|---|---|---|---|---|---|---|---|
| | START SOUND | BEFORE START OF ROTATION | START OF ROTATION | DURING ROTATION | STOP | A | B | C | D | E | F | G | H |
| 1 | — | — | — | — | — | 764 | 726 | 709 | 865 | 1665 | 1080 | 1440 | 1000 |
| 2 | 1-1 | — | — | — | — | 70 | 45 | 60 | 65 | 90 | 60 | 60 | 0 |
| 3 | 1-2 | — | — | — | — | 0 | 35 | 35 | 35 | 0 | 0 | 0 | 0 |
| 4 | 1-3 | — | — | — | — | 550 | 0 | 0 | 0 | 0 | 0 | 0 | 0 |
| 5 | 1-4 | — | — | — | — | 100 | 30 | 25 | 60 | 65 | 0 | 0 | 0 |
| 6 | — | 2-1 | — | — | — | 100 | 45 | 60 | 65 | 75 | 90 | 90 | 1000 |
| 7 | — | 2-2 | — | — | — | 100 | 45 | 60 | 65 | 75 | 90 | 90 | 1000 |
| 8 | — | 2-3 | — | — | — | 100 | 55 | 55 | 55 | 65 | 250 | 250 | 0 |
| 9 | — | 2-4 | — | — | — | 100 | 55 | 55 | 55 | 65 | 250 | 250 | 0 |
| 10 | — | 2-5 | — | — | — | 30 | 32 | 90 | 55 | 15 | 0 | 0 | 0 |
| 11 | — | 2-6 | — | — | — | 30 | 32 | 90 | 55 | 15 | 0 | 0 | 0 |
| 12 | — | — | 3-1 | — | — | 80 | 45 | 60 | 60 | 55 | 180 | 230 | 0 |
| 13 | — | — | 3-2 | — | — | 80 | 45 | 60 | 60 | 55 | 180 | 230 | 0 |
| 14 | — | — | 3-3 | — | — | 0 | 45 | 50 | 55 | 0 | 0 | 0 | 0 |
| 15 | — | — | — | 4-1 | — | 0 | 150 | 0 | 0 | 0 | 400 | 0 | 0 |
| 16 | — | — | — | 4-2 | — | 400 | 0 | 0 | 0 | 0 | 0 | 0 | 0 |
| 17 | — | — | — | — | 5-1 | 0 | 90 | 90 | 75 | 65 | 0 | 0 | 0 |
| 18 | 1-1 | — | — | 4-1 | — | 0 | 90 | 0 | 0 | 0 | 20 | 0 | 0 |
| 19 | 1-1 | — | — | 4-1 | 5-1 | 0 | 90 | 0 | 0 | 0 | 0 | 0 | 0 |
| 20 | 1-1 | — | — | 4-2 | — | 120 | 0 | 0 | 0 | 0 | 0 | 0 | 0 |
| 21 | 1-1 | — | — | — | 5-1 | 0 | 45 | 70 | 70 | 55 | 0 | 0 | 0 |
| 22 | 1-2 | — | — | — | 5-1 | 0 | 35 | 55 | 50 | 0 | 0 | 0 | 0 |
| 23 | 1-3 | — | — | — | 5-1 | 0 | 15 | 25 | 40 | 0 | 0 | 0 | 0 |
| 24 | — | 2-1 | — | — | 5-1 | 0 | 35 | 85 | 75 | 55 | 0 | 0 | 0 |
| 25 | — | 2-2 | — | — | 5-1 | 0 | 35 | 85 | 75 | 55 | 0 | 0 | 0 |
| 26 | — | 2-3 | — | — | 5-1 | 0 | 45 | 70 | 55 | 25 | 0 | 0 | 0 |
| 27 | — | 2-4 | — | — | 5-1 | 0 | 45 | 65 | 55 | 25 | 0 | 0 | 0 |
| 28 | — | 2-5 | — | — | 5-1 | 0 | 35 | 40 | 25 | 5 | 0 | 0 | 0 |
| 29 | — | 2-6 | — | — | 5-1 | 0 | 35 | 35 | 25 | 5 | 0 | 0 | 0 |
| 30 | — | — | 3-1 | — | 5-1 | 0 | 20 | 30 | 20 | 10 | 0 | 0 | 0 |
| 31 | — | — | 3-1 | 4-1 | — | 0 | 80 | 0 | 0 | 0 | 0 | 0 | 0 |
| 32 | — | — | 3-1 | 4-1 | 5-1 | 0 | 40 | 0 | 0 | 0 | 0 | 0 | 0 |
| 33 | — | — | 3-1 | 4-2 | — | 100 | 0 | 0 | 0 | 0 | 0 | 0 | 0 |

FIG.52

EFFECT COMBINATION TABLE (2)

| No. | EFFECT COMBINATION | | | | | COMBINATION CONDITION | | | | | | | |
|---|---|---|---|---|---|---|---|---|---|---|---|---|---|
| | START SOUND | BEFORE START OF ROTATION | START OF ROTATION | DURING ROTATION | STOP | A | B | C | D | E | F | G | H |
| 34 | - | - | 3-2 | - | 5-1 | 0 | 10 | 30 | 20 | 10 | 0 | 0 | 0 |
| 35 | - | - | 3-2 | 4-1 | - | 0 | 90 | 0 | 0 | 0 | 0 | 0 | 0 |
| 36 | - | - | 3-2 | 4-1 | 5-1 | 0 | 40 | 0 | 0 | 0 | 0 | 0 | 0 |
| 37 | - | - | 3-2 | 4-2 | - | 100 | 0 | 0 | 0 | 0 | 0 | 0 | 0 |
| 38 | - | - | 3-3 | - | 5-1 | 0 | 35 | 40 | 20 | 0 | 0 | 0 | 0 |
| 39 | - | - | - | 4-1 | 5-1 | 0 | 45 | 0 | 0 | 0 | 0 | 0 | 0 |
| 40 | - | - | - | - | 5-2 | 0 | 15 | 25 | 30 | 35 | 0 | 0 | 0 |
| 41 | - | - | - | - | 5-3 | 0 | 15 | 25 | 30 | 35 | 0 | 0 | 0 |
| 42 | - | 2-1 | 3-1 | - | - | 35 | 15 | 15 | 15 | 10 | 80 | 80 | 0 |
| 43 | - | 2-1 | 3-1 | - | 5-1 | 0 | 5 | 15 | 10 | 10 | 0 | 0 | 0 |
| 44 | - | 2-1 | 3-1 | - | 5-2 | 0 | 5 | 10 | 10 | 5 | 0 | 0 | 0 |
| 45 | - | 2-1 | 3-1 | - | 5-3 | 0 | 5 | 10 | 10 | 5 | 0 | 0 | 0 |
| 46 | - | 2-1 | 3-2 | - | - | 35 | 15 | 5 | 5 | 5 | 80 | 80 | 0 |
| 47 | - | 2-1 | 3-2 | - | 5-1 | 0 | 5 | 5 | 15 | 10 | 0 | 0 | 0 |
| 48 | - | 2-1 | 3-2 | - | 5-2 | 0 | 5 | 10 | 10 | 5 | 0 | 0 | 0 |
| 49 | - | 2-1 | 3-2 | - | 5-3 | 0 | 5 | 10 | 10 | 5 | 0 | 0 | 0 |
| 50 | - | 2-2 | 3-1 | - | - | 35 | 15 | 15 | 5 | 10 | 80 | 80 | 0 |
| 51 | - | 2-2 | 3-1 | - | 5-1 | 0 | 5 | 15 | 15 | 10 | 0 | 0 | 0 |
| 52 | - | 2-2 | 3-1 | - | 5-2 | 0 | 5 | 10 | 10 | 5 | 0 | 0 | 0 |
| 53 | - | 2-2 | 3-1 | - | 5-3 | 0 | 5 | 10 | 10 | 5 | 0 | 0 | 0 |
| 54 | - | 2-2 | 3-2 | - | - | 35 | 15 | 15 | 5 | 10 | 80 | 80 | 0 |
| 55 | - | 2-2 | 3-2 | - | 5-1 | 0 | 5 | 15 | 15 | 10 | 0 | 0 | 0 |
| 56 | - | 2-2 | 3-2 | - | 5-2 | 0 | 5 | 10 | 10 | 5 | 0 | 0 | 0 |
| 57 | - | 2-2 | 3-2 | - | 5-3 | 0 | 5 | 10 | 10 | 5 | 0 | 0 | 0 |
| 58 | - | 2-3 | 3-1 | - | - | 7 | 5 | 15 | 5 | 5 | 10 | 10 | 0 |
| 59 | - | 2-3 | 3-1 | - | 5-1 | 0 | 5 | 15 | 10 | 5 | 0 | 0 | 0 |
| 60 | - | 2-3 | 3-1 | - | 5-2 | 0 | 5 | 10 | 10 | 5 | 0 | 0 | 0 |
| 61 | - | 2-3 | 3-1 | - | 5-3 | 0 | 5 | 10 | 10 | 5 | 0 | 0 | 0 |
| 62 | - | 2-3 | 3-2 | - | - | 7 | 5 | 12 | 15 | 5 | 10 | 10 | 0 |
| 63 | - | 2-3 | 3-2 | - | 5-1 | 0 | 5 | 10 | 15 | 5 | 0 | 0 | 0 |
| 64 | - | 2-3 | 3-2 | - | 5-2 | 0 | 5 | 10 | 10 | 5 | 0 | 0 | 0 |
| 65 | - | 2-3 | 3-2 | - | 5-3 | 0 | 5 | 10 | 10 | 5 | 0 | 0 | 0 |
| 66 | - | 2-4 | 3-1 | - | - | 7 | 5 | 12 | 15 | 5 | 10 | 10 | 0 |

FIG.53

EFFECT COMBINATION TABLE (3)

| No. | EFFECT COMBINATION | | | | | COMBINATION CONDITION | | | | | | | |
|---|---|---|---|---|---|---|---|---|---|---|---|---|---|
| | START SOUND | BEFORE START OF ROTATION | START OF ROTATION | DURING ROTATION | STOP | A | B | C | D | E | F | G | H |
| 67 | - | 2-4 | 3-1 | - | 5-1 | 0 | 5 | 12 | 25 | 5 | 0 | 0 | 0 |
| 68 | - | 2-4 | 3-1 | - | 5-2 | 0 | 5 | 20 | 20 | 5 | 0 | 0 | 0 |
| 69 | - | 2-4 | 3-1 | - | 5-3 | 0 | 5 | 20 | 20 | 5 | 0 | 0 | 0 |
| 70 | - | 2-4 | 3-2 | - | - | 2 | 5 | 15 | 15 | 5 | 10 | 10 | 0 |
| 71 | - | 2-4 | 3-2 | - | 5-1 | 0 | 5 | 15 | 15 | 5 | 0 | 0 | 0 |
| 72 | - | 2-4 | 3-2 | - | 5-2 | 2 | 5 | 10 | 10 | 5 | 0 | 0 | 0 |
| 73 | - | 2-4 | 3-2 | - | 5-3 | 0 | 5 | 10 | 10 | 5 | 0 | 0 | 0 |
| 74 | - | 2-5 | 3-1 | - | - | 2 | 5 | 5 | 5 | 0 | 0 | 0 | 0 |
| 75 | - | 2-5 | 3-1 | - | 5-1 | 0 | 5 | 5 | 5 | 0 | 0 | 0 | 0 |
| 76 | - | 2-5 | 3-2 | - | - | 2 | 5 | 5 | 5 | 0 | 0 | 0 | 0 |
| 77 | - | 2-5 | 3-2 | - | 5-1 | 0 | 5 | 5 | 5 | 0 | 0 | 0 | 0 |
| 78 | - | 2-6 | 3-1 | - | - | 0 | 5 | 5 | 5 | 0 | 0 | 0 | 0 |
| 79 | - | 2-6 | 3-1 | - | 5-1 | 0 | 5 | 5 | 5 | 0 | 0 | 0 | 0 |
| 80 | - | 2-6 | 3-2 | - | - | 0 | 5 | 5 | 5 | 0 | 0 | 0 | 0 |
| 81 | - | 2-6 | 3-2 | - | 5-1 | 0 | 5 | 5 | 5 | 0 | 0 | 0 | 0 |
| 82 | 1-1 | - | - | - | 5-2 | 0 | 25 | 20 | 20 | 15 | 0 | 0 | 0 |
| 83 | 1-1 | - | - | - | 5-3 | 0 | 25 | 20 | 20 | 15 | 0 | 0 | 0 |
| 84 | - | 2-1 | - | - | 5-2 | 0 | 25 | 20 | 20 | 20 | 0 | 0 | 0 |
| 85 | - | 2-1 | - | - | 5-3 | 0 | 25 | 20 | 20 | 20 | 0 | 0 | 0 |
| 86 | - | 2-2 | - | - | 5-2 | 0 | 25 | 20 | 20 | 20 | 0 | 0 | 0 |
| 87 | - | 2-2 | - | - | 5-3 | 0 | 25 | 20 | 20 | 20 | 0 | 0 | 0 |
| 88 | - | 2-3 | - | - | 5-2 | 0 | 30 | 20 | 20 | 20 | 0 | 0 | 0 |
| 89 | - | 2-3 | - | - | 5-3 | 0 | 30 | 20 | 20 | 20 | 0 | 0 | 0 |
| 90 | - | 2-4 | - | - | 5-2 | 0 | 30 | 20 | 20 | 20 | 0 | 0 | 0 |
| 91 | - | 2-4 | - | - | 5-3 | 0 | 30 | 20 | 20 | 20 | 0 | 0 | 0 |
| 92 | - | 2-5 | - | - | 5-2 | 0 | 15 | 15 | 15 | 5 | 0 | 0 | 0 |
| 93 | - | 2-5 | - | - | 5-3 | 0 | 15 | 15 | 15 | 5 | 0 | 0 | 0 |
| 94 | - | 2-6 | - | - | 5-2 | 0 | 15 | 15 | 15 | 5 | 0 | 0 | 0 |
| 95 | - | 2-6 | - | - | 5-3 | 0 | 15 | 15 | 15 | 5 | 0 | 0 | 0 |
| 96 | - | - | 3-1 | - | 5-2 | 0 | 15 | 25 | 25 | 10 | 0 | 0 | 0 |
| 97 | - | - | 3-1 | - | 5-3 | 0 | 15 | 25 | 25 | 10 | 0 | 0 | 0 |
| 98 | - | - | 3-2 | - | 5-2 | 0 | 15 | 25 | 25 | 10 | 0 | 0 | 0 |
| 99 | - | - | 3-2 | - | 5-3 | 0 | 15 | 25 | 25 | 10 | 0 | 0 | 0 |

FIG.66

| REMAINING COUNT NUMBER | SECOND BY WHICH INCREMENT FOR ONE COUNT IS CARRIED OUT |
|---|---|
| 1~2 | ABOUT 2.10 SECONDS |
| 3 | ABOUT 1.70 SECONDS |
| 4 | ABOUT 1.30 SECONDS |
| 5 | ABOUT 1.20 SECONDS |
| 6~7 | ABOUT 1.00 SECONDS |
| 8~9 | ABOUT 0.80 SECONDS |
| 10~11 | ABOUT 0.70 SECONDS |
| 12 | ABOUT 0.60 SECONDS |
| 13~17 | ABOUT 0.50 SECONDS |
| 18~23 | ABOUT 0.40 SECONDS |
| 24~30 | ABOUT 0.30 SECONDS |
| 31~45 | ABOUT 0.24 SECONDS |
| 46~50 | ABOUT 0.18 SECONDS |
| 51~80 | ABOUT 0.16 SECONDS |
| 81~100 | ABOUT 0.13 SECONDS |
| 101 OR HIGHER | REWRITE |

FIG.67

| THRESHOLD | SECONDS |
|---|---|
| DECIMAL ODDS OF 1 OR LOWER | 0.5 SECOND |
| DECIMAL ODDS OF 1 TO LESS THAN 1.5 | 1 SECOND |
| DECIMAL ODDS OF 1.5 TO LESS THAN 2.5 | 2 SECONDS |
| DECIMAL ODDS OF 2.5 TO LESS THAN 3.5 | 3 SECONDS |
| DECIMAL ODDS OF 3.5 TO LESS THAN 4.5 | 4 SECONDS |
| DECIMAL ODDS OF 4.5 TO LESS THAN 5.5 | 5 SECONDS |
| DECIMAL ODDS OF 5.5 TO LESS THAN 6.5 | 6 SECONDS |
| DECIMAL ODDS OF 6.5 TO LESS THAN 7.5 | 7 SECONDS |
| DECIMAL ODDS OF 7.5 TO LESS THAN 8.5 | 8 SECONDS |
| DECIMAL ODDS OF 8.5 TO LESS THAN 9.5 | 9 SECONDS |
| DECIMAL ODDS OF 9.5 TO LESS THAN 10.5 | 10 SECONDS |
| DECIMAL ODDS OF 10.5 TO LESS THAN 11.5 | 11 SECONDS |
| DECIMAL ODDS OF 11.5 TO LESS THAN 12.5 | 12 SECONDS |
| DECIMAL ODDS OF 12.5 TO LESS THAN 13.5 | 13 SECONDS |
| DECIMAL ODDS OF 13.5 TO LESS THAN 14.5 | 14 SECONDS |
| DECIMAL ODDS OF 14.5 TO LESS THAN 15.5 | 15 SECONDS |
| DECIMAL ODDS OF 15.5 TO LESS THAN 16.5 | 16 SECONDS |
| DECIMAL ODDS OF 16.5 TO LESS THAN 17.5 | 17 SECONDS |
| DECIMAL ODDS OF 17.5 TO LESS THAN 18.5 | 18 SECONDS |
| DECIMAL ODDS OF 18.5 TO LESS THAN 19.5 | 19 SECONDS |
| DECIMAL ODDS OF 19.5 TO LESS THAN 20.5 | 20 SECONDS |
| DECIMAL ODDS OF 20.5 TO LESS THAN 21.5 | 21 SECONDS |
| DECIMAL ODDS OF 21.5 TO LESS THAN 22.5 | 22 SECONDS |
| DECIMAL ODDS OF 22.5 TO LESS THAN 23.5 | 23 SECONDS |
| DECIMAL ODDS OF 23.5 TO LESS THAN 24.5 | 24 SECONDS |
| DECIMAL ODDS OF 24.5 TO LESS THAN 25 | 25 SECONDS |
| DECIMAL ODDS OF 25 TO LESS THAN 50 | 30 SECONDS |
| DECIMAL ODDS OF 50 OR HIGHER | 35 SECONDS |

GAMING MACHINE CONDUCTING INDICATION EFFECT

CROSS REFERENCE TO RELATED APPLICATION

The present application claims priority from Japanese Patent Application No. 2012-015837, which was filed on Jan. 27, 2012, the disclosure of which is herein incorporated by reference in its entirety.

BACKGROUND OF THE INVENTION

1. Field of the Invention

The present invention relates to a gaming machine configured to rearrange symbols in each game and to award benefit when the rearranged symbols form a winning combination.

2. Description of Related Art

As an example of gaming machines, a slot machine that rearranges symbols on a symbol display device each time a player presses a button on a control panel has been known.

When the symbols rearranged on the symbol display device form a winning combination, the gaming machine awards benefit such as payout to the player.

A slot machine recited in U.S. Pat. No. 4,097,048 is an example of the gaming machine above. This slot machine has various symbol patterns, game scenarios, effects such as sound effects, and display patterns, in consideration of diverse tastes of players.

In the meanwhile, U.S. Pat. No. 4,508,345 recites a slot machine configured to execute a bonus game. Furthermore, U.S. Pat. No. 7,942,733 recites a slot machine which allows a player to play a free game under a specific condition. Furthermore, U.S. Pat. No. 7,871,327 recites a slot machine which is able to access TV programs, websites, and pay-per-view services.

As such, there have been various attempts to enhance the enjoyment in playing with gaming machines by not only allowing players to play basic games but also adding various factors. To enhance the enjoyment, what kinds of elements are added to games is therefore important in gaming machines.

An object of the present invention is to provide a gaming machine that offers more enjoyment.

SUMMARY OF THE INVENTION

The present invention relates to a gaming machine including:

a symbol display device configured to display a result of a game by rearranging a plurality of symbols; and a controller by which the game starts, the controller being programmed to execute the steps of:

(A) randomly determining the symbols to be rearranged on the symbol display device;

(B) determining a combination formed by the symbols determined in the step (A);

(C) based on the combination determined in the step (B), selecting an indication effect which is an effect executed before the symbols are rearranged on the symbol display device; and (D) executing the indication effect selected in the step (C).

According to this arrangement, an indication effect determined based on a combination of randomly determined symbols is executed before the rearrangement of the symbols. This makes it possible to provide a gaming machine which is capable of providing great enjoyment to the player.

The present invention relates to a gaming machine including:

a symbol display device configured to display a result of a game by rearranging a plurality of symbols;

an input device used for receiving an instruction regarding the game;

a notification device configured to execute an effect regarding the game; and a controller configured to start the game based on the instruction input to the input device and award a payout when a combination of the symbols rearranged on the symbol display device includes a winning combination, the controller being programmed to execute the steps of:

(A) randomly determining the symbols to be rearranged on the symbol display device;

(B) determining a combination formed by the symbols determined in the step (A);

(C) based on the combination determined in the step (B), selecting an indication effect to be executed before the symbols are rearranged on the symbol display device; and (D) executing the indication effect selected in the step (C) by the notification device.

According to this arrangement, an indication effect determined based on a combination of randomly determined symbols is executed before the rearrangement of the symbols. This makes it possible to provide a gaming machine which is capable of providing great enjoyment to the player.

The present invention relates to a gaming machine including:

a symbol display device having a payline and configured to display a result of a game by rearranging a plurality of symbols in a matrix manner;

an input device used for receiving an instruction regarding the game;

a notification device configured to execute an effect regarding the game;

a storage device configured to store a plurality of indication effects; and a controller configured to start the game based on the instruction input to the input device, and when a combination of the symbols rearranged on the symbol display device is a winning combination in which a predetermined number or more of symbols of a same kind are rearranged on the payline, award a payout in accordance with the winning combination, the controller being programmed to execute the steps of:

(A) randomly determining the symbols to be rearranged on the symbol display device;

(B) determining the combination formed by the symbols formed in the step (A);

(C) based on the combination determined in the step (B), selecting, from the indication effects, an indication effect to be executed before the symbols are rearranged on the symbol display device; and (D) executing the indication effect selected in the step (C) by the notification device.

According to this arrangement, an indication effect determined based on a combination of randomly determined symbols is executed before the rearrangement of the symbols. This makes it possible to provide a gaming machine which is capable of providing great enjoyment to the player.

The controller of the present invention executes the substeps of:

in the step (B), determining whether the symbols in the payline forming the combination are all specific symbols; and in the step (C), executing the step of selecting the indication effect when all of the symbols in the payline forming the combination are the specific symbols.

The controller of the present invention executes the sub-steps of:

in the step (B), determining whether the combination of the symbols is a combination in which the number of the specific symbols on the payline is one short of the predetermined number; and in the step (C), executing the step of selecting the indication effect when the combination of the symbols is the combination in which the number of the specific symbols on the payline is one short of the predetermined number.

The controller of the present invention executes the sub-steps of:

in the step (B), determining whether the combination of the symbols is a combination in which all of the symbols on the payline are of a same kind different from the specific symbol and with which a payout not smaller than a first payout amount is to be awarded; and in the step (C), executing the indication effect when the combination of the symbols is the combination in which all of the symbols on the payline are of a same kind different from the specific symbol and with which a payout not smaller than a first payout amount is to be awarded.

The controller of the present invention executes the sub-steps of:

in the step (B), determining whether the combination of the symbols is a combination with which a payout not smaller than a second payout amount is to be awarded; and in the step (C), selecting the indication effect when the combination of the symbols is the combination with which a payout not smaller than the second payout amount is to be awarded.

The present invention makes it possible to provide a gaming machine which is capable of providing greater enjoyment to the player.

BRIEF DESCRIPTION OF THE DRAWINGS

FIG. 25 shows a normal mode symbol random determination table.

FIG. 26 shows a expecting degree random determination table.

FIG. 27 shows a chance mode symbol random determination table.

FIG. 28 shows a chance mode symbol random determination table.

FIG. 29 shows a chance mode symbol random determination table.

FIG. 30 shows a chance mode symbol random determination table.

FIG. 31 shows a chance mode symbol random determination table.

FIG. 32 shows a chance mode symbol random determination table.

FIG. 33 shows a chance mode symbol random determination table.

FIG. 34 shows a chance mode symbol random determination table.

FIG. 35 shows a chance mode symbol random determination table.

FIG. 36 shows a chance mode symbol random determination table.

FIG. 37 shows a chance mode symbol random determination table.

FIG. 38 shows a chance mode symbol random determination table.

FIG. 39 shows a chance mode symbol random determination table.

FIG. 40 shows a chance mode symbol random determination table.

FIG. 41 shows a chance mode symbol random determination table.

FIG. 42 shows a chance mode symbol random determination table.

FIG. 43 shows a chance mode symbol random determination table.

FIG. 44 shows a chance mode symbol random determination table.

FIG. 45 shows a chance mode symbol random determination table.

FIG. 46 shows a chance mode symbol random determination table.

FIG. 47 shows a chance mode symbol random determination table.

FIG. 48 shows a chance mode symbol random determination table.

FIG. 49 shows a chance mode symbol random determination table.

FIG. 50 shows a chance mode symbol random determination table.

FIG. 51 shows an effect combination table.

FIG. 52 shows an effect combination table.

FIG. 53 shows an effect combination table.

FIG. 66 illustrates a table indicating relations between remaining count numbers and seconds.

FIG. 67 illustrates a table indicating relations between odds and seconds.

DESCRIPTION OF THE PREFERRED EMBODIMENTS (Outline of Gaming Machine)

The following will describe an embodiment of the present invention with reference to figures.

Figure 1:
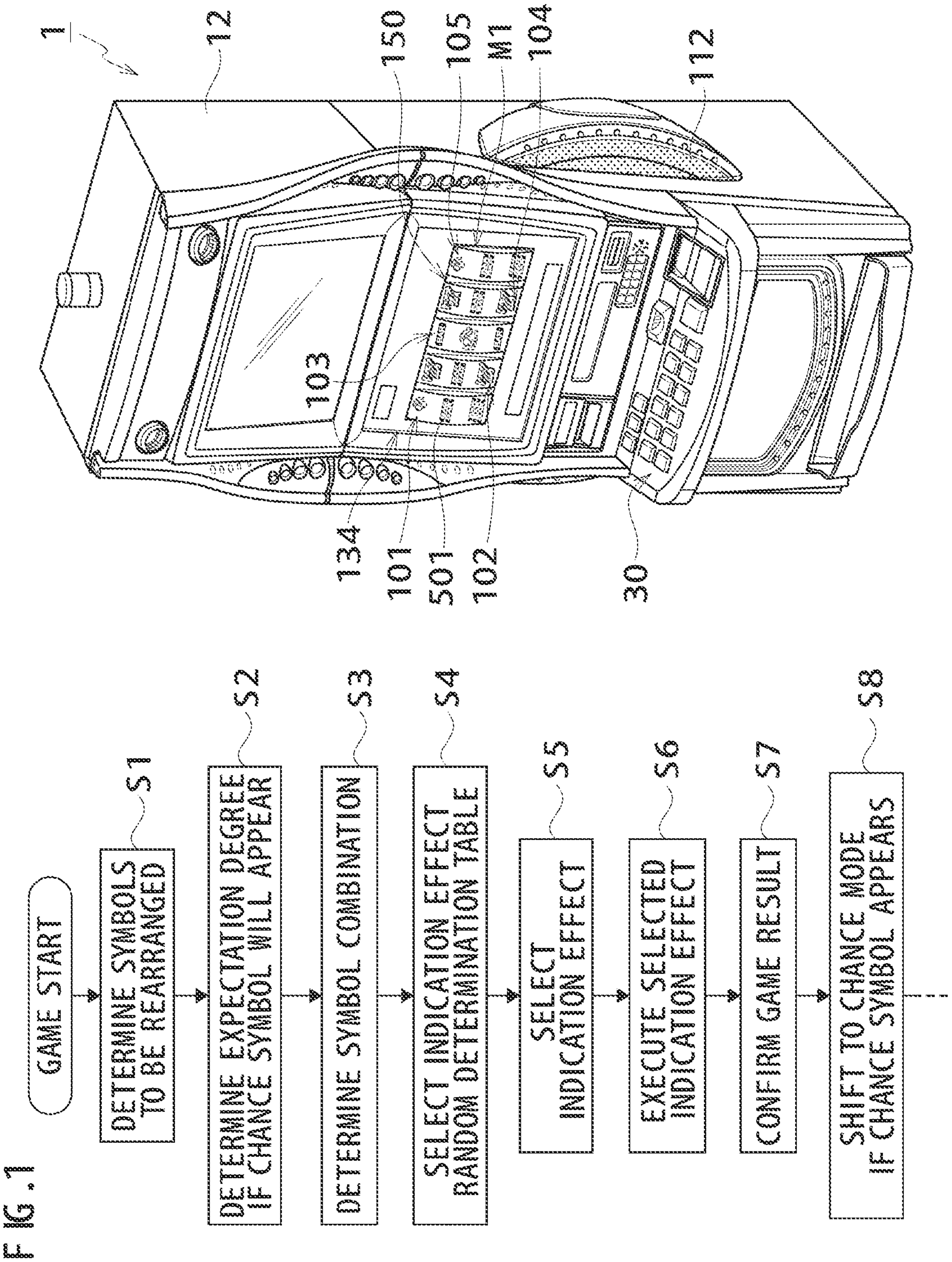
FIG. 1 illustrates the outline of a gaming machine.

As shown in FIG. 1, a gaming machine 1 includes a reel unit M1 as a symbol display device and a control panel 30 as an input device. Furthermore, the gaming machine 1 includes a liquid crystal display device 134, a speaker 112, a backlight unit M7, or the like as notification devices (effect executing devices). These devices are controlled by a controller 100 provided in the gaming machine 1. The controller 100 is constituted by components such as a later-described main CPU 71.

The control panel 30 allows a player to input instructions concerning a game. The reel unit M1 has a plurality of reels 100 (reels 101, 102, 103, 104, and 105) each having a plurality of symbols 501 on the outer circumferential surface. The symbols 501 are displayed to the outside through a display window 150. The reel unit M1 drivingly rotates each of the reels 101, 102, 103, 104, and 105 based on an instruction input to the control panel 30. As the reel unit M1 stops the rotation of the reels 101, 102, 103, 104, and 105, the symbols 501 are rearranged in a matrix manner and a combination is established.

Figure 3:
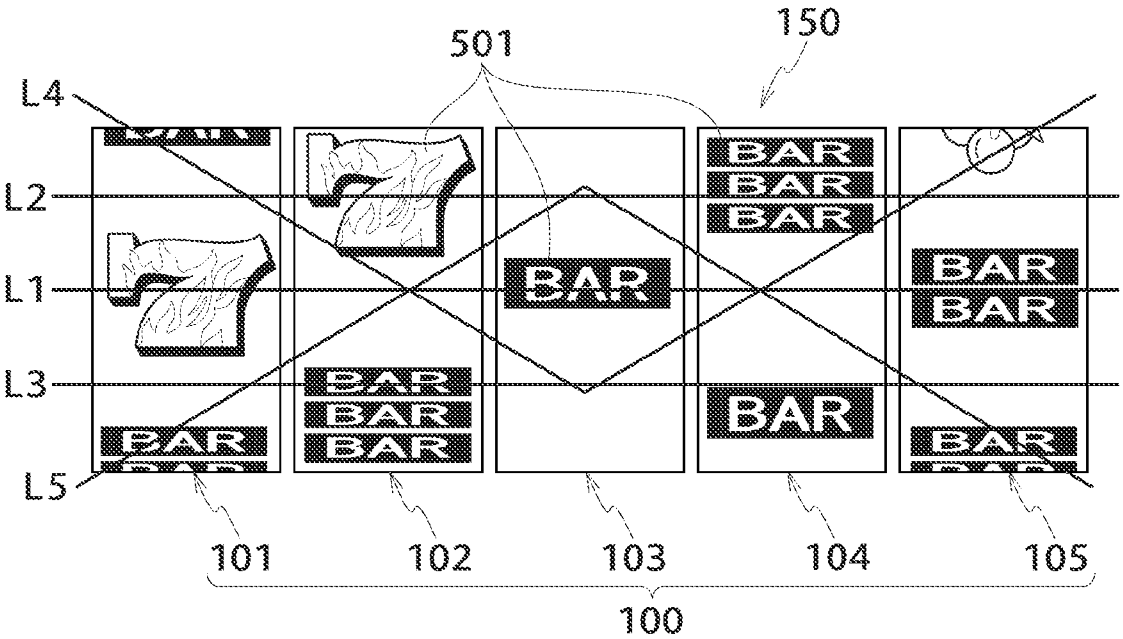
FIG. 3 shows paylines of the gaming machine.

The display window 150 is provided with paylines (L1 to L5) (see FIG. 3). When a combination of rearranged symbols 501 indicates that a predetermined number (three in the present embodiment) or more of the symbols of the same kind are rearranged on a payline, a winning combination is established and benefit such as payout is award to the player.

With the arrangement above, the controller 100 executes the following processes when a game starts in the gaming machine 1. To begin with, the controller 100 randomly determines symbols to be rearranged (S1). When it is determined that the rearranged symbols include a chance symbol, the controller 100 randomly determines an expecting degree (S2). The controller 100 specifies the combination of the rearranged symbols 501 (S3). The controller 100 selects an indication effect random determination table based on the specified combination (S4). In the indication effect random determination table, combinations of indication effects are associated with probabilities. The controller 100 selects an indication effect by using the selected indication effect random determination table (S5). The controller 100 controls the reel unit M1 (so as to rotate and stop the reels 101, 102, 103, 104, and 105) and executes the selected indication effect (S6). The controller 100 determines a game result and notifies the game result after the rotation of the reels 101, 102, 103, 104, and 105 is stopped (S7). When a chance symbol is included in the rearranged symbols, shifting from a normal mode to a chance mode is conducted, and a predetermined number of subsequent games are set as chance mode games.

As such, the gaming machine 1 of the present embodiment is characterized in that various types of indication effects are conducted based on randomly-determined rearranged symbols and shifting to the chance mode is conducted. This characteristic of the gaming machine 1 will be specifically described below.

(Function Flow)

Figure 2:
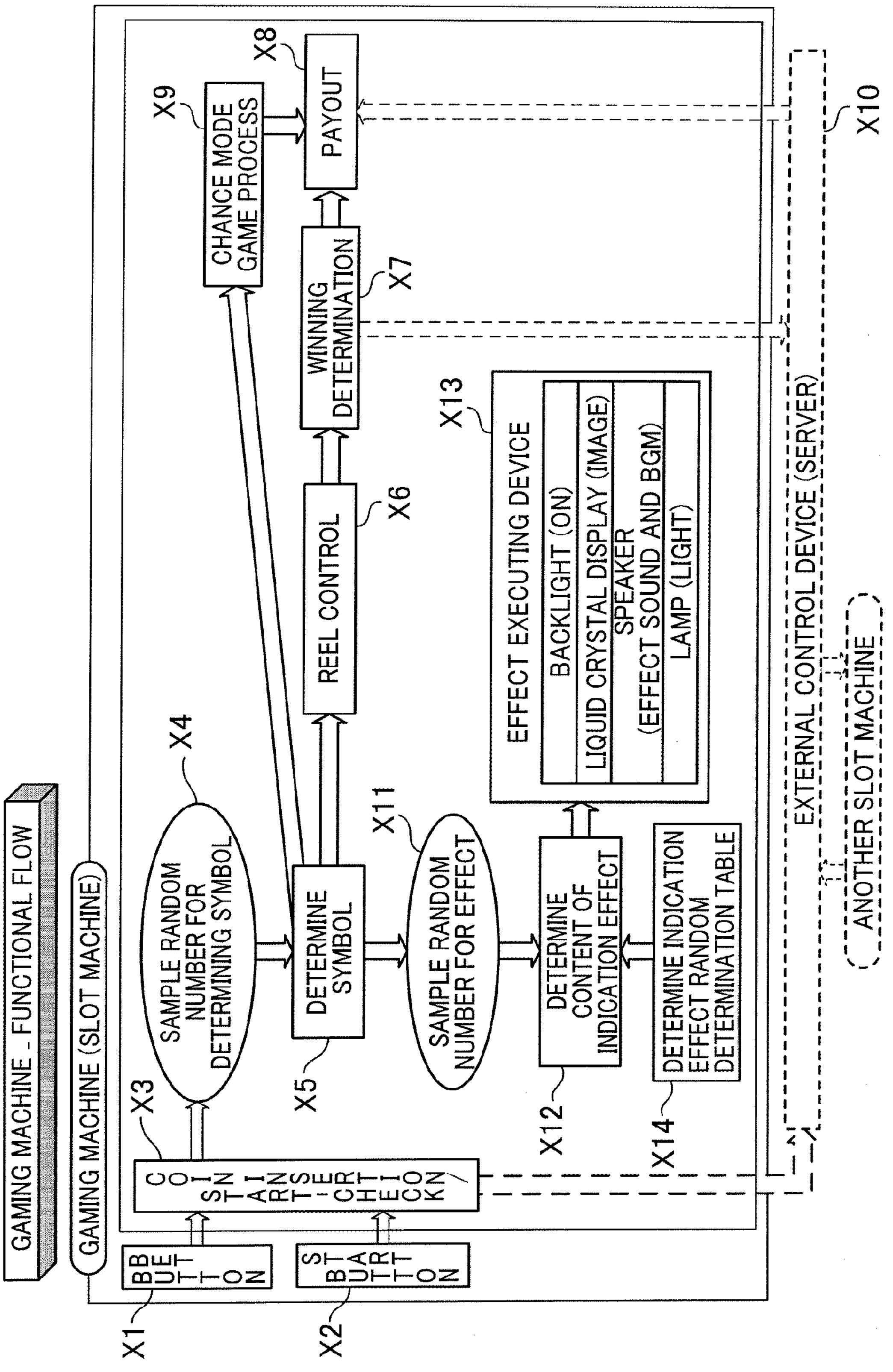
FIG. 2 illustrates a function flow of the gaming machine.

To begin with, the basic functions of the gaming machine of the present invention will be described with reference to FIG. 2.

(Coin-Insertion/Start-Check)

First, the gaming machine checks whether or not a BET button X1 has been pressed by a player, and subsequently checks whether or not a start button X2 has been pressed by the player (X3).

(Symbol Determination)

Next, when the start button X2 has been pressed by the player, the gaming machine extracts a random number for symbol determination (X4), and determines symbols to be displayed (rearranged) for the player at the time of stopping the scroll of reels, for respective reels (X5).

(Reel Control)

Thereafter, the gaming machine starts the rotation of each reel and stops the rotation of each reel so that the determined symbols are displayed for the player (X6).

(Winning Determination)

Subsequently, as the rotation of each reel is stopped, the gaming machine determines whether the combination of the symbols displayed for the player is a combination related to winning (X7).

(Payout)

When the combination of symbols displayed for the player is a combination related to winning, the gaming machine offers, to the player, prize (benefit) according to the combination (X8). For example, when a combination of symbols related to a payout of coins has been displayed, the gaming machine pays out coins of the number corresponding to the combination of symbols to the player.

When it is determined in X7 that a feature game trigger is established, the gaming machine may start a feature game process. In such a case, the benefit resulting from the feature game is awarded to the player.

Alternatively, in each game, the gaming machine may calculate the amount (amount for accumulation) to be accumulated to the amount of jackpot and transmit to an external controller X10. In such a case, as indicated by dotted lines in FIG. 2, a plurality of gaming machines are connected to the external controller X10. The external controller X10 adds the amount of accumulation sent from each gaming machine to the amount of jackpot, and the amount of accumulation (or a part thereof) is paid out to the player of the gaming machine having obtained the jackpot.

(Indication Effect)

The gaming machine extracts an effect random number (X11), and selects one indication effect random determination table from a plurality of indication effect random determination tables based on the randomly-determined symbols or the like (X14). Using the selected indication effect random determination table, the content of the indication effect is determined (X12). Based on the determined content of the indication effect, the gaming machine conducts the indication effect by illuminating each symbol on the reels by the backlight, displaying images on the liquid crystal display device, outputting light from a lamp, and/or outputting sound from a speaker (X13).

(Chance Mode)

In addition to the above, the gaming machine executes a chance mode game process (X9). That is to say, the gaming machine determines whether the symbols determined in X5 includes a chance symbol. When a chance symbol is included, subsequent games are executed in the chance mode.

(Details of Indication Effect)

Now, the indication effects executed in the present embodiment will be described.

An indication effect is an effect executed during a period from the start of a game to the determination of a game result. More specifically, the indication effect is executed at the timing to start a game in response to an input to the control panel 30 (i.e., the timing before the start of the rotation of the reels), at the timing to start the rotation of the reels 101, 102, 103, 104, and 105, during the rotation of the reels, at the timing to stop the rotation of the reels, or the like. The indication effect is executed by the speaker 112, the reel unit M1, the backlight unit M7, or the like.

In regard to the above, on the outer circumferential surface of each of the reels 101, 102, 103, 104, and 105, symbols 501 are depicted. These 11 symbols 501 are lined up along the rotational direction of the reels 101, 102, 103, 104, and 105 to form a symbol array. In the meanwhile, the display window 150 has regions (hereinafter, symbol rearrangement regions) where 15 symbols are rearranged, that form a matrix of three rows and five columns. Because a blank space exists between neighboring symbols 501 of the symbol array as shown in FIG. 3, the entirety of one or two symbol(s) 501 is viewable from the outside on each reel.

In addition to the above, five paylines L1, L2, L3, L4, and L5 are formed to connect the left end portion of the display window 150 with the right end portion thereof. The line connecting the central stages of the display window 150 with one another is a payline L1 indicating whether winning is established. Similarly, the line connecting the upper stages of the display window 150 with one another is a payline L2 and the line connecting the lower stages of the display window 150 with one another is a payline L3. Furthermore, The V-shaped line including diagonal lines each connecting the upper stage, the central stage, and the lower stage with one another is a payline L4, whereas the reverse V-shaped line is a payline L5.

Note that, in the present embodiment, the paylines L1, L2, L3, L4, and L5 are all activated in response to betting, irrespective of the bet amount. On the activated paylines L1, L2, L3, L4, and L5, various prizes may be established depending on combinations of the symbols 501. Alternatively, the number of activated paylines may be determined in accordance with the bet amount.

(Effects Before Start of Rotation of Reels: Backlight Unit)

To begin with, indication effects which may be executed by the backlight unit M7 before the start of the rotation of the reels will be described. The backlight unit M7 is provided on the inner circumference side of the reels 101, 102, 103, 104, and 105. In the backlight unit M7, three backlight sources M70 are vertically lined up. The backlight unit M7 is arranged so that illuminating light is emitted from the inner circumference side of the reels 101, 102, 103, 104, and 105 toward the outer circumferential surface side of the reels so that the illumination light passing through the outer circumferential surfaces of the reels is viewable from the outside of the display window 150. The backlight unit M7 is capable of individually illuminating each symbol rearrangement region. The backlight sources M70 of the backlight unit M7 are multicolor light sources having red, green, and blue light-emitting diodes. As such, the backlight unit M7 (light emission unit) which is one of the notification devices is provided in the reel unit M1 to be able to illuminate the symbols 501 with a plurality of colors. The reel unit M1 is able to produce indication effects with various notification patterns as described below, by controlling the light emission to the symbol rearrangement regions in various ways.

Figure 4:
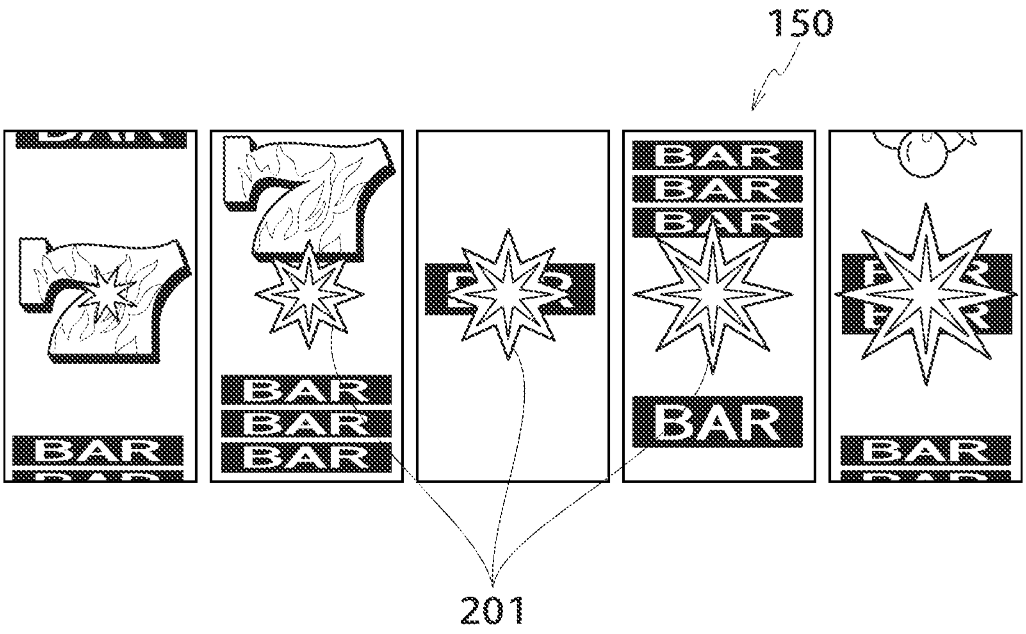
FIG. 4 shows an example of an indication effect of the gaming machine.

FIG. 4 shows an indication effect "Breeze". More specifically, the indication effect "Breeze" is conducted such that the symbol rearrangement regions at the central stage of each reel 100 are illuminated by the backlight unit M7 to display small and large spark-like illumination patterns 201 are displayed. The illumination patterns 201 are displayed on the reel 101, reel 102, reel 103, reel 104, reel 105 in this order, with different sizes. The size of the pattern 201 is determined by adjusting the output power of the backlight unit M7. With the arrangement above, the effect is produced as if the illumination pattern 201 passes through the central stages of the reels 100.

Figure 5:
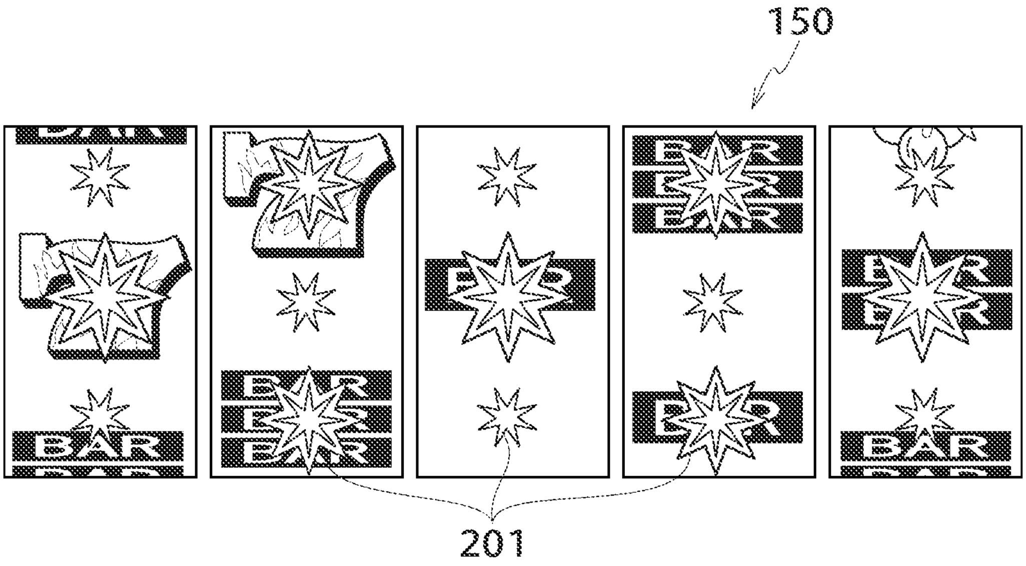
FIG. 5 shows an example of the indication effect of the gaming machine.

FIG. 5 shows an indication effect "Ripples". More specifically, in the indication effect "Ripples", spark-like illumination patterns 201 are displayed on all symbol rearrangement regions. Each illumination pattern 201 changes its size. As neighboring illumination patterns 201 change so as to be always opposite in size, the effect is produced on the display window 150 as if the illumination patterns 201 wave.

Figure 6:
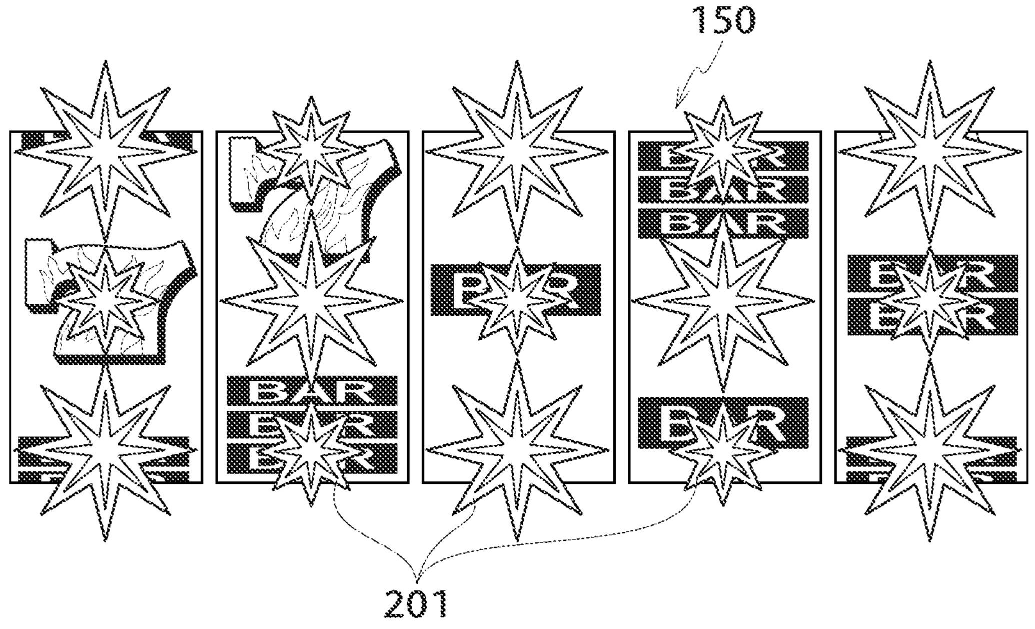
FIG. 6 shows an example of the indication effect of the gaming machine.

FIG. 6 shows an indication effect of "Flashing Light". More specifically, in the indication effect of "Flashing Light", spark-like illumination patterns 201 are displayed on all symbol rearrangement regions. The illumination patterns 201 are different in size and flicker. As such, the effect is produced as if flashing lights appear on the symbol rearrangement regions.

Figure 7:
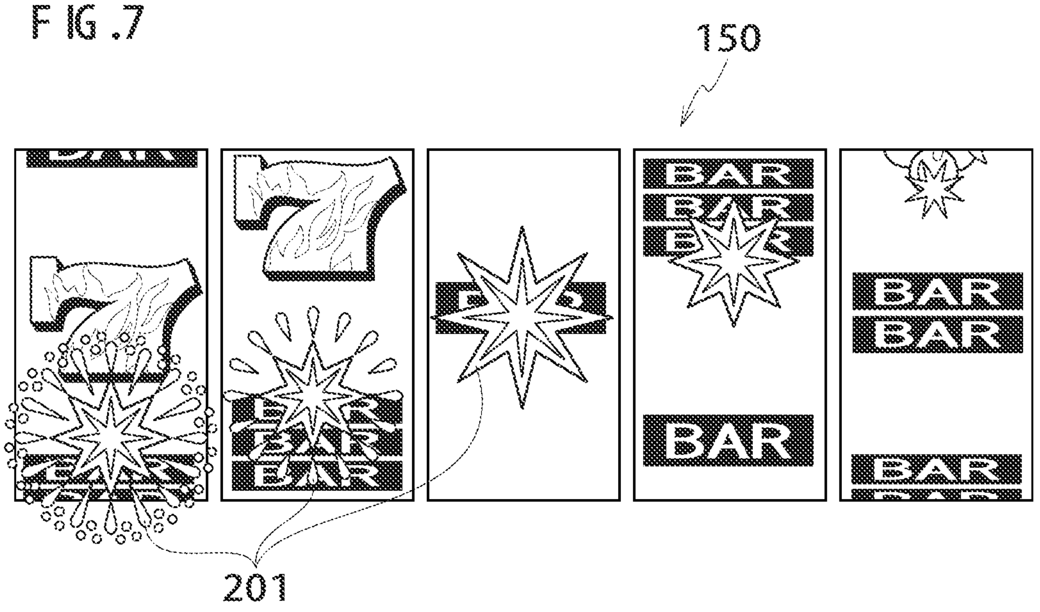
FIG. 7 shows an example of the indication effect of the gaming machine.

FIG. 7 shows an indication effect "Meteor". More specifically, in the indication effect of "Meteor", spark-like illumination patterns 201 are displayed on a linear line connecting the symbol rearrangement region on the upper stage of the reel 105 with the symbol rearrangement region on the lower stage of the reel 101. The illumination patterns 201 are serially displayed on the reel 105, the reel 104, the reel 103, the reel 102, and the reel 101 in this order. Furthermore, an illumination pattern 201 displayed later is larger than an illumination pattern 201 displayed earlier, so that the illuminating pattern 201 displayed on the reel 105 is the smallest whereas the illumination pattern 201 displayed on the reel 101 is the largest. With the arrangement above, the effect is produced as if a meteor leaves a trail behind it.

Figure 8:
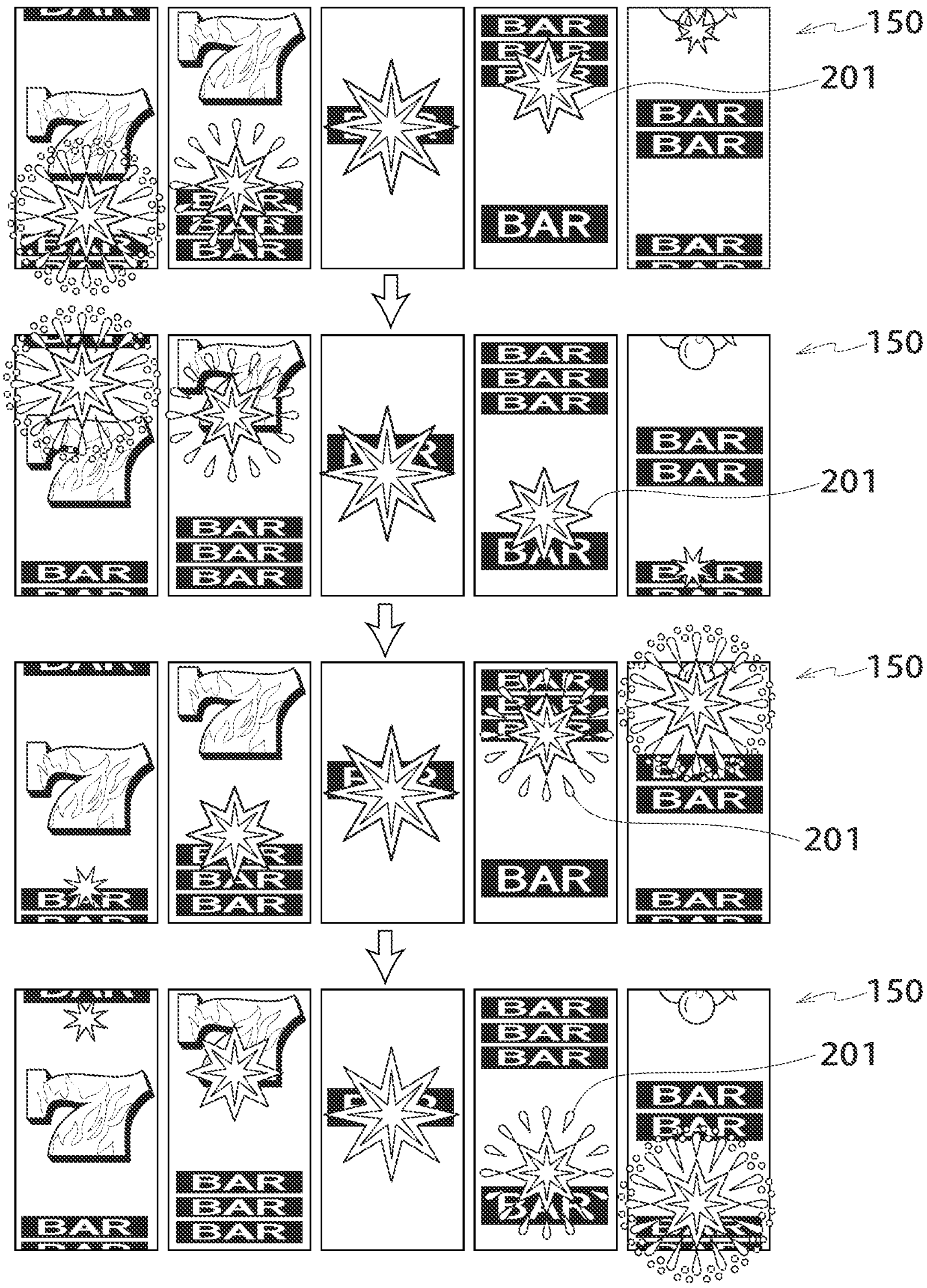
FIG. 8 shows an example of the indication effect of the gaming machine.

FIG. 8 shows an indication effect of "Meteors from Corners". More specifically, in the indication effect of "Meteors from Corners", first of all, spark-like illumination patterns 201 are displayed on a linear line connecting the symbol rearrangement region on the upper stage of the reel 105 with the symbol rearrangement region o the lower stage of the reel 101. The illumination patterns 201 are serially displayed on the reel 105, the reel 104, the reel 103, the reel 102, and the reel 101 in this order. Furthermore, an illumination pattern 201 displayed later is larger than an illumination pattern 201 displayed earlier, so that the illuminating pattern 201 displayed on the reel 105 is the smallest whereas the illumination pattern 201 displayed on the reel 101 is the largest.

Moreover, spark-like illumination patterns 201 are displayed on a linear line connecting the symbol rearrangement region on the lower stage of the reel 105 with the symbol rearrangement region on the upper stage of the reel 101. The illumination patterns 201 are serially displayed on the reel 105, the reel 104, the reel 103, the reel 102, and the reel 101 in this order. Furthermore, an illumination pattern 201 displayed later is larger than an illumination pattern 201 displayed earlier, so that the illuminating pattern 201 displayed on the reel 105 is the smallest whereas the illumination pattern 201 displayed on the reel 101 is the largest.

Moreover, spark-like illumination patterns 201 are displayed on a linear line connecting the symbol rearrangement region on the lower stage of the reel 101 with the symbol rearrangement region on the upper stage of the reel 105. The illumination patterns 201 are serially displayed on the reel 101, the reel 102, the reel 103, the reel 104, and the reel 105 in this order. Furthermore, an illumination pattern 201 displayed later is larger than an illumination pattern 201 displayed earlier, so that the illuminating pattern 201 displayed on the reel 101 is the smallest whereas the illumination pattern 201 displayed on the reel 105 is the largest.

Moreover, spark-like illumination patterns 201 are displayed on a linear line connecting the symbol rearrangement region on the upper stage of the reel 101 with the symbol rearrangement region on the lower stage of the reel 105. The illumination patterns 201 are serially displayed on the reel 105, the reel 104, the reel 103, the reel 102, and the reel 101 in this order. Furthermore, an illumination pattern 201 displayed later is larger than an illumination pattern 201 displayed earlier, so that the illuminating pattern 201 displayed on the reel 105 is the smallest whereas the illumination pattern 201 displayed on the reel 101 is the largest.

With the arrangement above, the effect is produced as if meteors come from the four corners.

Figure 9:
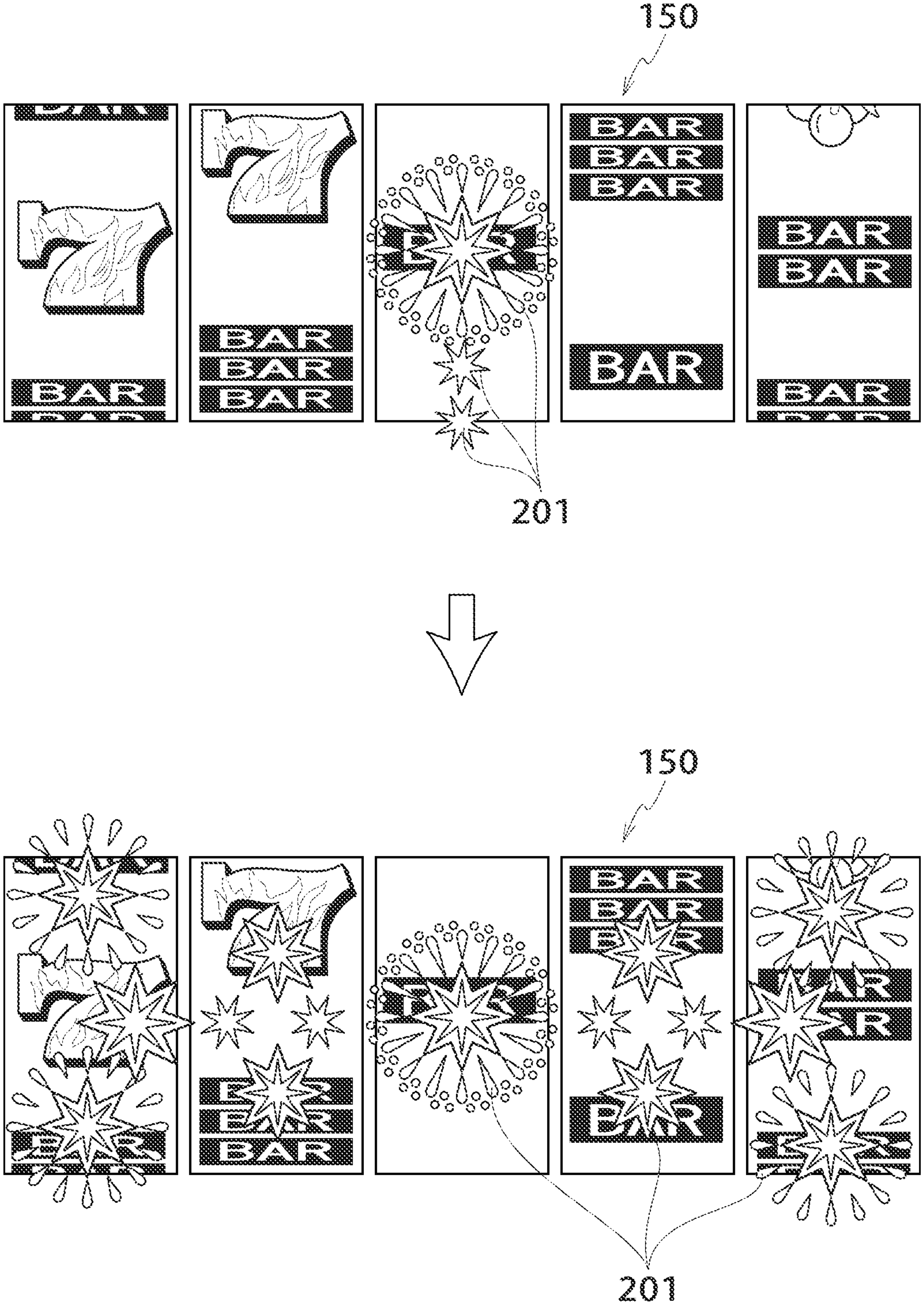
FIG. 9 shows an example of the indication effect of the gaming machine.

FIG. 9 shows an indication effect of "Fireworks". More specifically, in the indication effect of "Fireworks", first of all, spark-like illumination patterns 201 are displayed on a linear line connecting the symbol rearrangement region on the lower stage of the reel 103 with the symbol rearrangement region on the central stage of the reel 103. The illumination patterns 201 are displayed on the lower stage and then on the central stage. Furthermore, the size of the illumination pattern 201 on the central stage of the reel 103 is larger than the other illumination patterns 201.

Furthermore, the spark-like illumination patterns 201 are displayed on the symbol rearrangement region of the lower stage of the reel 103 and then on the symbol rearrangement regions on the upper, central, and lower stages of the reels 101 and 105 in a radial manner. With the arrangement above, the effect is produced as if a skyrocket explodes.

Figure 10:
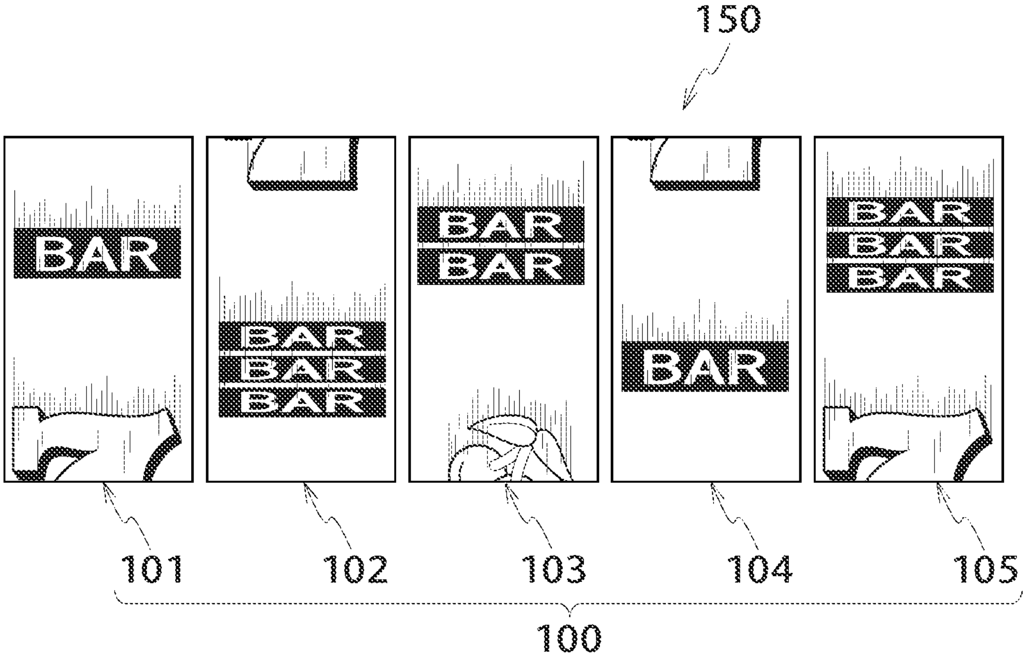
FIG. 10 shows an example of the indication effect of the gaming machine.

After such an indication effect is conducted before the start of the rotation of the reels, the rotation of each reel 100 shown in FIG. 10 starts.

(Effects at Start of Rotation of Reels: Speaker)

Now, the following will describe indication effects that may be carried out by the speaker 112 at the start of the rotation of the reels. In the present embodiment, when no indication effect is conducted at the start of the rotation of the reels, effect sound (normal reel spinning sound) indicating that the rotation has started is output from the speaker 112 at the start of the rotation of the reels 100 shown in FIG. 10. In connection with the indication effects, the following notifications are carried out.

First of all, an indication effect of outputting normal reel spinning sound at a delayed time is possible. More specifically, while the normal reel spinning sound is typically output at the start of the rotation of the reels 100, data containing no sound (i.e., silent data) is output at the start of the rotation of the reels 100 and then the normal reel spinning sound is output based on the data of the normal reel spinning sound. With this arrangement, the normal reel spinning sound is output after the start of the rotation of the reels 100. Alternatively, while the normal reel spinning sound is typically output at the start of the rotation of the reels 100, the normal reel spinning sound is output at a delayed time by simply outputting the sound after the start of the rotation of the reels 100.

In addition to the above, an indication effect of outputting special reel spinning sound different from the normal reel spinning sound is possible. More specifically, the special reel spinning sound is, for example, louder than the normal reel spinning sound or is explosion sound.

In addition to the above, an indication effect of outputting voice indicating "chance symbol", which is different from the normal reel spinning sound, is possible. For example, because the chance symbol in the present embodiment is "Cherry", voice pronouncing "cherry chance" (cherry chance voice) is output.

In addition to the above, an indication effect of muting the normal reel spinning sound is possible. Note that, in the present embodiment, the background music typically output while the reels 100 are rotated is also muted.

(Effects in Rotation of Reels: Reel Unit and Backlight Unit)

Now, indication effects that may be conducted by the reel unit M1 or the liquid crystal display device 134 in response to the rotation of the reels will be described. In the present embodiment, when no indication effect is conducted during the rotation of the reels, as shown in FIG. 10, all reels 100 start to rotate downward together and the reel 101, the reel 102, the reel 103, the reel 104, and the reel 105 stop the rotation one by one in this order. In the meanwhile, according to an indication effect, the reels 100 operate in accordance with a movement pattern below.

Figure 11:
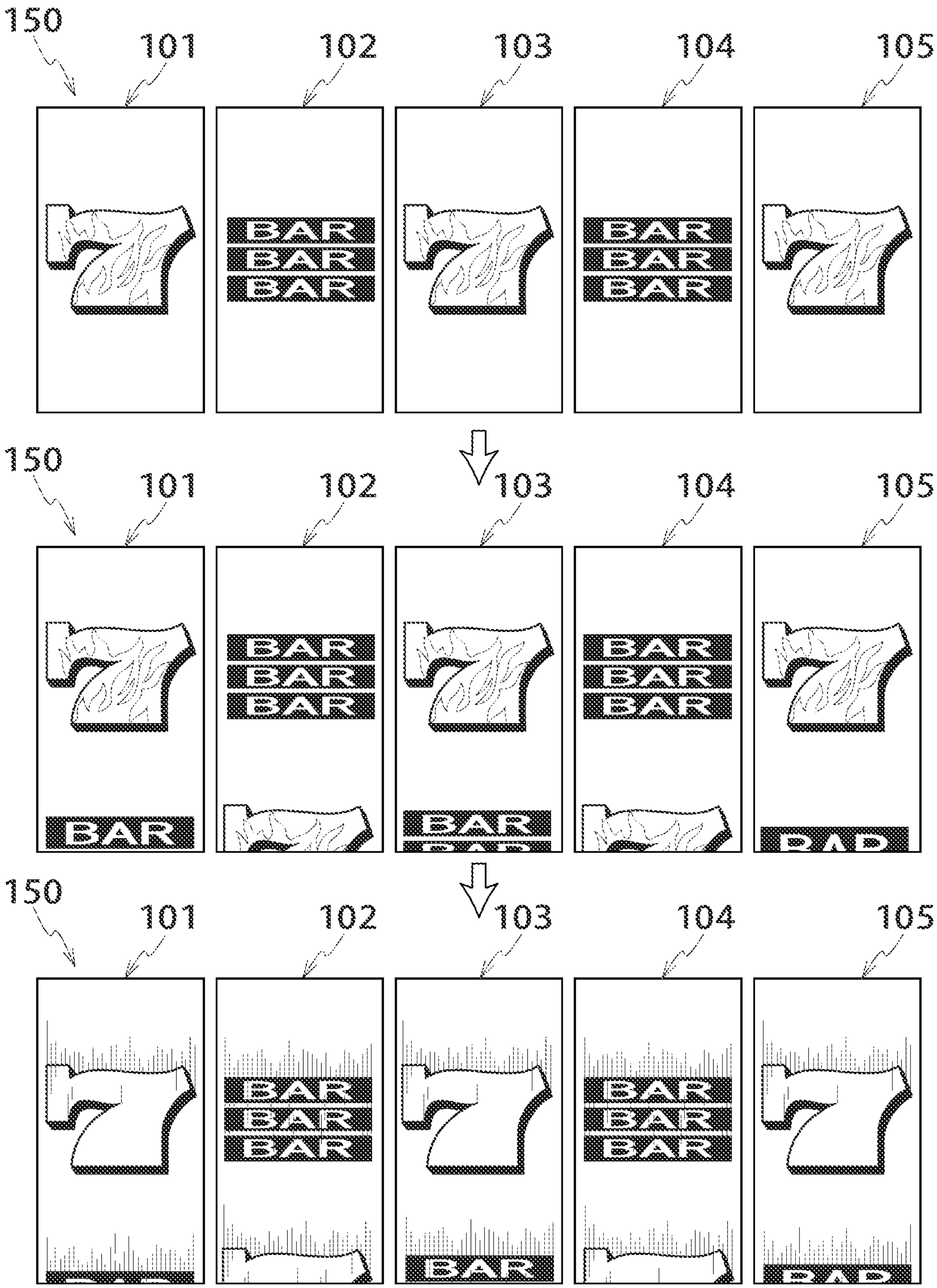
FIG. 11 shows an example of the indication effect of the gaming machine.

FIG. 11 shows an indication effect of "Reel Upward Movement Then Forward Rotation". In the indication effect of "Reel Upward Movement Then Forward Rotation", when a game starts in response to an input to the control panel 30, the reels 100 move upward a little and then start the downward scroll together. According to the present embodiment, each reel 100 rotates upward by five steps under the control of a stepper motor.

Figure 12:
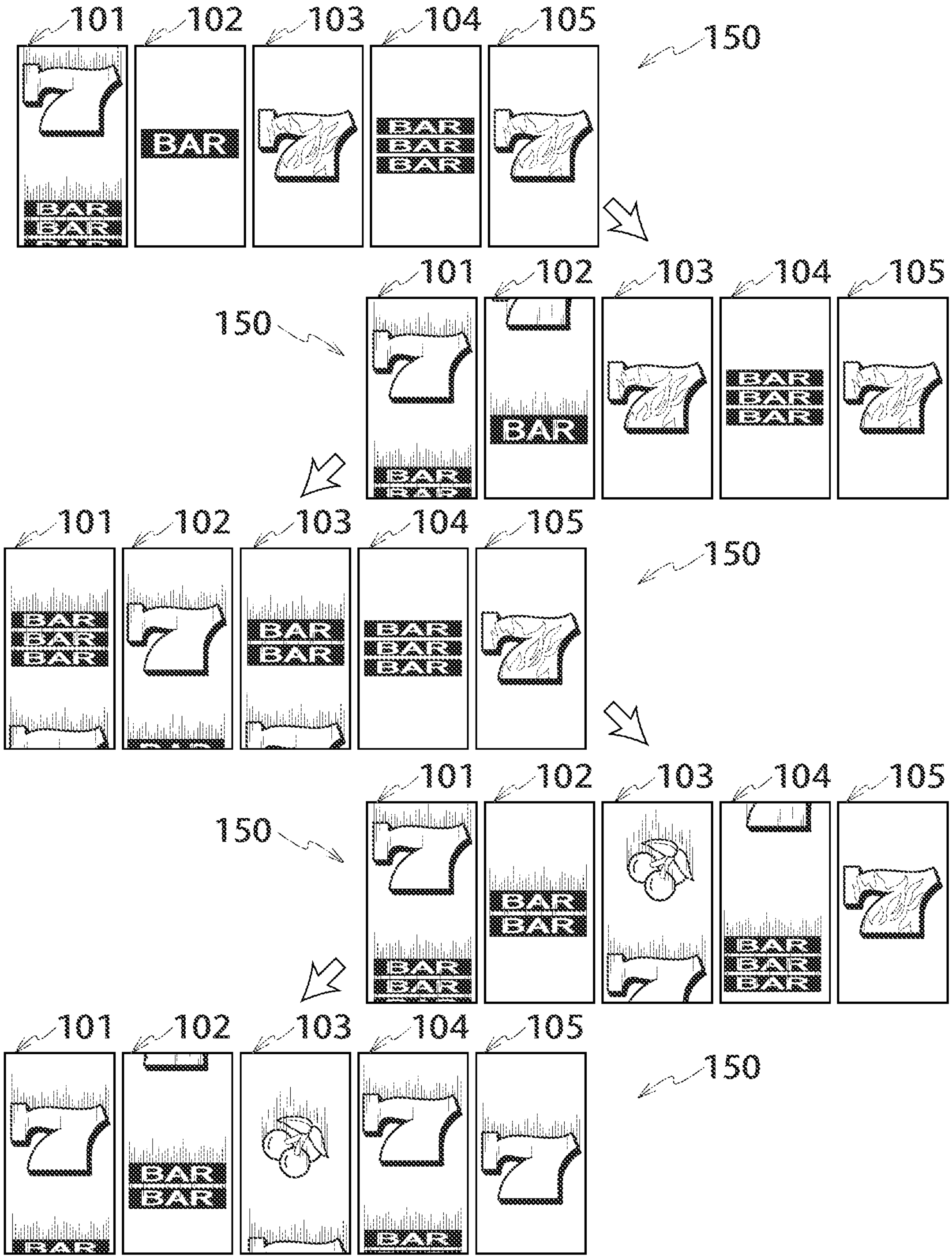
FIG. 12 shows an example of the indication effect of the gaming machine.

FIG. 12 shows an indication effect of "Reel Sequential Rotation". In the indication effect of "Reel Sequential Rotation", when a game starts in response to an input to the control panel 30, The reels 100 serially start the rotation. More specifically, the reel 101, the reel 102, the reel 103, the reel 104, and the reel 105 serially start the rotation in this order.

Figure 13:
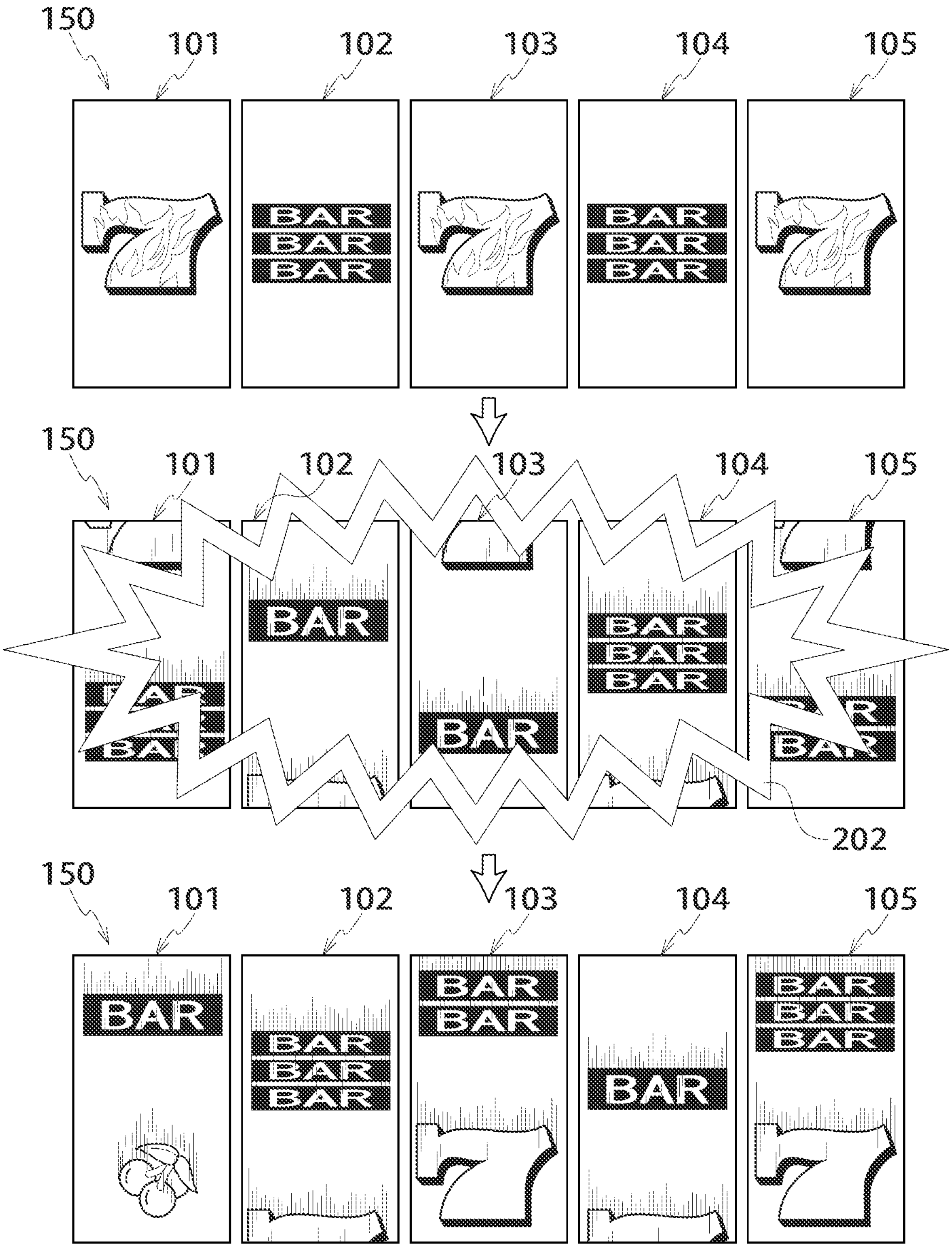
FIG. 13 shows an example of the indication effect of the gaming machine.

FIG. 13 shows an indication effect of "Entire Flash". In the indication effect of "Entire Flash", an entire illumination pattern 202 is displayed so that all symbol rearrangement regions of the display window 150 sparkle. It is noted that the reel unit M1 conducts normal control. Then the reels 100 conducts normal rotation. Although not illustrated, the entire illumination pattern 202 is displayed with rainbow gradation covering the entirety of the display window 150. It is noted that the indication effect of "Entire Flash" may be embodied as an effect image.

(Effect During Rotation of Reels: Backlight Unit)

Now, indication effects that may be conducted by the backlight unit M7 during the rotation of the reels will be described.

Figure 14:
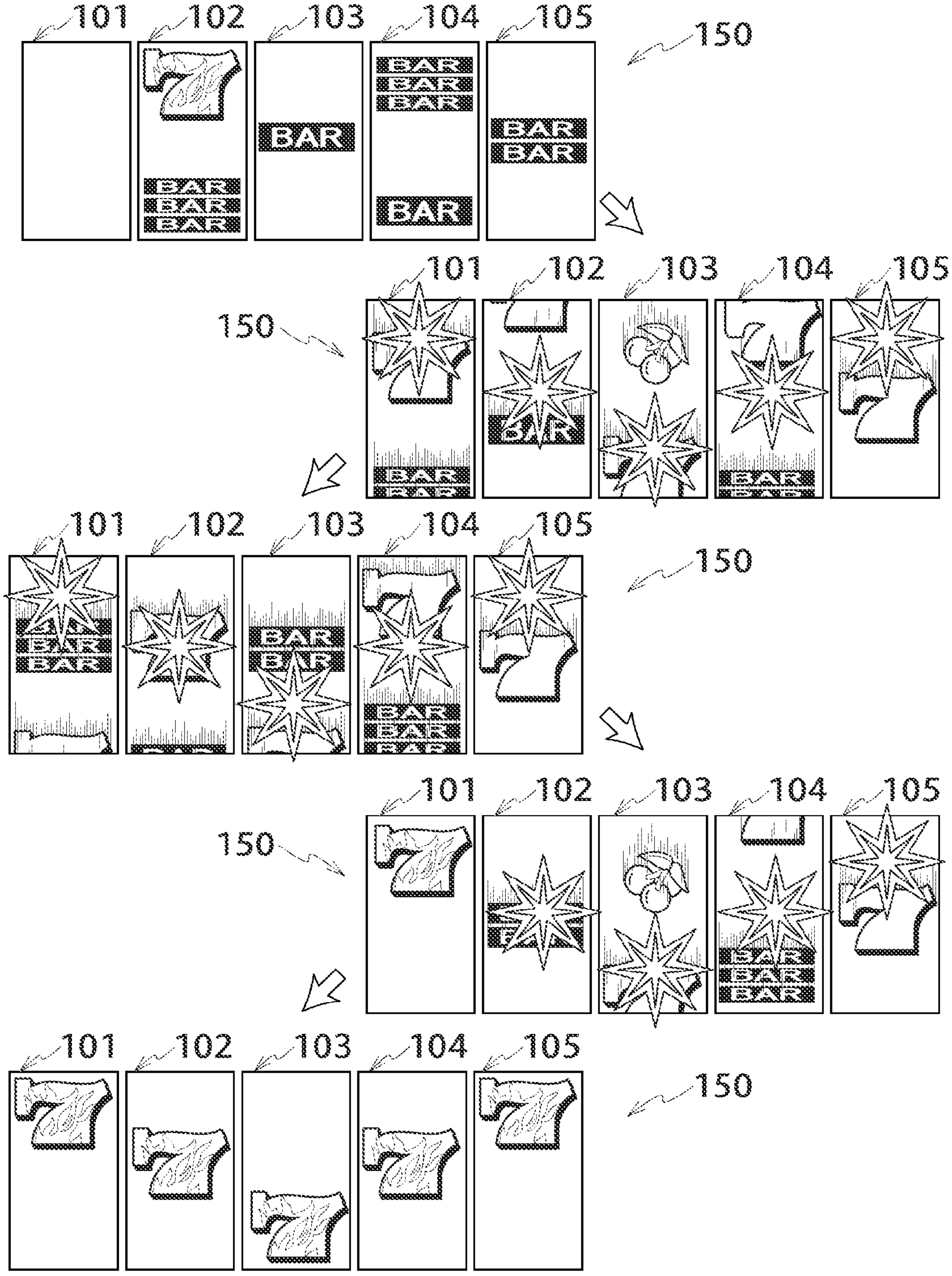
FIG. 14 shows an example of the indication effect of the gaming machine.

FIG. 14 shows an indication effect of "5-Kind Indication". The indication effect of "5-Kind Indication" may be conducted when the symbols of the same kind are rearranged on all symbol rearrangement regions of a payline. It is noted that the case where the symbols of the same kind are rearranged on all symbol rearrangement regions of a payline is termed "5-Kind". Similarly, the case where four symbols of the same kind are rearranged on a payline is termed "4-Kind", the case where three symbols are rearranged is termed "3-Kind", and the case where two symbols are rearranged is termed "2-Kind".

More specifically, when a game starts in response to an input to the control panel 30, the symbol rearrangement regions of the payline where the 5-Kind has been achieved is illuminated by the backlight unit M7. Alternatively, the symbol rearrangement regions are illuminated with a flickering illumination pattern, for example. Alternatively, in addition to the illumination above, the regions other than the symbol rearrangement regions of the payline where the 5-Kind is achieved are darkened. The symbols of the same kind are rearranged on the illuminated symbol rearrangement regions of the reel 101, the reel 102, the reel 103, the reel 104, and the reel 105 in this order. In the case of FIG. 14, the symbols of "RED7" are rearranged on all symbol rearrangement regions on the payline L5.

Figure 15:
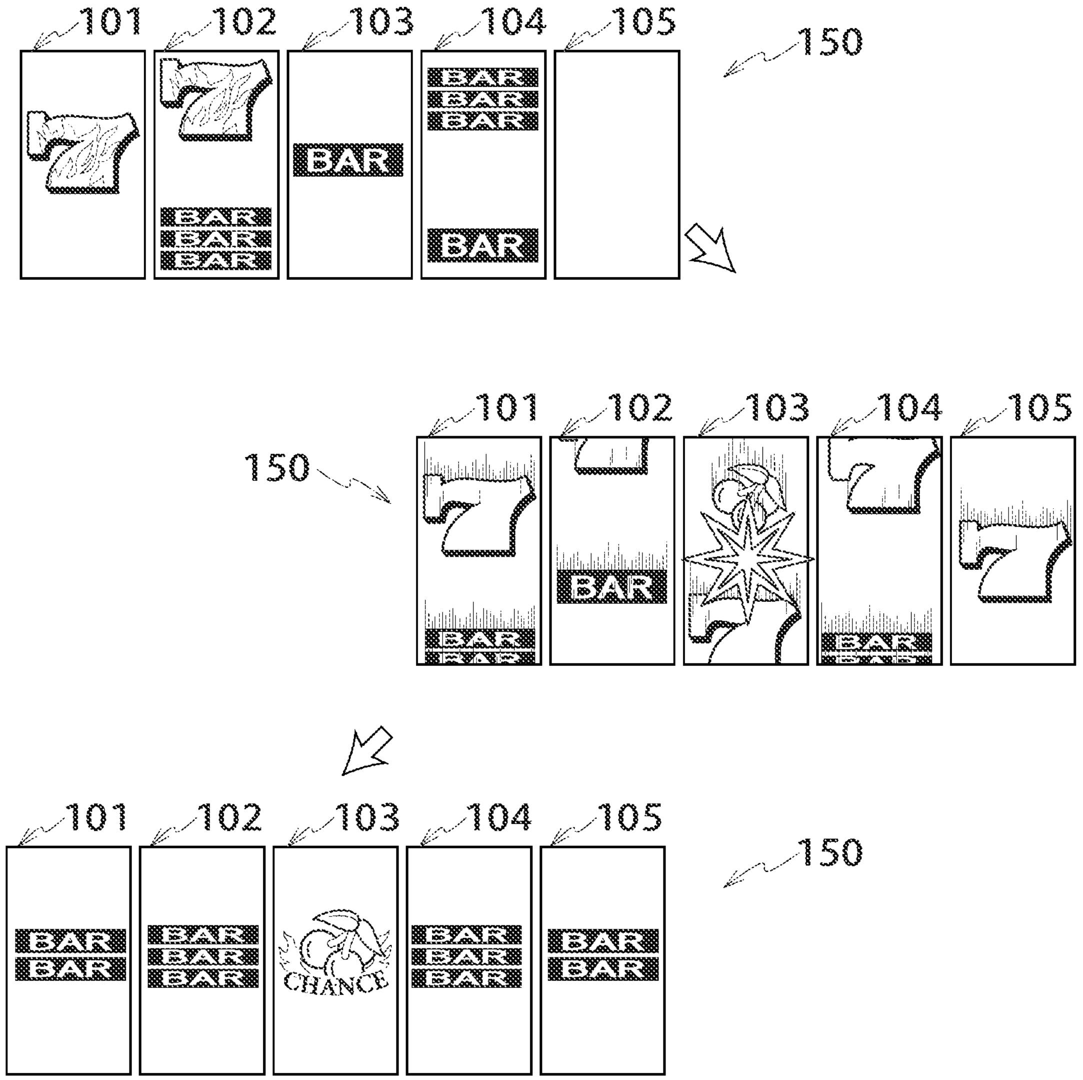
FIG. 15 shows an example of the indication effect of the gaming machine.

FIG. 15 shows an indication effect of "Cherry Chance Indication". The indication effect of "Cherry Chance Indication" may be conducted when a chance symbol is rearranged on any symbol rearrangement region. In the present embodiment, the chance symbol is included only in the symbol array of the reel 103.

More specifically, when a game starts in response to an input to the control panel 30, the symbol rearrangement region where the chance symbol is rearranged is illuminated by the backlight unit M7. Alternatively, the symbol rearrangement region is illuminated with a flickering illumination pattern, for example. Alternatively, in addition to the illumination above, the regions other than the symbol rearrangement region where the chance symbol is rearranged are darkened. Then the rotation of the reel 101, the reel 102, the reel 103, the reel 104, and the reel 105 is stopped in this order and the chance symbol is rearranged on the illuminated symbol rearrangement region. In the case of FIG. 15, the symbol of "Cherry Chance" is rearranged on the symbol rearrangement region of the central stage of the reel 103.

When the chance symbol is rearranged, later-described random determination of an expecting degree is carried out and one of "Red", "Yellow", and "Blue" is selected in accordance with the determined expecting degree. After the symbols 501 are rearranged, the symbol rearrangement region where the symbol of "Cherry Chance" has stopped and the upper and lower parts of each reel 100 are illuminated by the backlight unit M7 with light having the selected color.

It is noted that, the selected color relates to the probability of the establishment of a winning combination concerning the symbol of "RED7" in a chance game mode that starts in a game subsequent to the rearrangement of the chance symbol. More specifically, the shifting from the normal mode to the chance mode occurs in the game subsequent to the game in which the chance symbol is rearranged. Then the random determination table used for the random determination of the symbols is changed from the normal mode symbol random determination table to the chance mode symbol random determination table. In the table for the chance mode, the probability of establishing a winning combination concerning the symbol of "RED7" is higher than the probability in the table for the normal mode. More specifically, the probability in the expecting degree of "Yellow" is higher than the probability in the expecting degree of "Blue", and the probability of the expecting degree of "Red" is higher than the probability of the expecting degree of "Yellow".

Furthermore, while the chance mode is constituted by eight games at most, the probability of establishing a winning combination concerning the symbol of "RED7" tends to increase each time the number of games is counted in the chance mode. The chance mode ends when a second specific symbol (the "Cherry" symbol in the present embodiment) is rearranged in any symbol rearrangement region, and the normal mode is recovered. In other words, when the second specific symbol is rearranged in the chance mode, a process to end the chance mode is executed.

Figure 16:
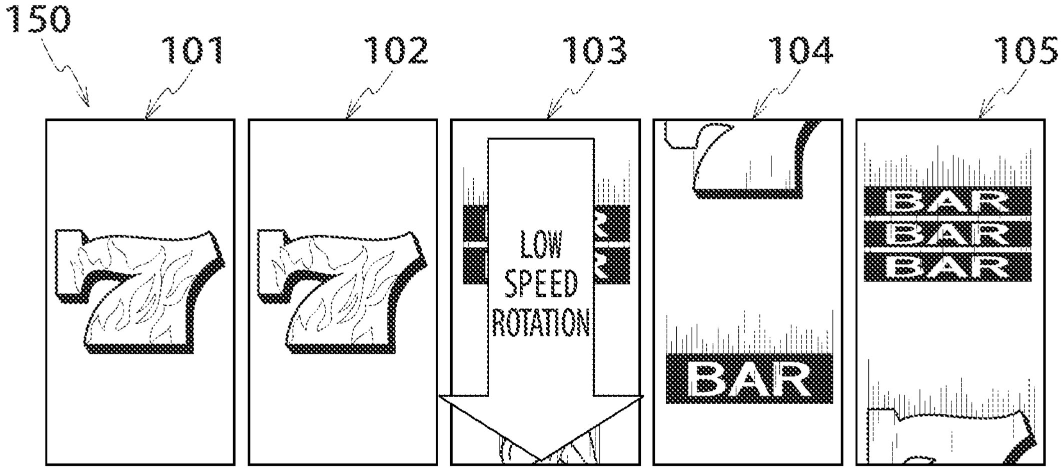
FIG. 16 shows an example of the indication effect of the gaming machine.
Figure 17:
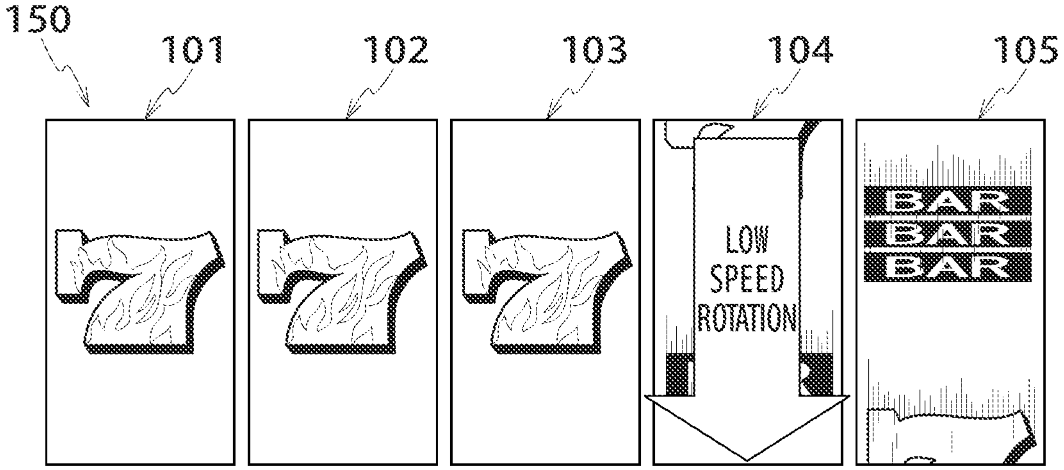
FIG. 17 shows an example of the indication effect of the gaming machine.
Figure 18:
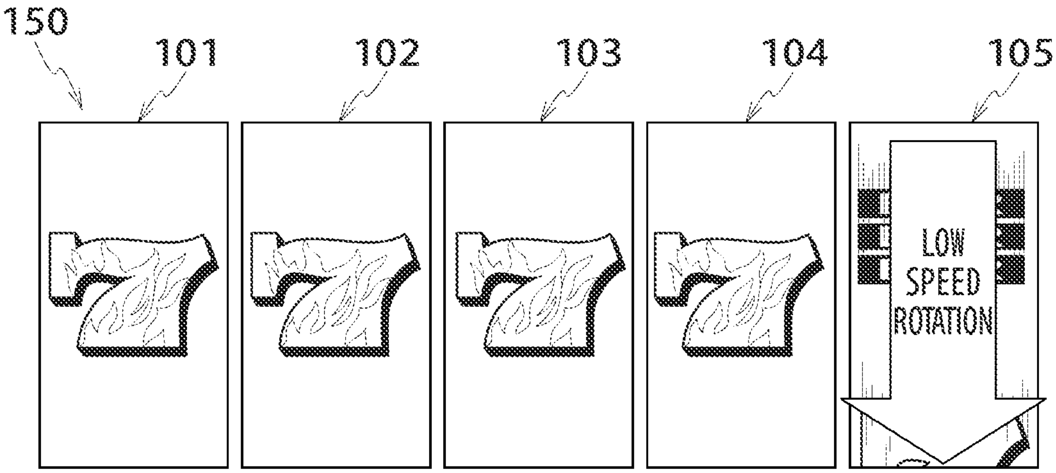
FIG. 18 shows an example of the indication effect of the gaming machine.

FIGS. 16 to 18 show an indication effect of "Low-Speed Long Li-Zhi". The indication effect of "Low-Speed Long Li-Zhi" may be conducted when the number of the first specific symbols (the symbols of "RED7" in the present embodiment) rearranged on any payline becomes one short of a predetermined number.

More specifically, FIG. 16 shows the indication effect of "Low-Speed Long Li-Zhi" at the third reel. When only the reel 101 and the reel 102 have stopped, two symbols of "RED7" are rearranged on the payline L1. Therefore the awarding of a payout is confirmed when a symbol of "RED7" is rearranged on the reel 103 on the payline L1. In this state, in the indication effect of "Low-Speed Long Li-Zhi" at the third reel, the reel 103 rotates at a slower speed than normal.

In addition to the above, FIG. 17 shows the indication effect of "Low-Speed Long Li-Zhi" at the fourth reel. When the reel 101, the reel 102, and the reel 103 have stopped, three symbols of "RED7" are rearranged on the payline L1 after the indication effect of "Low-Speed Long Li-Zhi" at the third reel is conducted. That is to say, when the symbol of "RED7" is rearranged on the reel 104 on the payline L1, the payout is higher than the payout in the case of the rearrangement of three symbols of "RED7". In this state, the reel 104 rotates at a slower speed than normal in the indication effect of "Low-Speed Long Li-Zhi" at the fourth reel.

In addition to the above, FIG. 18 shows the indication effect of "Low-Speed Long Li-Zhi" at the fifth reel. When the reel 101, the reel 102, the reel 103, and the reel 104 have stopped, four symbols of "RED7" are rearranged on the payline L1 after the indication effect of "Low-Speed Long Li-Zhi" at the third reel and the indication effect of "Low-Speed Long Li-Zhi" at the fourth reel. That is to say, when a symbol of "RED7" is rearranged on the reel 105 on the payline L1, the payout is higher than the payout in the case of the rearrangement of four symbols of "RED7". In this state, the reel 105 rotates at a slower speed than normal in the indication effect of "Low-Speed Long Li-Zhi" at the fifth reel.

It is noted that, when the "Low-Speed Long Li-Zhi" is occurring and the symbols of "RED7" are rearranged on the same payline of all reels 100 (including at least the reels 101 and 102) except on the rotating reel 100, an observation push game may be run.

The observation push game proceeds such that, when the player presses the start button while the reel 100 is rotating, an effect and effect sound are output and the "RED7" is rearranged on the aforesaid payline on the rotating reel 100. When the observation push game is run while the reels 104 and 105 are rotating and the "RED7" is not rearranged on the payline on the reel 104, the rest of the observation push game after the stop of the reel 104 is omitted. In other words, the "Low- Speed Long Li-Zhi" is not conducted for the reel 105. Furthermore, the game result of the observation push game is determined in accordance with the random determination of the rearranged symbols performed in advance.

(Effect During Rotation of Reels: Speaker)

Now, indication effects that may be conducted by the speaker 112 during the rotation of the reels will be described. In the present embodiment, when no indication effect by the speaker is conducted during the rotation of the reels, effect sound (reel stop sound) indicating that the rotation has stopped is output from the speaker 112 when each reel 100 stops. In the indication effects, the following notifications are carried out.

To begin with, an indication effect of outputting the reel stop sound for the first reel 101 at a delayed time is possible. More specifically, while the reel stop sound is typically output at the stop of the rotation of the reel 101, data containing no sound (i.e., silent data) is output at the stop of the rotation of the reel 101 and then the normal reel stop sound is output based on the data of the normal reel spinning sound. As such, the reel stop sound is output at a timing later than the stop of the rotation of the reel 101. Furthermore, an indication effect of outputting the reel stop sound for the second reel 102 at a delayed timing is possible. More specifically, while the reel stop sound is typically output at the stop of the rotation of the reel 102, data containing no sound (i.e., silent data) is output at the stop of the rotation of the reel 102 and then the normal reel stop sound is output based on the data of the normal reel spinning sound. As such, the reel stop sound is output at a timing later than the stop of the rotation of the reel 102. Alternatively, while the normal reel spinning sound is typically output at the stop of the rotation of the reel 101 or 102, the reel stop sound is output at a delayed time by simply outputting the sound after the stop of the rotation of the reel 101 or 102.

As described above, the gaming machine 1 executes a process of randomly determining the symbols 501 to be rearranged on the reel unit M1. The gaming machine 1 executes a process of determining a combination formed by the symbols 501. The gaming machine 1 then executes a process of selecting an indication effect conducted before the rearrangement of the symbols 501 on the reel unit M1, based on the determined combination. The gaming machine 1 then executes a process of carrying out a selected indication effect by the notification device.

Furthermore, the gaming machine 1 executes a process of randomly determining the symbols 501 to be rearranged on the reel unit M1 in a game in the normal mode, based on a predetermined probability. The gaming machine 1 then executes a process of determining whether the determined symbols 501 includes a chance symbol (cherry chance symbol). When it is determined that the symbols 501 includes a chance symbol, the gaming machine 1 executes a process of randomly determining an expecting degree indicating the probability of the establishment of a winning combination concerning the first specific symbol (symbol of RED7) and conducting the shifting to the chance mode. In the game in the chance mode, the gaming machine 1 executes a process of randomly determining the symbols 501 to be rearranged on the reel unit M1 based on the probability corresponding to the determined expecting degree. When a predetermined number of games have been run, the gaming machine 1 executes a process of ending the chance mode. Based on the determined expecting degree, the gaming machine 1 selects an indication effect which is carried out before the symbols 501 are rearranged on the reel unit M1. The gaming machine 1 then executes a process of conducting the selected indication effect by the notification device.

In addition to the above, the gaming machine 1 stores an effect combination table in which effect combinations each coupled with one or more indication effect are associated with probabilities. In the effect combination table, each pair of the effect combination and the probability is associated in advance with combination conditions that are determined based on combinations of the symbols 501. The gaming machine 1 executes a process of randomly determining the symbols 501 to be rearranged on the reel unit M1. The gaming machine 1 then executes a process of determining to which one of the combination conditions the combination of the determined symbols 501 corresponds. The gaming machine 1 executes a process of selecting an effect combination table based on the corresponding combination condition and randomly selecting one effect combination from a plurality of effect combinations based on the probabilities in the selected effect combination table. The gaming machine 1 then executes a process of executing an indication effect indicated by the selected effect combination, by means of the notification device.

In addition to the above, the gaming machine 1 stores a plurality of notification patterns of the backlight unit M7. The notification patterns are displayable at least in the symbol rearrangement regions of the reel unit M1 including the regions where the symbols 501 are rearranged. A notification timing is assigned to each of the notification patterns. The gaming machine 1 executes a process of randomly determining the symbols 501 to be rearranged on the reel unit M1. The gaming machine 1 then executes a process of determining a combination formed by the determined symbols 501. The gaming machine 1 then executes a process of selecting a notification pattern based on the determined combination. The gaming machine 1 then executes a process of executing a selected notification pattern by the backlight unit M7, at a notification timing which is before the rearrangement of the symbols 501 on the reel unit M1.

In addition to the above, the gaming machine 1 stores movement patterns of the scroll of the reel unit M1 that has a plurality of paylines and displays a game result by scrolling the arranged symbols 501 in a predetermined direction and then rearranging the symbols in a matrix manner. The gaming machine 1 executes a process of randomly determining the symbols 501 to be rearranged on the reel unit M1. The gaming machine 1 then executes a process of determining a combination formed by the determined symbols 501. The gaming machine 1 then executes a process of selecting one of the movement patterns of the reel unit M1 based on the determined combination. The gaming machine 1 then executes a process of operating the reel unit M1 with the selected movement pattern.

In addition to the above, based on the timings to start the movement and rearrangement, the gaming machine 1 stores notification sound patterns each associated with the type of notification sound output by the speaker 112 which is capable of outputting the notification sound with plural notification patterns and a notification timing. The gaming machine 1 executes a process of randomly determining the symbols 501 to be rearranged on the reel unit M1. The gaming machine 1 then executes a process of determining a combination formed by the determined symbols 501. Based on the determined combination, the gaming machine 1 executes a process of selecting one of the notification sound patterns. The gaming machine 1 then executes a process of outputting the notification sound with the selected notification sound pattern.

(Overall Structure of Gaming Machine 1)

Now, the overall structure of the gaming machine 1 will be described.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

Figure 19:
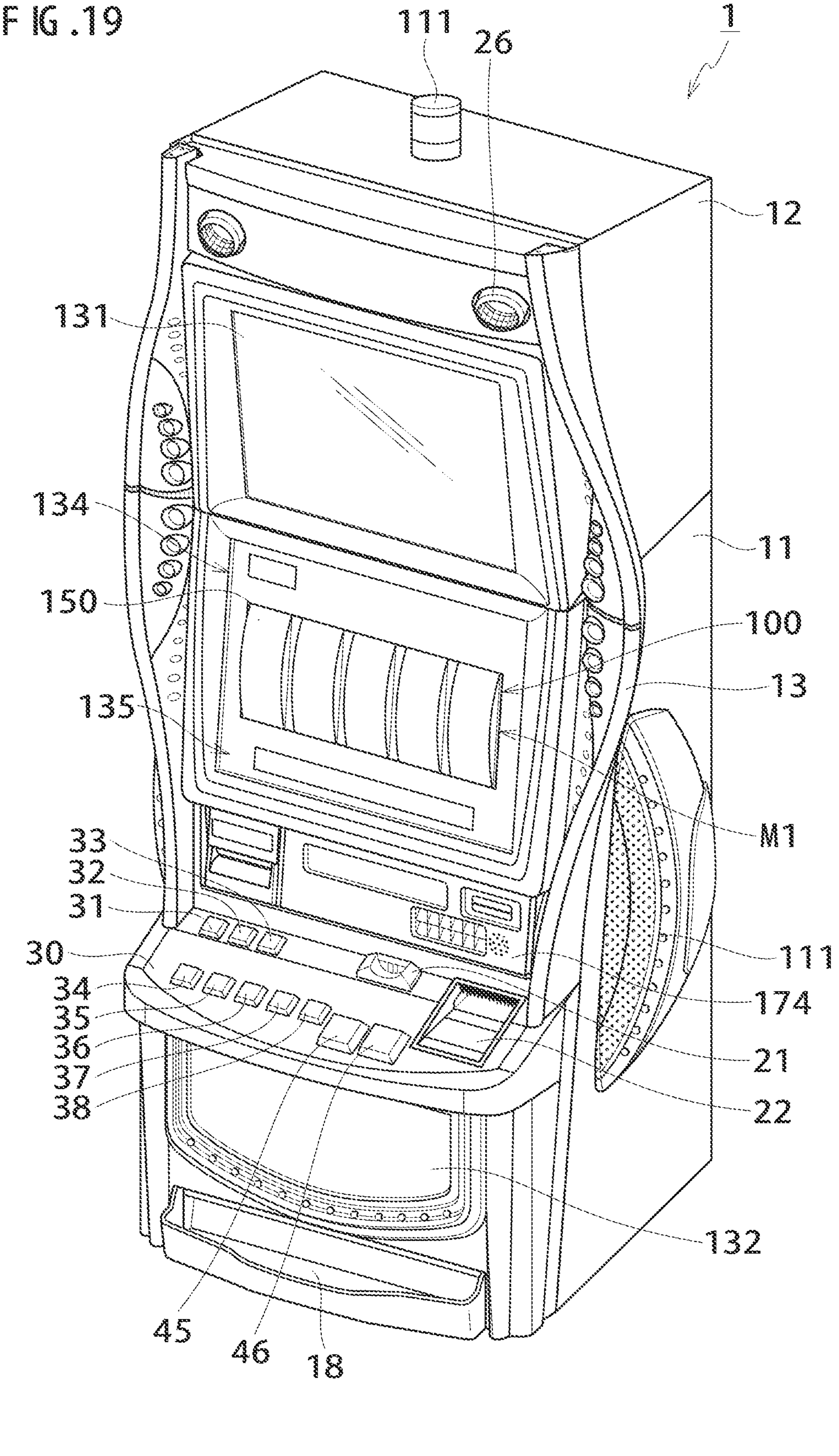
FIG. 19 shows the overall structure of the gaming machine.

As shown in FIG. 19, the gaming machine 1 includes a cabinet 11, a top box 12 installed on the upper side of the cabinet 11, and a main door 13 provided at the front face of the cabinet 11. The cabinet 11 is provided with a speaker 112 and a lamp 111.

Figure 20:
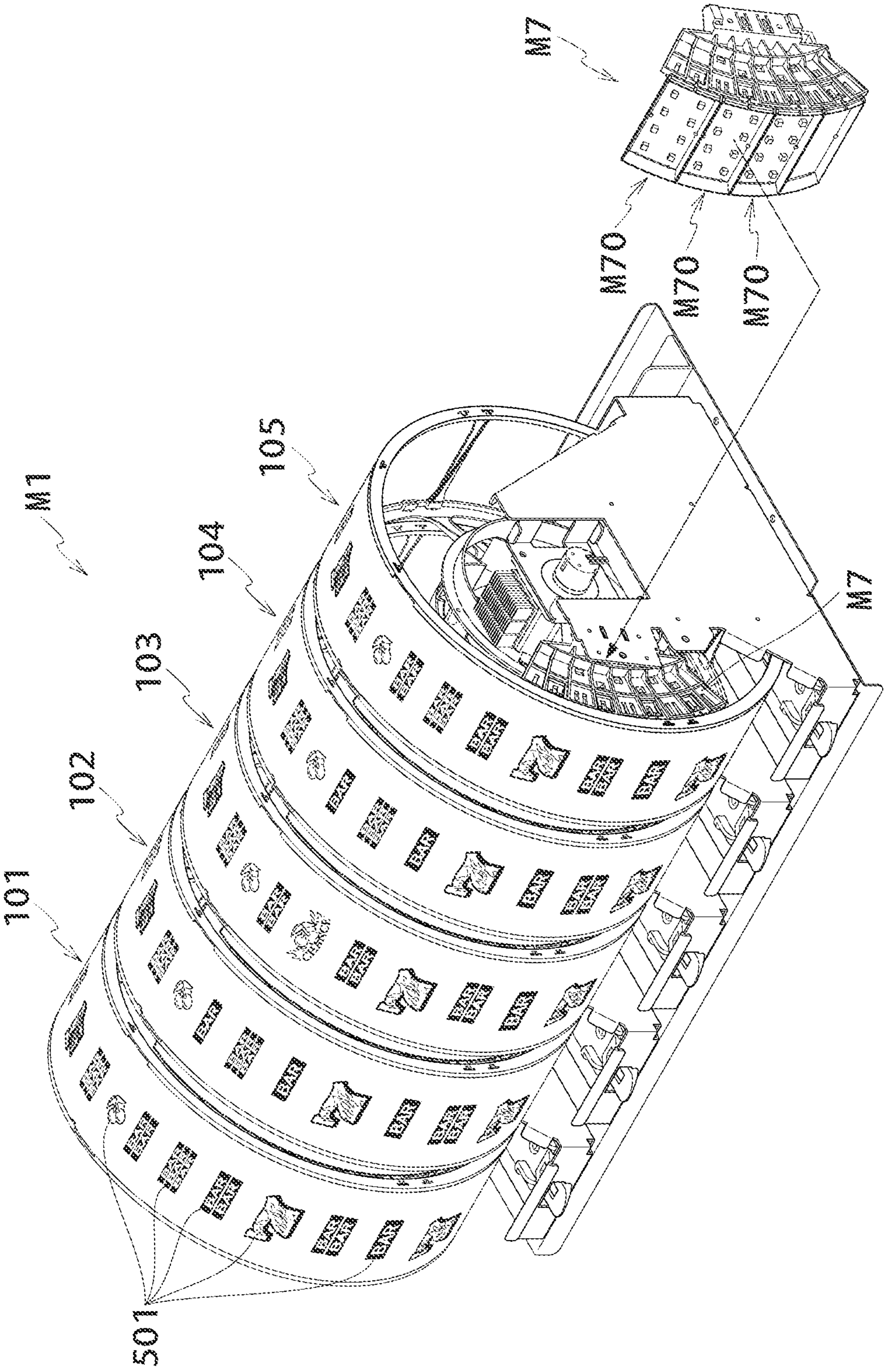
FIG. 20 is a perspective view showing a reel unit and a backlight unit of the gaming machine.
Figure 21:
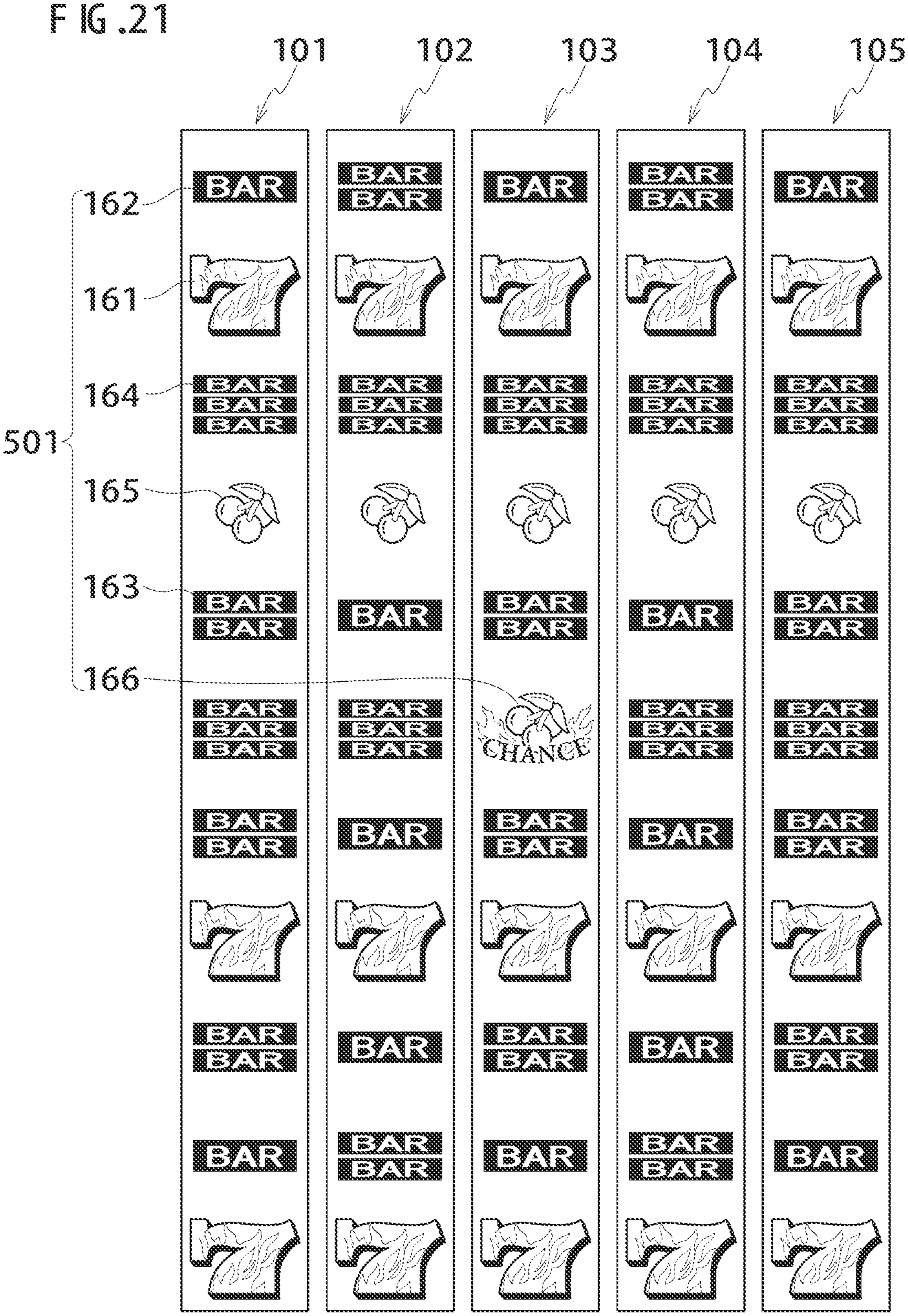
FIG. 21 shows the arrangement of symbols depicted on the outer circumferential surfaces of the reels of the gaming machine.

The main door 13 is provided with a reel unit M1 constituted by five reels 101, 102, 103, 104, and 105 shown in FIG. 20. On the front surface of the reel unit M1 is provided a reel cover 135. On the front surface of the reel cover 135 are provided a liquid crystal display device 134 and a transparent panel. Each of the liquid crystal display device 134 and the transparent panel may be provided with a touch panel. The reel cover 135 has a display window 150 at the central portion. The display window 150 allows 15 symbols 501 forming a matrix of three rows and five columns to be viewable from the outside. On the outer circumferential surface of each of the reels 101, 102, 103, 104, and 105, 11 symbols shown in FIG. 21 are depicted. The 11 symbols are lined up along the rotational direction of the reels 101, 102, 103, 104, and 105 so as to form a symbol array. The symbol array is a combination of first specific symbols "RED7" 161, "SINGLE BAR" 162, "DOUBLE BAR" 163, and "TRIPLE BAR" 164, a second specific symbol "CHERRY" 165, and a chance symbol "CHANCE CHERRY" 166. It is noted that the "CHANCE CHERRY" 166 is depicted only on the outer circumferential surface of the third reel 103.

In the present embodiment, in cases of "RED7" 161, "SINGLE BAR" 162, "DOUBLE BAR" 163, and "TRIPLE BAR" 164, winning is achieved when three or more symbols of the same type are serially rearranged on a payline on the first reel and the subsequent reels. It is noted that "SINGLE BAR" 162, "DOUBLE BAR" 163, and "TRIPLE BAR" 164 are regarded as the same type. In the meanwhile, in cases of "CHERRY" 165 and "CHANCE CHERRY" 166, winning is determined in a scattered manner. In other words, winning is achieved when at least one "CHERRY" 165 or at least one "CHANCE CHERRY" 166 is rearranged. Furthermore, "CHERRY" 165 and "CHANCE CHERRY" 166 are regarded as the same type.

In the descriptions below, winning achieved according to a payline will be referred to as line winning, whereas winning achieved by a scattered symbol will be referred to as scattered winning. Furthermore, to achieve winning may be simply referred to as WIN. Furthermore, credits obtained as a result of achieving winning may be referred to as WIN credits.

As shown in FIG. 20, the reel unit M1 rearranges the symbols 501 by drivingly rotating the reels 101, 102, 103, 104, and 105 each having the symbols 501 on the outer circumferential surface. In the descriptions below, the reels may be referred to as a first reel 101, a second reel 102, a third reel 103, a fourth reel 104, and a fifth reel 105 from the left in front elevation.

On the inner circumferential side of each of the reels 101, 102, 103, 104, and 105 arranged as above, the backlight unit M7 is provided. In the backlight unit M7, three backlight sources M70 are vertically lined up. The backlight unit M7 is arranged so that illuminating light is emitted from the inner circumference side of the reels 101, 102, 103, 104, and 105 toward the outer circumferential surface side of the reels so that the illumination light passing through the outer circumferential surfaces of the reels is viewable from the outside of the display window 150.

That is to say, the five backlight units M7 on the inner circumferences of the reels 101, 102, 103, 104, and 105 are able to illuminate each of 15 symbols 501 having stopped on the display window 150 by using 15 backlight sources M70.

Each backlight sources M70 is configured to be able to change the amount of illumination light in multiple stages. The degree of freedom in the effects using illumination light is therefore high thanks to the backlight unit M7, as the emission state of the illumination light from each backlight source is individually changeable.

Furthermore, as descried above, each of the backlight sources M70 of the backlight unit M7 is able to emit light in multiple colors. The symbols are illuminated with the following colors. For example, the symbol of "RED7" is illuminated in red during normal rotation and in cases other than winning. In the case of winning, the symbol of "RED7" is illuminated in flame scarlet.

The symbols of "SINGLE BAR", "DOUBLE BAR", "TRIPLE BAR", and "CHERRY" are illuminated in white. The symbol of "CHANCE CHERRY" is illuminated in the gradation of red, yellow, and blue when it is rearranged on the reel 103. The symbol of "CHANCE CHERRY" is normally illuminated in white.

Figure 22:
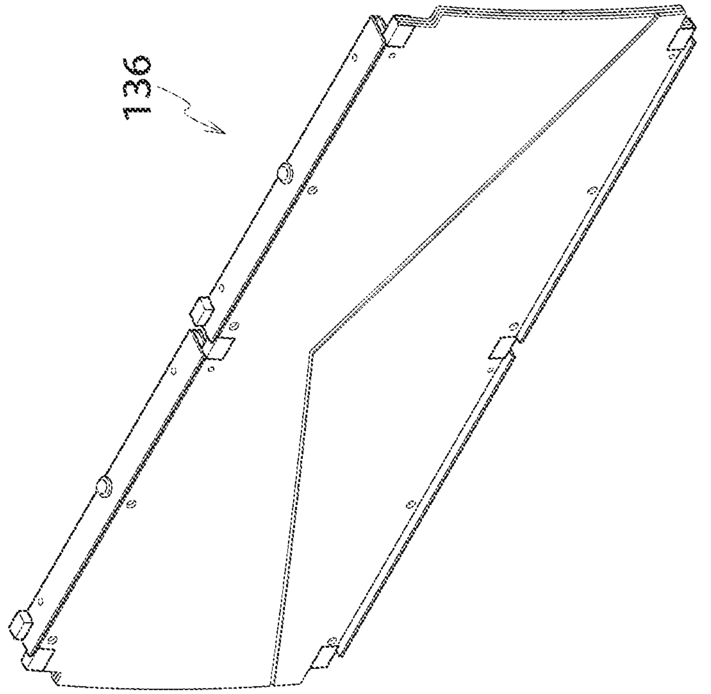
FIG. 22 shows a second reel cover of the gaming machine.
Figure 23:
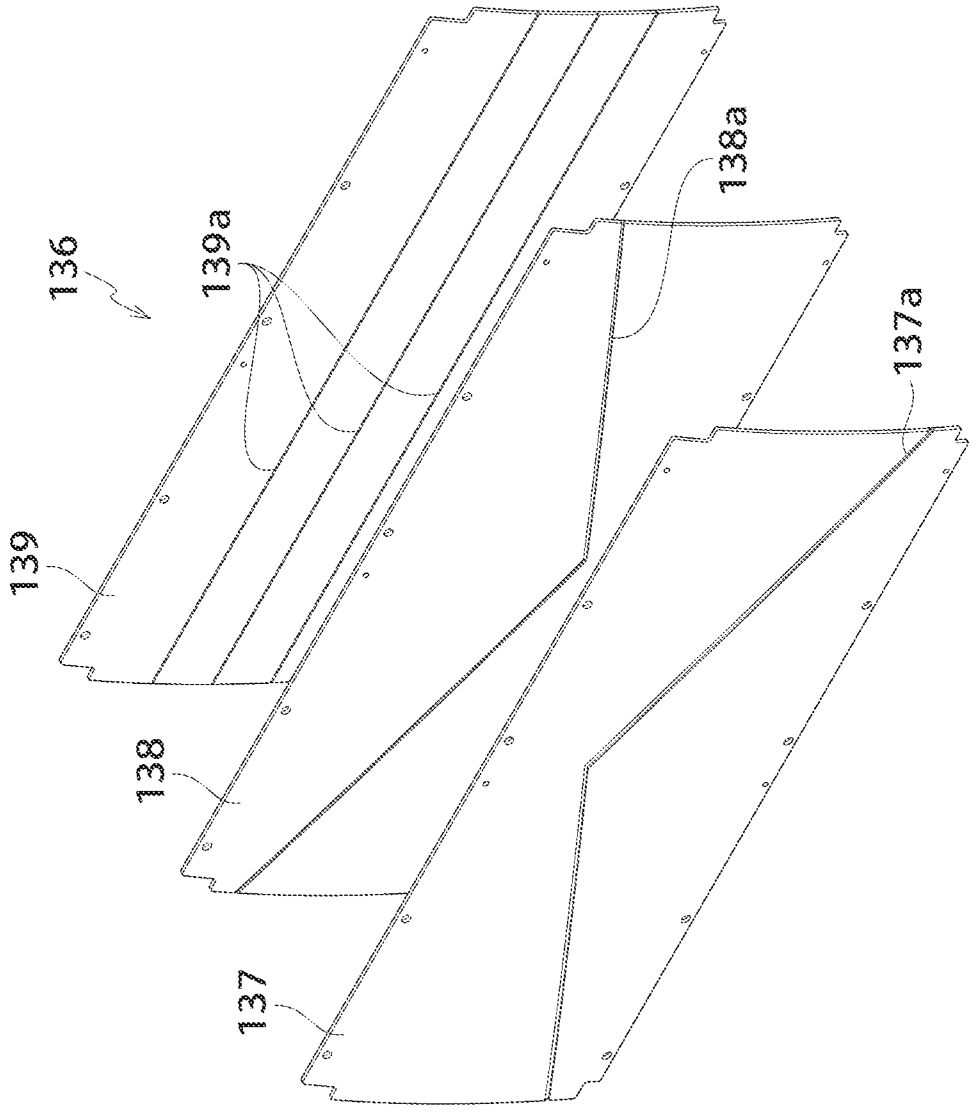
FIG. 23 is an exploded view of the second reel cover of the gaming machine.

In addition to the above, on the front surface of the reel unit M1 is provided a second reel cover 136 shown in FIG. 22, which covers the reels 100. The second reel cover 136 covering the reels 100 indicates the positions of the paylines L1 to L5 on the display window 150. More specifically, as shown in FIG. 23, the second reel cover 136 has three cover members 137, 138, and 139. These three cover members 137, 138, and 139 have notches 137*a*, 138*a*, and 139*a* at the positions of the payline L5, the payline L4, and the paylines L1 to L3. As the light from the light source passes through these notches, the paylines L1 to L5 shown in FIG. 3 are illuminated.

The paylines L1 to L5 are illuminated when winning is achieved. For example, when winning is achieved on one payline, that payline where the winning has been achieved is illuminated until the start of the next game. In the meanwhile, when one line winning and scattered winning are simultaneously achieved, a payline where the one line winning is achieved flickers until the start of the next game. When two line winnings are simultaneously achieved, two payline where the two line winnings are achieved alternately flicker until the start of the next game. As such, until the start of the next game, the operation to turn on the light illuminating one payline and to turn off the light illuminating the other payline and the operation to turn off the light illuminating the one payline and to turn on the light illuminating the other payline are alternated.

While the present embodiment deals with the case where the gaming machine 1 is provided with a mechanical-type reel unit M1, the gaming machine 1 of the present invention may employ both a video-reel type displaying pseudo reels and a mechanical type. Furthermore, the gaming machine 1 may be provided with a touch panel. In such a case, a player is able to input instructions through the touch panel. Input signals are sent from the touch panel to the main CPU 71.

Below the reel unit M1 is provided a control panel 30. On the control panel 30, a change button 31, a cashout button 32, and a help button 33 are provided on the upper stage of the left area in front elevation, a 1-BET button 34, a 2-BET button 35, a 3-BET button 36, a 4-BET button 37, and a 5-BET button 38 are provided in the lower stage of the left area, a coin entry 21 configured to receive coins into the cabinet 11 and a bill entry 22 configured to receive bills or the like are provided on the upper stage of the right area in front elevation, and a gamble button 45 and a start button 46 are provided on the lower stage of the right area.

The change button 31 is used when a player leaves the machine or when the player asks a staff person of the gaming facility to exchange money. The cashout button 32 is used when coins reserved in the gaming machine 1 is discharged to a coin tray 18. The help button 33 is pressed when, for example, it is unclear how to play a game. As the help button 33 is pressed, various help information is displayed on a later-described upper image display panel 131.

Each time the 1-BET button 34 is pressed, one of the credits currently owned by the player is bet on five active paylines L1, L2, L3, L4, and L5. The 2-BET button 35 is used to start a game with two credits bet on five active paylines L1, L2, L3, L4, and L5. The 3-BET button 36 is used to start a game with three credits bet on five active paylines L1, L2, L3, L4, and L5. The 4-BET button 37 is used to start a game with four credits bet on five active paylines L1, L2, L3, L4, and L5. The 5-BET button 36 is used to start a game with five credits bet on five active paylines L1, L2, L3, L4, and L5. As such, the number of credits bet on the five active paylines L1, L2, L3, L4, and L5 is determined by pressing the 1-BET button 34, the 2-BET button 35, the 3-BET button 36, the 4-BET button 37, and/or the 5-BET button 36.

The gamble button 45 is used to play a gamble game after the end of a feature game, for example. The gamble game is played using obtained credits. The gamble game can be activated or inactivated by changing the setting of software by means of an AUDIT menu. (AUDIT). For example, the gamble game is activated or inactivated in accordance with the country of shipment of the gaming machine. The AUDIT menu is executed by, for example, inserting a key (AUDIT key) into an unillustrated keyhole of the gaming machine 1 and turning the key. Through the AUDIT menu, various settings such as changing language and settings for each country where the gaming machine is installed are carried out. It is noted that the gamble button 45 may be used as a substitute for the MAX-BET button. As the maximum number of credits bettable on a single game is determined in advance, the MAX-BET button is a button to start a game with the maximum credits.

The start button 46 is used to start the scroll of the reels 101, 102, 103, 104, and 105. This start button 46 also functions as a button for starting a feature game and for adding a payout awarded in a feature game to the credits. The coin entry 21 is used for receiving coins into the cabinet 11. The bill entry 22 validate bills and receives genuine bills into the cabinet 11.

On the lower front surface of the main door 13, i.e., below the control panel 30, a coin payout exit 18 for paying out coins, and a belly glass 132 on which a character of the gaming machine 1 or the like is depicted are provided.

On the front surface of the top box 12 is provided an upper image display panel 131. The upper image display panel 131 is made up of a liquid crystal panel and constitutes a display. The upper image display panel 131 displays image concerning effects, an introduction to games, images for explaining rules of games, or the like.

Below the upper image display panel 131 is provided a data displayer 174. The data displayer 174 is made up of a VFD (Vacuum Fluorescent Display) 177, a LED, or the like and displays, for example, member data read out from an inserted IC card, the status of a game, or the like.

(Circuit Configuration in Gaming Machine 1)

Figure 24:
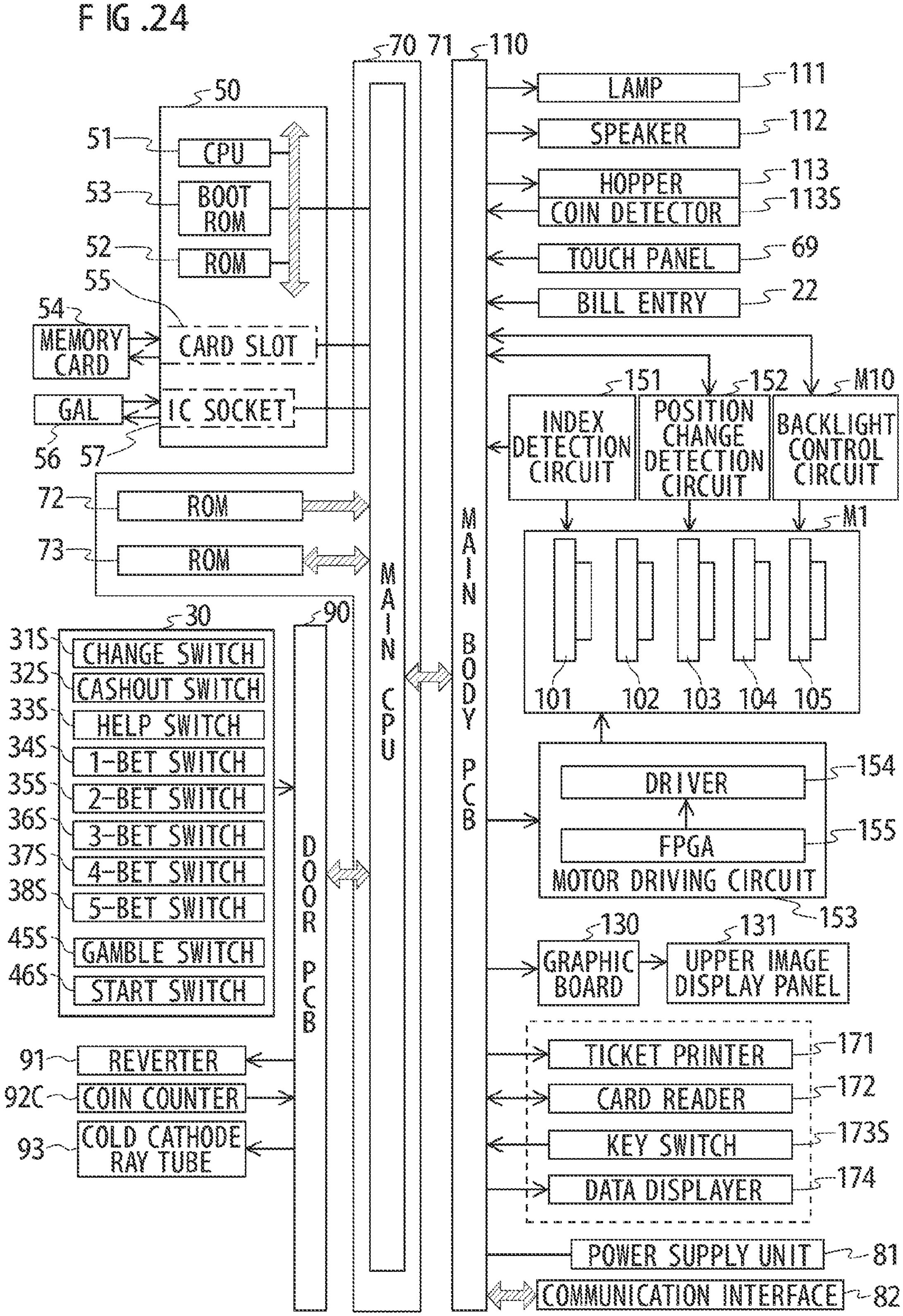
FIG. 24 is a block diagram of the internal structure of the gaming machine.

Now, referring to FIG. 24, the configuration of a circuit in the gaming machine 1 will be described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a random determination program, various tables, and a program for producing effects by images and sounds.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and a predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (falsification check program) for authenticating the game program and the game system program. The pre-authentication program is a program for authenticating the aforementioned authentication program. The authentication program and the pre-authentication program are written along a procedure (authentication procedure) for proving that the program to be the subject has not been falsified.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of BETs, the number of payouts, the number of credits and the like; and an area that stores symbols (code numbers) randomly determined.

The communication interface 82 is for communicating with an external controller such as a server, through a communication line. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a change switch 31S, a cashout switch 32S, a help switch 33S, a 1-BET switch 34S, a 2-BET switch 35S, a 3-BET switch 36S, a 4-BET switch 37S, a 5-BET switch 37S, a gamble switch 45S, and a start switch 46S, which correspond to the above-described buttons. Each switch detects that the corresponding button has been pressed by a player, and outputs a signal to the main CPU 71.

The coin counter 92C validates an inserted coin based on its material, shape and the like, and outputs a signal to the main CPU 71 upon detection of a valid coin. Invalid coins are discharged from a coin payout exit 18.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face side of the upper image display panel 131, and lights up based on a control signal output from the main CPU 71.

The body PCB 110 is connected with the lamp 111, the speaker 112, the hopper 113, a coin detecting portion 113S, a touch panel 69, the bill entry 22, a graphic board 130, an index detection circuit 151, a position change detection circuit 152, a backlight control circuit M10, a motor driving circuit 153, a ticket printer 171, a card reader 172, a key switch 173S, and the data displayer 174. The index detection circuit 151, the position change detection circuit 152, the motor driving circuit 153, and the backlight control circuit M10 are connected to the reel unit M1.

The lamp 111 is turned on based on a control signal output from the main CPU 71. The speaker 112 outputs sounds such as BGM, based on a control signal outputted from the main CPU 71.

The hopper 113 operates based on a control signal outputted from the main CPU 71, and pays out coins of the specified number of payouts to the coin payout exit 18. The coin detecting portion 113S outputs a signal to the main CPU 71 upon detection of coins paid out by the hopper 113.

The touch panel 114 detects a place touched by the player's finger or the like, and outputs to the main CPU a signal corresponding to the detected place. Upon acceptance of a valid bill, the bill entry 22 outputs to the main CPU 71*a* signal corresponding to the face amount of the bill.

The graphic board 130 controls display of images conducted by the lower image display panel 141, based on a control signal outputted from the main CPU 71. The graphic board 130 is provided with a VDP generating image data, a video RAM temporarily storing the image data generated by the VDP, and the like.

The motor driving circuit 153 is provided with a FPGA (Field Programmable Gate Array) 155 and a driver 154. The motor driving circuit 153 is connected to a stepper motor that rotates the reels 101, 102, 103, 104, and 105.

The FPGA 155 is a programmable electronic circuit such as LSI and functions as a control circuit of the stepper motor. The driver 154 functions as a circuit for amplifying a pulse input to the stepper motor.

The index detection circuit 151 detects the positions of the rotating reels 101, 102, 103, 104, and 105 and is able to detect the step out of the reels 101, 102, 103, 104, and 105.

The position change detection circuit 152 detects a change in the stop positions of the reels 101, 102, 103, 104, and 105 after the rotation of the reels 101, 102, 103, 104, and 105 is stopped. The position change detection circuit 152 detects a change in the stop positions of the reels 101, 102, 103, 104, and 105 when, for example, a stop position is changed to achieve a winning combination of the symbols 501 by an illicit way when no winning combination of the symbols 501 is achieved. The position change detection circuit 152 is configured to be able to detect a change in the stop positions of the reels 101, 102, 103, 104, and 105 by, for example, detecting unillustrated fins attached at predetermined intervals to the inner circumferential part of each of the reels 101, 102, 103, 104, and 105.

The method of magnetic excitation of the stepper motor is not particularly limited; 1-2 phase excitation or 2 phase excitation may be employed. Furthermore, a DC motor may be used in place of the stepper motor. When a DC motor is used, an error counter, a D/A converter, and a servo amplifier are connected to the body PCB 110 in this order, and the servo amplifier is connected to the DC motor. The rotational position of the DC motor is detected by a rotary encoder, and a current rotational position of the DC motor is supplied as data from the rotary encoder to the error counter.

The backlight control circuit M10 is connected to each of the backlight sources M70 of the respective backlight units M7 to individually supply driving power thereto. Upon receiving an instruction from the main CPU 71, the backlight control circuit M10 changes the amount of light emitted from each of the backlight sources M70 in multiple stages. The five backlight units M7 provided on the inner circumferences of the reels 101, 102, 103, 104, and 105 are able to individually illuminate 15 symbols 501 having stopped on the display window 150 by using 15 backlight sources M70 by means of the backlight control circuit M10.

Based on a control signal output from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data displayer 174 displays data read by the card reader 172 and data inputted by the player through the keypad 173, based on a control signal outputted from the main CPU 71.

(Normal Mode Symbol Random Determination Table)

As shown in FIG. 25, the normal mode symbol random determination table defines the arrangement probability of each symbol 501 in the normal mode. More specifically, for each reel 100, 11 symbols 501 and 11 blank spaces each between neighboring symbols 501 are weighted, respectively. In other words, the arrangement probability of a symbol or a blank space is calculated by dividing the total sum of the weights of 22 symbols and blank spaces by the weight of that symbol or blank space. It is noted that the arrangement probability of a symbol or blank space indicates a probability of the symbol or blank space appearing on the central stage of each reel 100. In the normal mode symbol random determination table shown in FIG. 25, "F_CHERRY" indicates a chance symbol.

(Expecting Degree Random Determination Table)

The expecting degree random determination table shown in FIG. 26 is used for randomly determining the level of the expecting degree in the chance mode, when, in a game in the normal mode, rearranged symbols include a chance symbol (Chance Cherry symbol). More specifically, the expecting degrees (expecting degree: high, expecting degree: middle, expecting degree: low) are weighted, respectively. The winning probability of each expecting degree is therefore calculated by dividing the total sum of the weights of the expecting degrees by the weight of each expecting degree.

(Chance Mode Symbol Random Determination Table)

The chance mode symbol random determination tables shown in FIGS. 27 to 50 define the arrangement probability of each symbol 501 in the chance mode. In a similar manner as the normal mode symbol random determination table, for each reel 100, 11 symbols 501 and 11 blank spaces each between neighboring symbols 501 are weighted, respectively.

In the chance mode, a different chance mode symbol random determination table is used for each expecting degree. Furthermore, a different chance mode symbol random determination table is used in accordance with the game count in the chance mode. Because in the present embodiment the maximum number of games in one chance mode is eight, 24 types of chance mode symbol random determination tables are stored in a storage device such as a ROM 72.

For example, when the expecting degree is high, the chance mode symbol random determination tables described below are used. In the first game in the chance mode, the table (High Expecting Degree: First Spin) shown in FIG. 27 is used. In the second game in the chance mode, the table (High Expecting Degree: Second Spin) shown in FIG. 28 us used. In the third game in the chance mode, the table (High Expecting Degree: Third Spin) shown in FIG. 29 is used. In the fourth game in the chance mode, the table (High Expecting Degree: Fourth Spin) shown in FIG. 30 is used. In the fifth game in the chance mode, the table (High Expecting Degree: Fifth Spin) shown in FIG. 31 is used. In the sixth game in the chance mode, the table (High Expecting Degree: Sixth Spin) shown in FIG. 32 is used. In the seventh game in the chance mode, the table (High Expecting Degree: Seventh Spin) shown in FIG. 33 is used. In the eighth game in the chance mode, the table (High Expecting Degree: Eighth Spin) shown in FIG. 34 is used.

In the meanwhile, when the expecting degree is middle, the chance mode symbol random determination tables described below are used. In the first game in the chance mode, the table (Middle Expecting Degree: First Spin) shown in FIG. 35 is used. In the second game in the chance mode, the table (Middle Expecting Degree: Second Spin) shown in FIG. 36 is used. In the third game in the chance mode, the table (Middle Expecting Degree: Third Spin) shown in FIG. 37 is used. In the fourth game in the chance mode, the table (Middle Expecting Degree: Fourth Spin) shown in FIG. 38 is used. In the fifth game in the chance mode, the table (Middle Expecting Degree: Fifth Spin) shown in FIG. 39 is used. In the sixth game in the chance mode, the table (Middle Expecting Degree: Sixth Spin) show in FIG. 40 is used. In the seventh game in the chance mode, the table (Middle Expecting Degree: Seventh Spin) shown in FIG. 41 is used. In the eighth game in the chance mode, the table (Middle Expecting Degree: Eighth Spin) shown in FIG. 42 is used.

In the meanwhile, when the expecting degree is low, the following chance mode symbol random determination tables below are used. In the first game in the chance mode, the table (Low Expecting Degree: first spin) shown in FIG. 43 is used. In the second game in the chance mode, the table (Low Expecting Degree: second spin) shown in FIG. 44 is used. In the third game in the chance mode, the table (Low Expecting Degree: third spin) shown in FIG. 45 is used. In the fourth game in the chance mode, the table (Low Expecting Degree: fourth spin) shown in FIG. 46 is used. In the fifth game in the chance mode, the table (Low Expecting Degree: fifth spin) shown in FIG. 47 is used. In the sixth game in the chance mode, the table (Low Expecting Degree: sixth spin) shown in FIG. 48 is used. In the seventh game in the chance mode, the table (Low Expecting Degree: seventh spin) shown in FIG. 49 is used. In the eighth game in the chance mode, the table (Low Expecting Degree: eighth spin) shown in FIG. 50 is used.

As shown in FIG. 27 to FIG. 50, the probability of winning a winning combination of the symbols of "RED7" is higher in case of high expecting degree than in case of middle expecting degree. Furthermore, the probability of achieving a winning combination of the symbols of "RED7" is higher in case of middle expecting degree than in case of low expecting degree. It is noted that the values in the chance mode symbol random determination tables are non-restricting ones. When the expecting degree is high, the probability of achieving a winning combination of the symbols of "RED7" is preferably about ½. When the expecting degree is middle, the probability of achieving a winning combination of the symbols of "RED7" is preferably about ⅓. When the expecting degree is low, the probability of achieving a winning combination of the symbols of "RED7" is preferably about ¼. At any probabilities in the chance mode, the probability of achieving a winning combination of the symbols of "RED7" increases as the game count increases in the chance game. In other words, each time a game is run in the chance mode, the probability of achieving a winning combination concerning the first specific symbol (RED7) is increased.

(Effect Combination Table)

The effect combination tables shown in FIGS. 51 to 53 define the probabilities of effect combinations each constituted by indication effects for each combination condition of rearranged symbols. In the effect combination table, each combination number (No.) of effects is associated with at least one indication effect, and the weights of respective combination conditions are associated with each combination number. In the table, "A" to "H" indicate the tables from which a table is selected based on rearranged symbols. For example, when the rearranged symbols include a chance symbol, "Table A" is selected. After a table is selected based on the combination condition, one of the effect combinations is selected based on the weight.

In the effect combination tables (1) to (3) shown in FIGS. 51 to 53, the items in the effect combination field, that is, "Start Sound", "Before Start of Rotation", "Start of Rotation", "During Rotation", and "Stop" are types of effects mainly related to timings. Details of these items are as below.

Start Sound: Sound effects at the start of the rotation of the reels 100

Before Start of Rotation: Effects before the start of the rotation of the reels 100

Start of Rotation: Effects regarding the rotation of the reels 100

During Rotation: Effects during the rotation of the reels 100

Stop: Effects when the reels 100 are stopped

In addition to the above, each of the items "1-1", "1-2", "1-3", . . . and "5-3" in the effect combination field indicates the contents of the indication effects. The details of the contents are as below.

1-1: "Delay of Start Sound"

1-2: "Special Reel Spinning Sound (Explosion Sound)"

1-3: "Silent"

1-4: "Cherry Chance Voice"

2-1: Indication Effect of "Breeze" (see FIG. 4)

2-2: Indication Effect of "Ripples" (see FIG. 5)

2-3: Indication Effect of "Flashing Light" (see FIG. 6)

2-4: Indication Effect of "Meteor" (see FIG. 7)

2-5: Indication Effect of "Meteors from Corners" (see FIG. 8)

2-6: Indication Effect of "Fireworks" (see FIG. 9)

3-1: Indication Effect of "Reel Upward Movement Then Forward Rotation" (see FIG. 11)

3-2: Indication Effect of "Reel Sequential Rotation" (see FIG. 12)

3-3: Indication Effect of "Entire Flash" (see FIG. 13)

4-1: Indication Effect of "5-Kind Indication" (see FIG. 14)

4-2: Indication Effect of "Cherry Chance Indication" (see FIG. 15)

5-1: Indication Effect of "Low-Speed Long Li-Zhi" (see FIGS. 16 to 18)

5-2: Indication Effect of "First Reel Stop Sound"+"Low-Speed Long Li-Zhi" (see FIGS. 16 to 18)

5-3: Indication Effect of "Second Reel Stop Sound"+"Low-Speed Long Li-Zhi" (see FIGS. 16 to 18)

For example, according to the effect combination tables, the indication effect 4-1 (5-Kind Indication) is executable only when the table B or the table F is selected. The 5-Kind Indication is a notification pattern with which the illumination patterns 201 are displayed on all symbol rearrangement regions on one of the paylines L1 to L5 while the symbols 501 are being rearranged. The table B is selected in case of the combination condition "5 of a Kind of RED7". The table F is selected in case of the combination condition "5 of a Kind of Symbol Other Than RED7". As such, only when the symbols on any one of the paylines L1 to L5 are the same type, the notification pattern of the 5-Kind Indication is selectable. Therefore the 5-Kind winning combination is established in a game in which a 5-Kind Indication is executed.

In addition to the above, according to the effect combination tables, the indication effect 4-2 (Cherry Chance Indication) is executable only when the table A is selected. The Cherry Chance Indication is a notification pattern with which an illumination pattern 201 is displayed on the symbol rearrangement region where a chance symbol (Cherry Chance) is to be rearranged among the symbol rearrangement regions, while the symbols 501 are being rearranged. The table A is selected in case of a combination condition indicating that the Cherry Chance is to be arranged. As such, only when the Cherry Chance is to be arranged, the notification pattern of the Cherry Chance Indication is selectable. Therefore, in a game in which the Cherry Chance Indication is executed, a combination including the Cherry Chance is established and the shifting to the chance mode is confirmed.

According to the effect combination tables, the indication effects 2-1 (Breeze), 2-2 (Ripples), 2-3 (Flashing Light), 2-4 (Meteor), 2-5 (Meteors from Corners), and 2-6 (Fireworks) are executable no matter which table is selected. These indication effects are notification patterns with which an illumination pattern 201 is displayed on at least one of the symbol rearrangement regions where the symbols are to be rearranged, while the symbols 501 are being rearranged. As such, one of the notification patterns is selectable no matter which table is selected.

In addition to the above, according to the effect combination tables, the indication effect 3-3 (Entire Flash Indication) is executable only when one of the tables B, C, and D is selected. The Entire Flash Indication is a notification pattern with which an entire illumination pattern 202 of illuminating all symbol rearrangement regions of the display window 150 is displayed. The tables B, C, and D are selected when the combination condition indicates that a predetermined number (three) or more first specific symbols (RED7) are arranged on any payline. As such, the notification pattern of the Entire Flash Indication is selectable only when a predetermined number or more of "RED7" are rearranged on any payline. Therefore, in a game in which the Entire Flash Indication is executed, a winning combination in which a predetermined number or more of "RED7" are rearranged on any payline is established.

In addition to the above, according to the effect combination tables, the indication effect 3-1 (Reel Upward Movement Then Forward Rotation) and the indication effect 3-2 (Reel Sequential Rotation) are executable when any one of the tables A to G is selected. The Reel Upward Movement Then Forward Rotation is a movement pattern of the reel unit M1 with which the reels 100 rotate slightly upward and then start to scroll downward together. The Reel Sequential Rotation is a movement pattern of the reel unit M1 with which the reels 100 serially start the rotation. That is to say, the Reel Sequential Rotation is a movement pattern of the reel unit M1 with which the timings to start the rotation of the respective reels 100 are arranged to be different from one another. As such, when one of the tables A to G is selected, it is possible to select the movement pattern of the effect indication of the Reel Upward Movement Then Forward Rotation or the Reel Sequential Rotation.

In addition to the above, according to the effect combination tables, the indication effect 1-1 (Delay of Start Sound) is executable when any one of the tables A to G is selected. The "Delay of Start Sound" is a notification sound pattern with which effect sound (normal reel spinning sound) indicating that the rotation has started is output from the speaker 112 when the reel 100 starts the rotation. As such, when one of the tables A to G is selected, it is possible to select the notification sound pattern of notifying the normal reel spinning sound at a timing later than the timings at which the symbols 501 start to rotate.

In addition to the above, according to the effect combination tables, the indication effect (Entire Flash Indication) of delaying the reel stop sound in the indication effects 5-2 and 5-3 is executable only when one of the tables B, C, D, and E is selected. The "Delay of Reel Stop Sound" is a notification sound pattern with which the reel stop sound associated with the stop of the reel 101 or the reel 102 is output at a timing later than the stop of the rotation. The tables B, C, D, and E are selected when the combination condition indicates that the number of first specific symbols (RED7) on any payline is one short of the predetermined number (i.e., two). As such, only when the number of "RED7" rearranged on any payline is one short of the predetermined number, the notification sound pattern of "Delay of Reel Stop Sound" is selectable.

In addition to the above, according to the effect combination tables, the indication effect 1-2 (Explosion Sound) is executable only when one of the tables B, C, and D is selected. The "Explosion Sound" is a notification sound pattern with which special reel spinning sound which is different from the normal reel spinning sound is output at the timing to start the rotation of the reel 100. The tables B, C, and D are selected when the combination condition indicates that the predetermined number (three) or more first specific symbols (RED7) are rearranged on any payline. As such, only when the predetermined number or more "RED7" are rearranged on any payline, the notification sound pattern of "Explosion Sound" is selectable. Therefore, in a game in which the indication effect of "Explosion Sound" is executed, a winning combination in which the predetermined number or more of "RED7" are rearranged on any payline is established.

In addition to the above, according to the effect combination tables, the indication effect 1-3 (Cherry Chance Voice) is executable only when the table A is selected. The "Cherry Chance Voice" is a notification sound pattern of outputting Cherry Chance Voice in place of the normal reel spinning sound, at the timing to start the rotation of the reel 100. The table A is selected when the combination condition indicates that the Cherry Chance is to be rearranged. As such, the notification pattern of "Cherry Chance Voice" is selectable only when the Cherry Chance is to be rearranged. Therefore, in a game in which the indication effect of "Cherry Chance Voice" has been executed, a combination with which the Cherry Chance is rearranged is established and the shifting to the chance mode is confirmed.

In addition to the above, according to the effect combination tables, the indication effect 1-4 (Silent) is executable only when one of the tables A, B, C, and D is selected. The "Silent" is a notification sound pattern of not outputting the normal reel spinning sound at the timing to start the rotation of the reel 100. The tables A, B, C, and D are selected when the combination condition indicates that the Cherry Chance is to be rearranged or when the combination condition indicates that the predetermined number (three) or more first specific symbols (RED7) are to be rearranged on any payline. As such, the notification sound pattern of "Silent" is selectable only when the Cherry Chance is to be rearranged or the predetermined number or more of "RED7" are to be rearranged on any payline. Therefore, in a game in which the indication effect of "Silent" has been executed, a combination with which the Cherry Chance is to be rearranged or a winning combination in which the predetermined number or more of "RED7" are to be rearranged on any payline is established.

(Contents of Program)

Now, programs executed by the controller of the gaming machine 1 will be described.

(Indication Effect Process)

Figure 54:
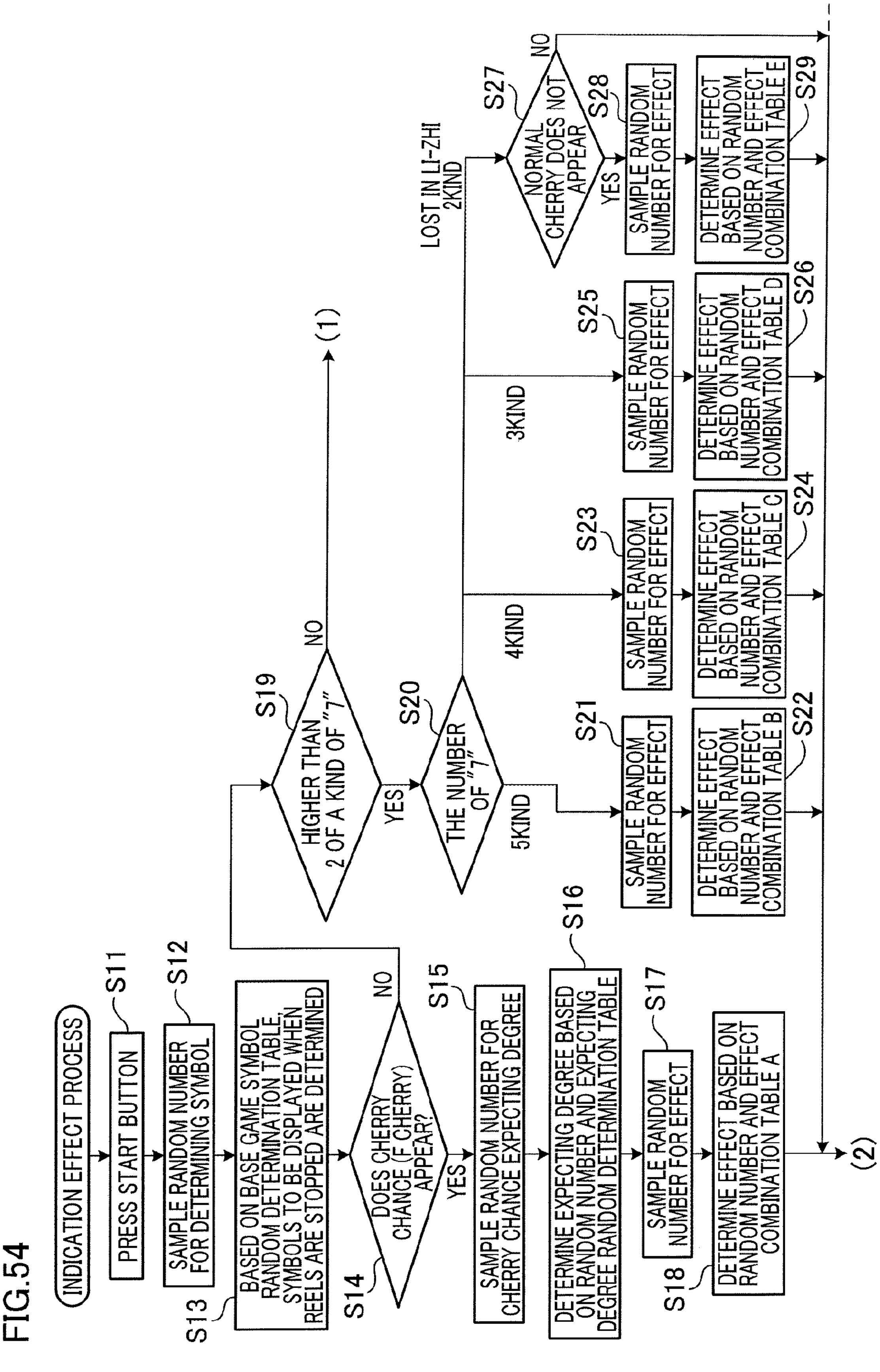
FIG. 54 shows a flowchart of an indication effect process.
Figure 55:
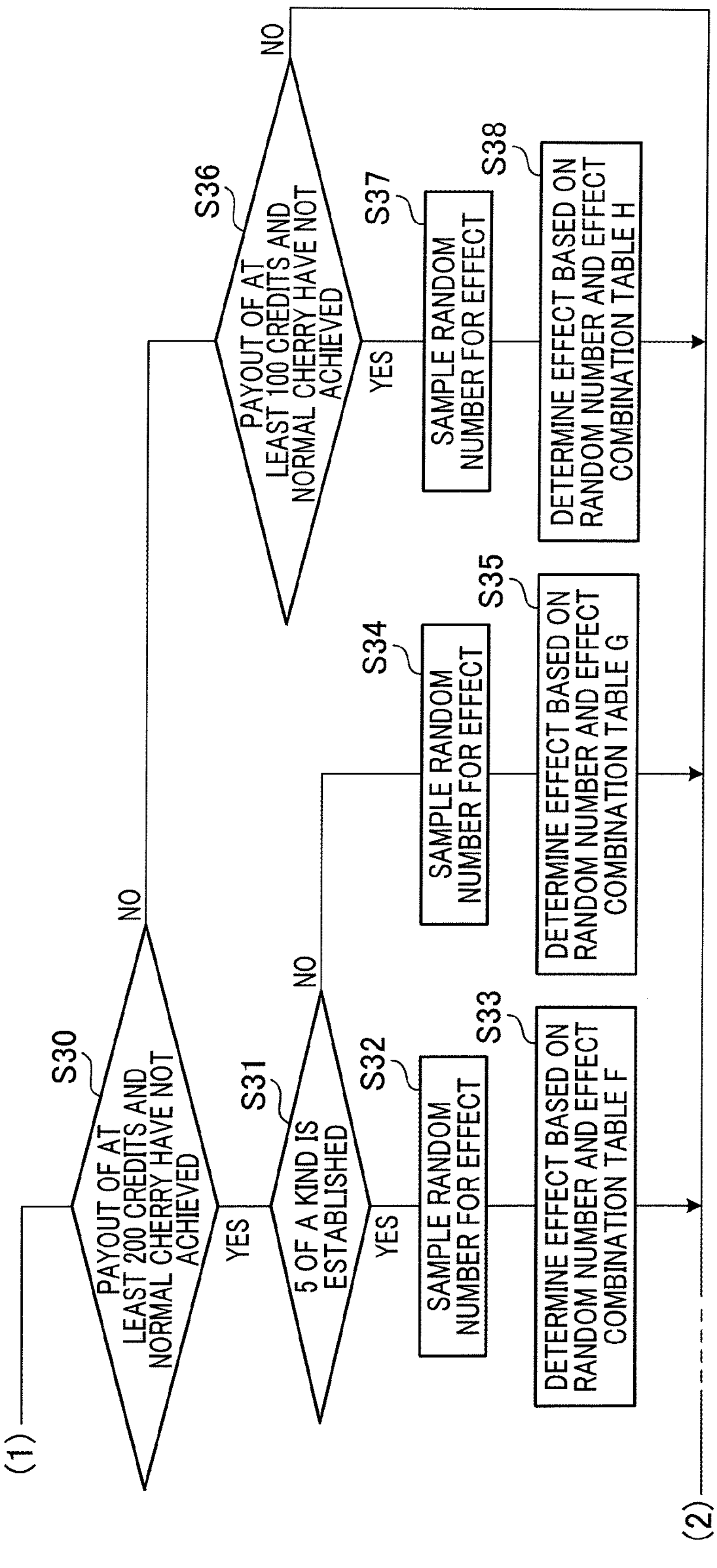
FIG. 55 shows a flowchart of the indication effect process.
Figure 56:
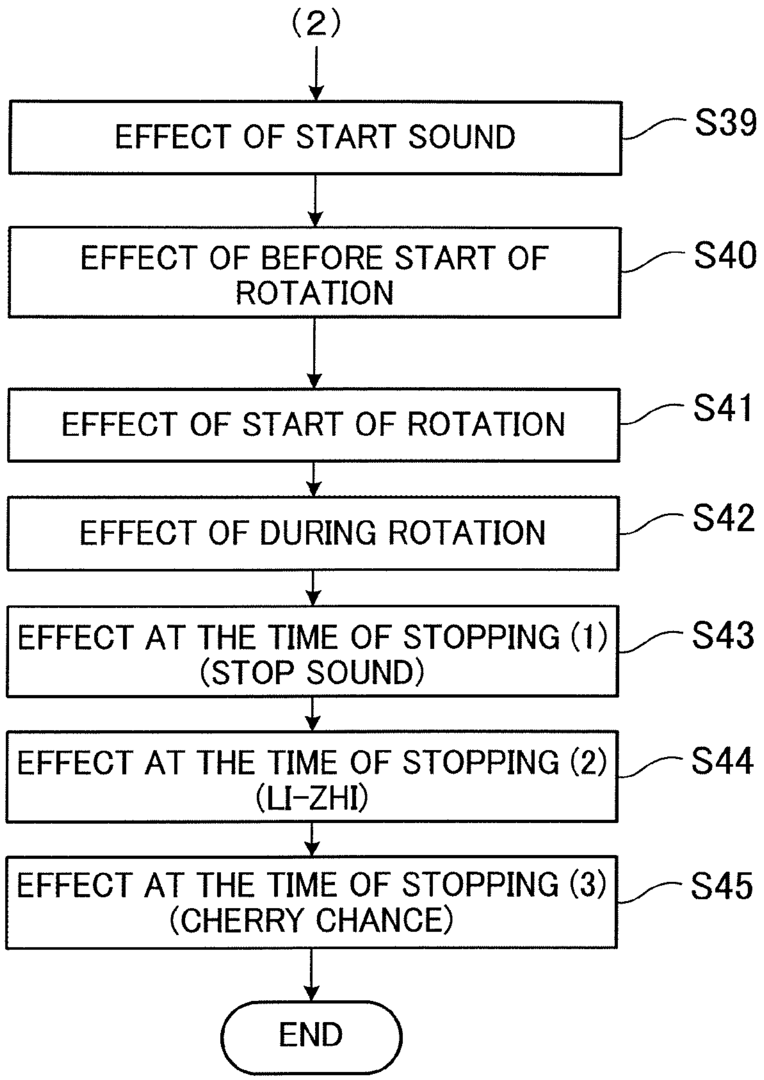
FIG. 56 shows a flowchart of the indication effect process.

Referring to FIGS. 54 to 56, an indication effect process will be described.

To begin with, as a player performs betting and the start button 46 is pressed (S11), a random number for symbol determination is sampled (S12). Thereafter, based on the base game symbol random determination table, rearranged symbols to be displayed on the display window 150 when the reels 101 are stopped are determined (S13).

Then whether the rearranged symbols include a cherry chance symbol is determined (S14). When the rearranged symbols include a cherry chance symbol (S14: YES), a random number for randomly determining the expecting degree in a chance mode game (Cherry Chance game) is sampled (S15). Thereafter, the high, middle, or low expecting degree is selected based on the random number and the expecting degree random determination table (S16). Then a random number for determining the effect combination is sampled (S17), and an effect is selected based on the random number and the combination condition A (Table A of the effect combination table (S18).

On the other hand, if in the S14 the rearranged symbols do not include a cherry chance symbol (S14: NO), whether two or more symbols of "RED7" are to be rearranged on any payline (S19). When two or more symbols of "RED7" are to be rearranged, how many "RED7" are to be rearranged is determined (S20).

When five "RED7" are to be rearranged, a random number for determining an effect combination is sampled (S21), and the effect is determined based on the random number and the combination condition B (Table B) of the effect combination table. That is to say, whether the combination with which all symbols on the payline are the first specific symbols (RED7) is established is determined, and a process of selecting the indication effect is executed when it is determined that the combination with which all symbols on the payline are the first specific symbols (RED7) is established.

When the number of "RED7" is four, a random number for determining an effect combination is sampled (S23), and the effect is determined based on the random number and the combination condition C (Table C) in the effect combination table (S24).

When the number of "RED7" is three, a random number for determining an effect combination is sampled (S25), and the effect is determined based on the random number and the combination condition D (Table D) of the effect combination table (S26).

When the number of "RED7" is two, whether the symbol of "Cherry" is included in the rearranged symbols is determined (S27). When the symbol of "Cherry" is not included in the rearranged symbols (S27: NO), a random number for determining an effect combination is sampled (S28), and the effect is determined based on the random number and the combination condition E (Table E) of the effect combination table (S29). That is to say, a process is executed so that, whether the combination indicates that the number of first specific symbols (RED7) to be rearranged on a payline is one short of the predetermined number (three) is determined, and an indication effect is selected when the number of first specific symbols to be rearranged is one short of the predetermined number.

In the meanwhile, if in the step S19 the number of symbols of "RED7" on any payline is less than two (S19: NO), whether a condition in which the payout is not lower than a first payout amount (200 credits) and the symbol of "Cherry" is not included in the rearranged symbols is satisfied is determined (S30). When the payout is lower than 200 credits and the symbol of "Cherry" is not included in the rearranged symbols, whether 5 of a kind of any type of symbols is to be established is determined (S31). When 5 of a kind of any type of symbols is to be established, a random number for determining an effect combination is sampled (S32), and the effect is determined based on the random number and the combination condition F (Table F) of the effect combination table (S33). That is to say, it is determined whether a condition in which all symbols on the payline are the same symbols that are not the first specific symbol (RED7) and a payout not lower than the first payout amount is award is satisfied, and a process of selecting an indication effect is executed when the condition is satisfied.

On the other hand, if in the step S31 5 of a kind of any type of symbols is not to be established, a random number for determining an effect combination is sampled (S34), and the effect is determined based on the random number and the combination condition G (Table G) of the effect combination table (S35).

On the other hand, when the payout is lower than 200 credits and the symbol of "Cherry" is not included in the rearranged symbols, (S30: NO), it is determined whether a condition in which the payout is not lower than the second payout amount (100 credits) and the symbol of "Cherry" is not included in the rearranged symbols is satisfied (S36). When the condition in which the payout is not lower than 100 credits and the symbol of "Cherry" is not included in the rearranged symbols is satisfied, a random number for determining an effect combination is sampled (S37), and the effect is determined based on the random number and the combination condition H (Table H) of the effect combination table (S38). That is to say, it is determined whether a condition in which the symbols form a combination with which the amount of payout to be awarded is not lower than the second payout amount is satisfied, and a process of selecting an indication effect is executed when the condition is satisfied.

After the combinations of the effects are determined in the steps S18, S22, S24, S26, S29, S33, S35, and S38 or when the conditions of the steps S27 and S36 are not satisfied, the effects are executed.

To begin with, the effect of Start Sound is executed (S39). When no indication effect regarding the Start Sound is executed, normal start sound is output. Then the effect of Before Start of Rotation is executed (S40). Then the effect of Start of Rotation is executed (S41). Then the effect of During Rotation is executed (S42). Then the effect at the time of stopping regarding the stop sound (S43) and the effect at the time of stopping regarding the Low-Speed Long Li-Zhi or the like (S43) are carried out and the "Cherry Chance Indication" is executed if the shifting to the chance mode has been confirmed (S44). The routine is finished with these steps.

As such, when a base game starts, one of three types of chance mode (high probability, middle probability, and low probability) is executed according to the expecting degree, based on whether the symbol of Chance Cherry is to be rearranged. When the Chance Cherry is not rearranged, whether a winning (line winning or scattered winning) is achieved in a base game is determined. When no winning is achieved in the base game, the process is in the idle state until the next game starts. When a winning is achieved in the base game, after a payout is awarded, the process is in the idle state until the next game starts. In the chance mode, the number of games is counted and the random determination of symbols to be rearranged based on a randomly determined number is executed by utilizing a randomly determined expecting degree and a chance mode symbol random determination table corresponding to the game count. When the symbol of Cherry appears as a result of the random determination of the symbols, the chance mode is terminated and the mode of the game is shifted to the normal mode even if the remaining number of games is not zero.

(Other Arrangements)

Other arrangements regarding the gaming machine 1 will be described below.

(Reel)

The structure of the reel 100 will be described.

Figure 57:
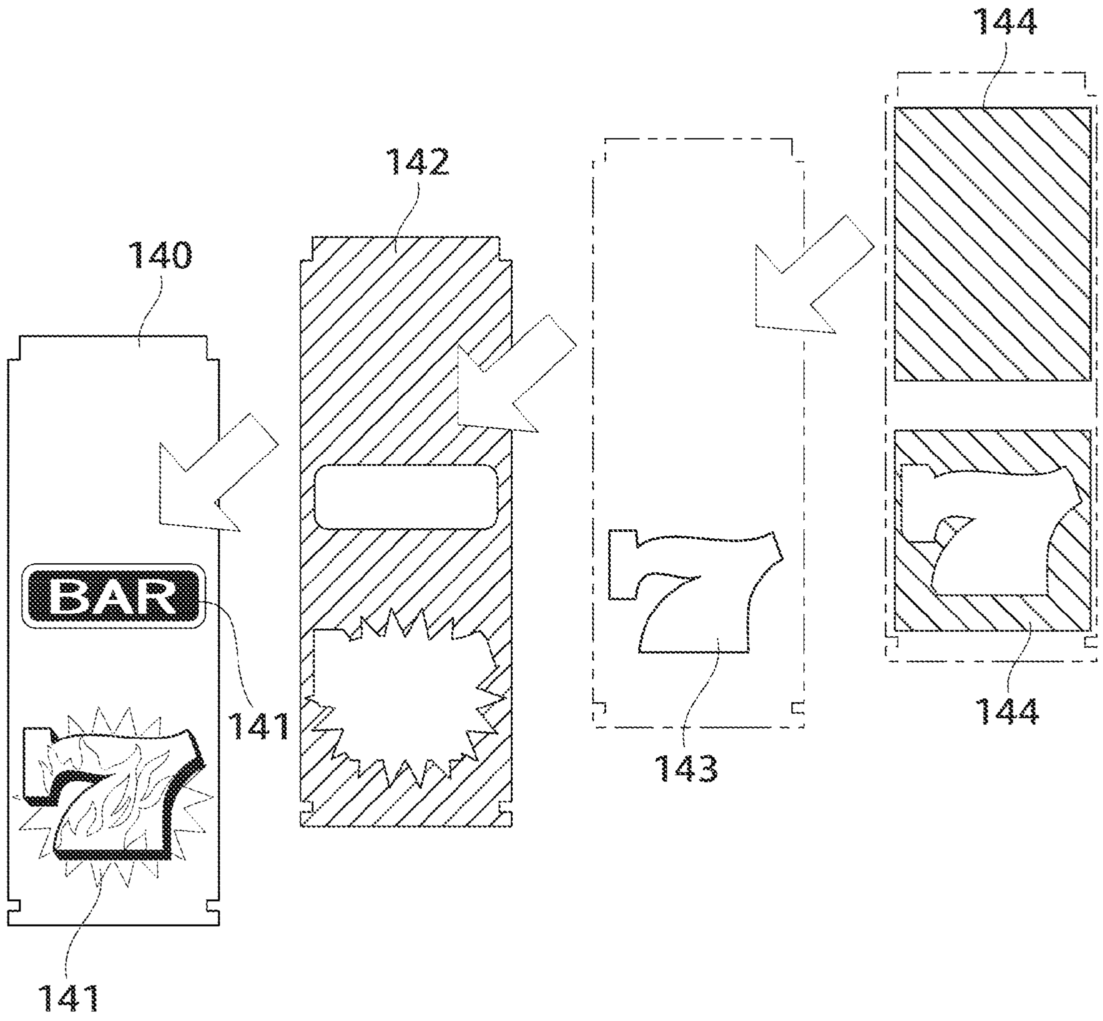
FIG. 57 shows a method of manufacturing a symbol array.

As described above, each reel 100 is provided with a plurality of symbols 501 so that a symbol array is formed. More specifically, the symbol array is formed such that symbol pictures 141 are printed on a base body 140 as shown in FIG. 57. It is noted that a hologram sheet 142 is pasted on the base body 140 to cover the parts of the base body 140 except the symbol pictures 141. On each of the specific symbols such as the "RED7", a lighting effect sheet 143 (sparkle sheet) diffusing the light emitted from the backlight unit M7 is pasted. Furthermore, a lighting effect sheet 144 (brick cube sheet) having the degree of light diffusion lower than that of the lighting effect sheet 143 is pasted to circumscribe each symbol.

(Upper Image Display Panel: Normal Screen)

Figure 58:
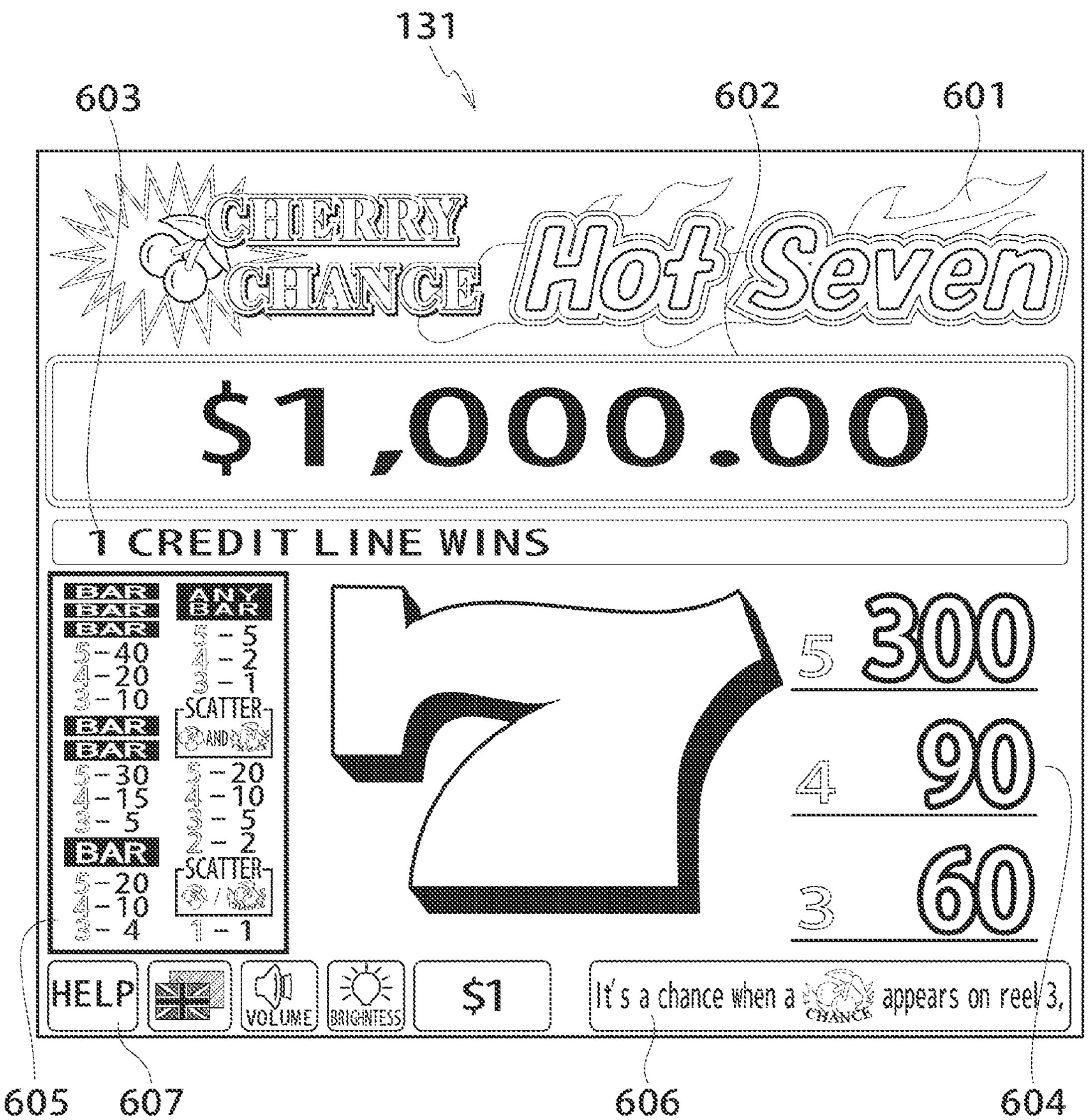
FIG. 58 shows an example of image display on the upper image display panel of the gaming machine.

The upper image display panel 131 displays a screen shown in FIG. 58. In the upper part of the screen is displayed a title image 601. In the lower part of the title image 601 is displayed a progressive jackpot amount meter 602. The progressive jackpot is switchable between ON and OFF. The progressive jackpot amount meter 602 is not displayed when the progressive jackpot is switched OFF. The maximum number of digits in the progressive jackpot amount meter 602 is "Currency Sign+99,999,999.99", and the font used when the number of digits is less than seven is different from the font used when the number of digits is seven or more. When the number of digits of the initial amount of the progressive jackpot is seven or more, the font used when the number of digits is seven or more is used from the start.

It is noted that the progressive jackpot is active in the initial state in which the RAM of the gaming machine 1 is empty. The progressive jackpot is switchable between ON or OFF by the AUDIT. The progressive jackpot may be activated only in cases of maximum betting. In the present embodiment, the progressive jackpot is awarded when five symbols of "RED7" are rearranged on a payline. When a wild symbol which is able to function as a substitute for any symbol is available, the progressive jackpot may be awarded when five wild symbols are rearranged on a payline. The value accumulated for the progressive jackpot is 0.5 percent of a bet amount. Parts of the amounts bet on games in the chance mode are also accumulated for the progressive jackpot.

In the lower part of the progressive jackpot amount meter 602 is displayed a betting state display area 603. The betting pattern is selected from "1, 2, 3, 4, 5", "1, 2, 3, 5, 10", "1, 2, 5, 10, 15", and "1, 2, 5, 10, 20". When the "1, 2, 5, 10, 20" is selected, 1 BET is made by the 1-BET button 34, 2 BETs are made by the 2-BET button 35, 5 BETs are made by the 3-BET button 36, 10 BETs are made by the 4-BET button 37, and 20 BETs are made by the 5-BET button 36. Hereinafter, 1 BET is assumed to be equivalent to 30 credits. As the betting pattern is switchable, the initial value of the progressive jackpot amount is selectable from more than one value. For example, the initial value of the progressive jackpot amount is selected from a plurality of setting values such as 250 dollars, 500 dollars, 750 dollars, and 1000 dollars, according to the betting pattern. The upper limit of the progressive jackpot amount may be set (e.g., 99,999,999.99 dollars). In the meanwhile, the progressive jackpot amount is reset to the initial value after winning the progressive jackpot.

The betting state display area 603 displays the state of betting. For example, the betting state display area 603 displays "30" when the BET is 1, and a text string "30 CREDIT LINE WINS" is formed. Similarly, "60" is displayed in case of 2 BETs, "90" is displayed in case of 3 BETs, "120" is displayed in case of 4 BETs, "150" is displayed in case of 5 BETs, "300" is displayed in case of 10 BETs, "450" is displayed in case of 15 BETs, and "600" is displayed in case of 20 BETs. In other words, image display corresponding to the betting having been made is carried out, each time the betting is made. The required number of digits is two to three.

In the lower right part of the betting state display area 603, a RED7 payout display area 604 is displayed. In the RED7 payout display area 604, payouts when 5 of a kind, 4 of a kind, and 3 of a kind of "RED7" are established, respectively, are displayed. For example, in case of 1 BET, 5 of a kind is "5000", 4 of a kind is "2000", and 3 of a kind is "1000". In other words, each time the betting is made, a value multiplied in accordance with the betting having been made is displayed. The required number of digits is four to six.

In the lower left part of the betting state display area 603 is displayed a payout display area 605 for symbols other than the RED7. The payout display area 605 for symbols other than the RED7 displays payouts when 5 of a kind, 4 of a kind, 3 of a kind of each symbol are established. In other words, each time the betting is made, a value multiplied in accordance with the betting having been made is displayed. The required number of digits is two to five.

In the lower part of the payout display area 604 is displayed a Cherry Chance information display area 606. In the Cherry Chance information display area 606, whether the chance mode has been set is displayed. When the chance mode is not set, the area displays a text string "It's a chance when a CHANCE CHERRY appears on reel 3.". When the chance mode is set, the area displays a text string "BONUS REELS PLAY 1st SPIN". In the text string, "1st" is changed to a suitable word based on how many games have been run in the chance mode.

In the lower part of the payout display area 605 for symbols other than the RED7, a HELP button image 607 is displayed. When the HELP button image 607 is touched, various types of help information are displayed in the same manner as in the case of the help button 33. The help information when the progressive jackpot is ON is arranged to be different from the help information when the progressive jackpot is OFF. For example, in regard to the values of displayed payouts, while the help information shows that the values are credits except the values concerning the progressive jackpot when the progressive jackpot is ON, the help information shows that the values are all credits when the progressive jackpot is OFF. Furthermore, regarding the 5 of a kind of "RED7", while the help information shows that the payout is determined in accordance with the progressive jackpot when the progressive jackpot is ON, the help information shows predetermined credits when the progressive jackpot is OFF. In addition to the above, the help information shows information concerning the chance mode, information concerning the paylines, information concerning payouts in cases of symbols other than "RED7", or the like.

It is noted that the language used in the upper image display panel 131 and the help information is arranged to be changeable (e.g., switchable between English and Chinese).

(Upper Image Display Panel: Normal Winning Screen)

Now, the display screen displayed on the upper image display panel 131 when a winning is achieved will be described. When a winning is achieved, the screen displayed on the upper image display panel 131 is switched to a screen shown in FIG. 59. In an upper part of the screen, obtained credit 610 is displayed. On the other hand, in a lower part of the screen, a winning detail 611 is displayed. The obtained credit 610 displays the number of credits to be awarded for the winning. Three types of fonts are stored for four, seven, and eleven digits, respectively, to indicate the number of credits. Furthermore, the winning detail 611 displays the details of winning. For example, when a progressive jackpot is obtained, a text string "PROGRESSIVE WIN=obtained credits" is displayed. When normal winning is achieved, a text string "LINE1 to 5 WIN=obtained credits" is displayed. When Cherry winning is achieved, a text string "SCATTER WIN=obtained credits" is displayed. For the respective types, three types of fonts for four, seven, and eleven digits, two types of fonts for four and eleven digits, and a single type of font for five digits are stored to indicate the number of credits. In other words, the image display is switched in accordance with the number of obtained credits. The display screen is maintained until the next game starts. When the credits are cashed out, when any one of the bet buttons is pressed, when the spin button is pressed, or a coin or the like is inserted into the gaming machine 1, the display screen disappears.

(Upper Image Display Panel: Progressive Winning Screen)

Figure 59:
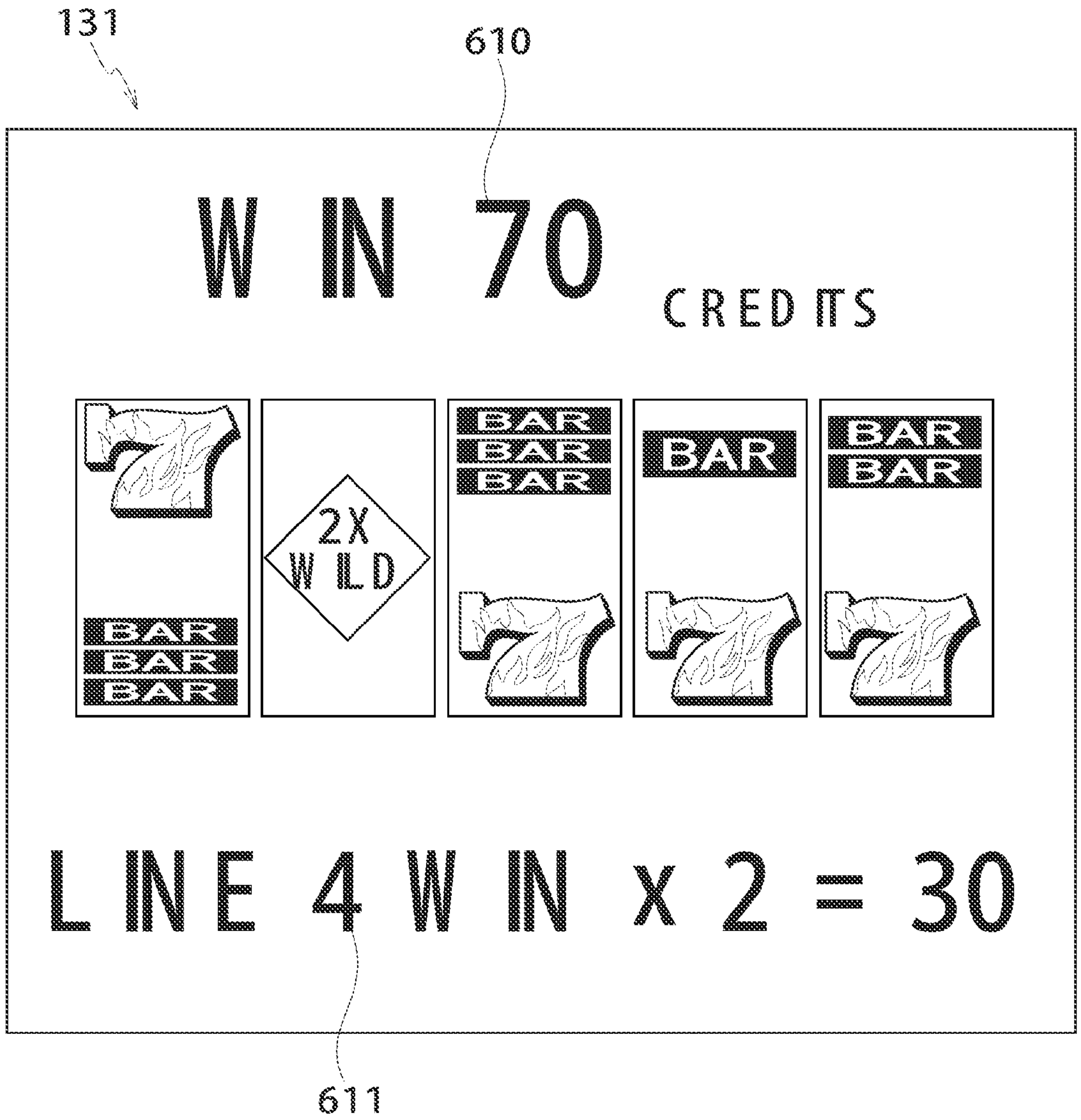
FIG. 59 shows an example of image display on the upper image display panel of the gaming machine.
Figure 60:
FIG. 60 shows an example of image display on the upper image display panel of the gaming machine.
Figure 61:
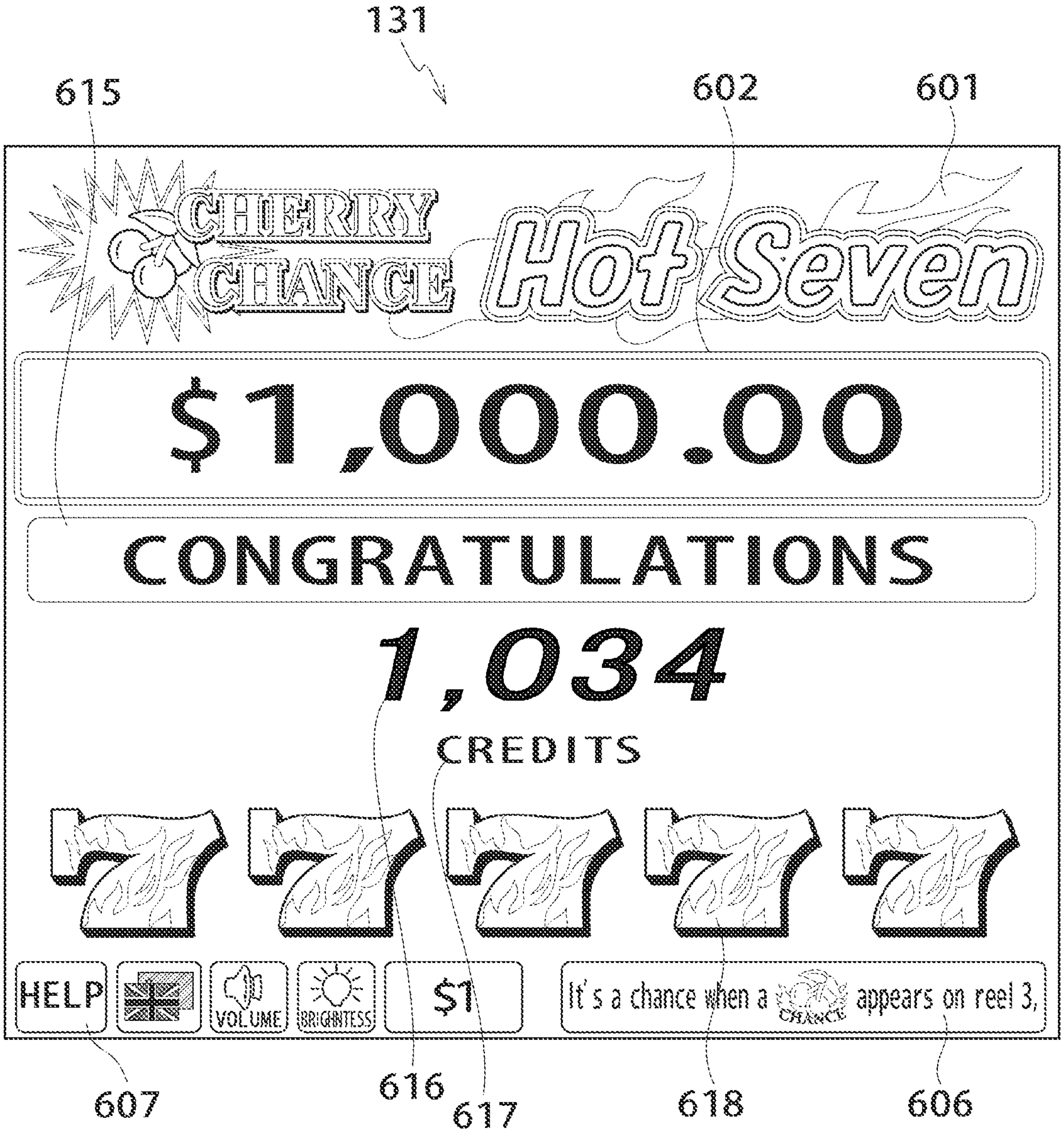
FIG. 61 shows an example of image display on the upper image display panel of the gaming machine.

When winning a progressive jackpot, the upper image display panel 131 displays screens shown in FIG. 60 and FIG. 61, before the display screen shown in FIG. 58 is shifted to the display screen shown in FIG. 59. When the reels 105 are stopped and the 5 of a kind of "RED7" is established, in the display screen shown in FIG. 58, an effect is carried out for symbols in the frame of the progressive jackpot amount meter 602. Furthermore, an effect is carried out for the "RED7" symbol displayed at the center of the display screen. Such a display screen is displayed for about three seconds. The effects cannot be skipped by operating the control panel 30 or the like.

Thereafter, the image display is shifted to a display screen shown in FIG. 60. The display screen shown in FIG. 60 shows a winning screen dedicated to the progressive jackpot on the entirety of the display screen. This display screen shows a message 612, a winning amount 613, and a 5 of a kind symbol 614. The size of the font of the winning amount 613 is identical with the size of the font used in the obtained credit 610 shown in FIG. 58. This display screen is displayed for about 10 seconds.

Thereafter, the image display is shifted to a display screen shown in FIG. 61. The display screen of FIG. 60 shows a message 615, a winning amount increment 616, a credit text 617, and a 5 of a kind symbol 618. In the winning amount increment 616, the amount awarded as a result of winning the progressive jackpot (i.e., Jackpot WIN) is displayed in an incremented manner. The display in an incremented manner is also carried out by the VFD177. The VFD177 displays the total amount owned by the player in an incremented manner. Thereafter, the image display is shifted to the display screen shown in FIG. 59. While this display screen is similar to the winning screen of non-progressive "RED7", except that the 5 of a kind symbol 618 is not displayed.

(VFD)

Figure 62:
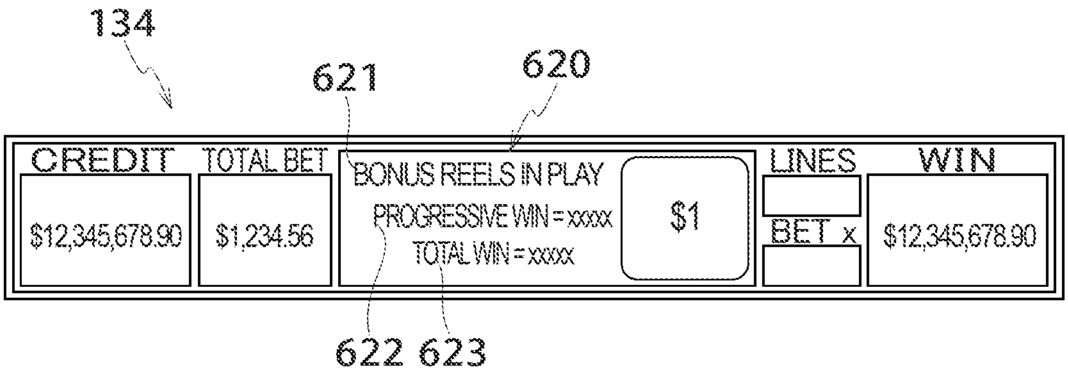
FIG. 62 shows an example of image display on a VFD of the gaming machine.

A display screen displayed on the VFD177 is shown in FIG. 62. At the center of the VFD177 is provided a game status area 620 that display the state of a game. In the game status area 620 displayed are a bonus state 621, a winning detail 622, and an obtained credit 623.

When the mode of the game is shifted to the chance mode, a text string "BONUS REELS IN PLAY" is displayed as the bonus state 621. This image display starts when the game next to a game in which the Chance Cherry symbol is rearranged starts. When winning the progressive jackpot, a text string "PROGRESSIVE WIN" is displayed as the bonus state 621. At this stage, the winning detail 622 and the obtained credit 623 are not displayed. Such image display continues while the display screen shown in FIG. 61 is displayed on the upper image display panel 131.

Thereafter, as shown in FIG. 62, the bonus state 621, the winning detail 622, and the obtained credit 623 are displayed. In the bonus state 621, a text string "BONUS REELS IN PLAY" is displayed when the chance mode is set, and the bonus state 621 is not displayed when the normal mode is set.

As the winning detail 622, a text string "PROGRESSIVE WIN=XXXXX" is displayed. When plural types of winning are achieved, the winning details 622 are alternately displayed. For example, when the progressive jackpot and the winning of one line are both achieved, the text string "PROGRESSIVE WIN=XXXXX" and a text string "LINE 1 WIN=XXXXX" are alternately displayed. Furthermore, the total sum of the credits obtained as a result of the winning is displayed in the obtained credit 623. The obtained credit 623 is continuously displayed.

When normal 3 to 5 of a kind (including the 5 of a kind of "RED7" when the progressive jackpot is OFF) is achieved, after a text string "GOOD LUCK" is displayed as the bonus state 621, the winning detail 622 displays a text string "LINE 1 WIN=XXXXX" or the like and the obtained credit 623 displays the total sum of the credits obtained as a result of the winning.

When a scattered winning with the Cherry symbol is achieved, the winning detail 622 displays a text string "SCATTER WIN=XXXXX".

(Liquid Crystal Display Device)

Now, the display states of the liquid crystal display device 134 will be described.

Figure 63:
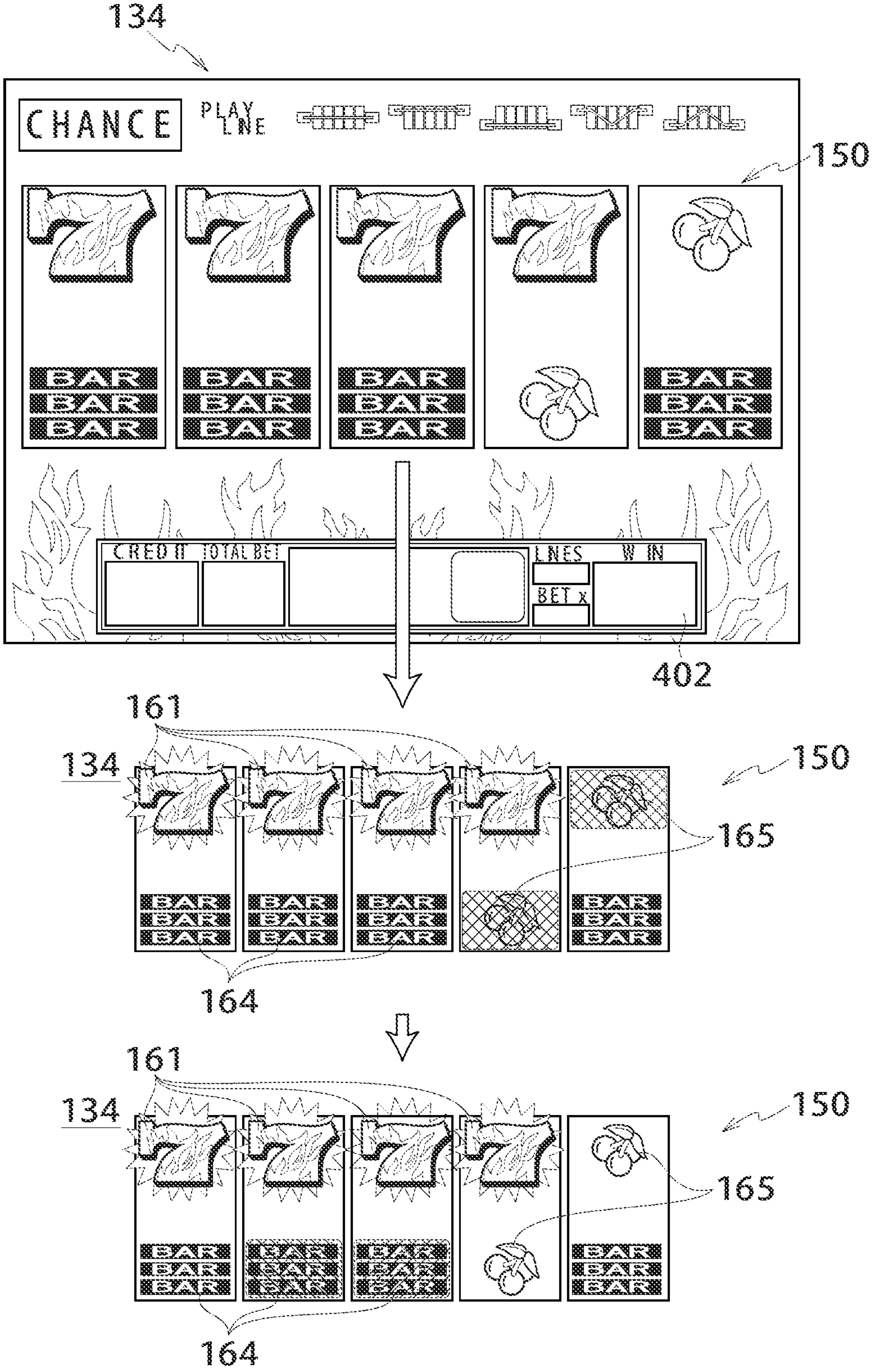
FIG. 63 shows an example of image display on a liquid crystal display device of the gaming machine.

As shown in FIG. 63, in the upper left part of the liquid crystal display device 134 is displayed a chance display section 630. The chance display section 630 flickers when the chance mode is set. When a winning is achieved, the symbol rearrangement region of a symbol related to the winning is illuminated by the backlight unit M7. For example, when 3 of a kind of a normal symbol is established, the display state is such that the symbol rearrangement regions where the symbols forming the 3 of a kind are rearranged flicker. When two Cherry symbols are rearranged, the display state is such that the symbol rearrangement regions where the two Cherry symbols are rearranged flicker. When 3 of a kind of RED7 is established, the symbol rearrangement regions where the RED7 are rearranged is illuminated by the backlight unit M7 in a flame-like manner.

Furthermore, when 3 of a kind of a normal symbol and scattered winning of the Cherry symbol are simultaneously achieved, the symbol rearrangement regions of the normal symbol and the symbol rearrangement region of the Cherry symbol alternately flicker.

For example, FIG. 63 shows a case where 3 of a kind of "TRIPLE BAR" 164 and scattered winning of Cherry symbol, and RED7 are simultaneously achieved. More specifically, in the display screen shown in FIG. 63, the "RED7" 161 are rearranged on the upper stages of the reels 101 to 104 and 4 of a kind of "RED7" is established. On the other hand, the "TRIPLE BAR" 164 is rearranged on the lower stages of the reels 101 to 103 and 3 of a kind of "TRIPLE BAR" is established. Furthermore, "CHERRY" 165 is rearranged in the lower stage of the reel 104 and the upper stage of the reel 105, and winning of "CHERRY" is established. In case of such winning, the following operations are carried out. That is to say, the symbol rearrangement regions where "RED7" 161 are rearranged continue the flickering in a flame-like manner. Furthermore, the symbol rearrangement regions where the "TRIPLE BAR" 164 forming 3 of a kind are rearranged and the symbol rearrangement region of the "CHERRY" 165 alternately flicker. It is noted that the "TRIPLE BAR" 164 rearranged in the reel 105 does not relate to the winning and does not therefore flicker as above. Furthermore, in the lower right part of the liquid crystal display device 134 is displayed a WIN meter 402. This WIN meter 402 will be detailed later.

(Demo)

When a predetermined time elapses after the credits having been inserted in the gaming machine 1 become zero and the displayed amount become zero, a demo starts. By using an unillustrated in-cabinet clock, the demo starts after a predetermined time, which is 20 seconds in the shortest to 1 minutes and 20 seconds in the longest, elapses after the condition above is satisfied. In this regard, the demo starts when the in-cabinet clock indicates "HH hour/MM minute/00 second". For example, if the condition is satisfied at 1:43:30, the demo starts at 1:44:00. When the condition is satisfied at 1:43:45, the demo starts at 1:45:00.

Effects for the demo are executed by using the LEDs of the backlight unit M7 or the like. Note that, if during the demo the insertion of a coin or the like into the gaming machine 1, the pressing of the help button 33, the touch onto the HELP button image 607, or a change in the setting of the gaming machine 1 (e.g., switching of the progressive jackpot) is performed, the demo is terminated and the idle state is recovered. In the meanwhile, the demo is not terminated when buttons for game operations such as the start button 46 and the BET buttons 34, 35, and 37 are pressed.

(Gamble Game)

In addition to the slot game above, the gaming machine 1 is able to run a gamble game. The gamble game is run after the end of a bonus game such as a chance mode game, by using credits obtained in the bonus game. The shifting to the gamble game is carried out by pressing the gamble button 45 after, for example, the end of a bonus game. It is noted that such a gamble game may not be available. When the gamble game is not available, the gaming machine 1 may not be provided with the gamble button 45.

More specifically, when the gamble game starts, two options (e.g., a card with a red heart symbol and a card with a black spade symbol) are displayed on a display device such as the liquid crystal display device 134 and the upper image display panel 131 (not illustrated). The gamble game proceeds as the player selects one of the two displayed options. In the gamble game, one of the two options is selected by pressing the 1-BET button 34 or the 2-BET button 35. The two options may be selected by means of a touch panel provided on the display device.

The gamble game may be repeatedly run more than once. How many times the gamble game is repeatedly run (e.g., 1 to 5) and the upper limit of the credits obtained in the gamble game are changeable by the AUDIT.

(Residual Gamble Game)

The gaming machine 1 is able to run a residual gamble game. The residual gamble game is run when a residual gamble game start condition such as the pressing of the cashout button 32 is established while the remaining amount of credits in the gaming machine 1 is less than a predetermined amount such as one dollar. The residual gamble game is run as the gamble button 45 is pressed after the residual gamble game start condition is established. When no gamble button 45 is provided, the residual gamble game may be run by pressing the start button 46.

More specifically, when the residual gamble game starts, information as to whether the residual gamble game with the betting of the remaining amount is run is selectably displayed on a display device such as the liquid crystal display device 134 and the upper image display panel 131 (not illustrated). In this regard, if the cashout button 32 is pressed, a game over process such as paying out the remaining amount without running the residual gamble game (ATTENDANT PAY) is carried out. On the other hand, if the gamble button 45 is pressed, the residual gamble game is run. When no gamble button 45 is provided, the residual gamble game may be run by pressing the start button 46. The operations on the screen may be carried out by using a touch panel provided on the display device.

Note that, the progress of the residual gamble game is changeable as below in accordance with the setting of the AUDIT. For example, when "GAMBLE-NONE" is set, the payout of the remaining amount by the cashout button 32 is disabled on the display screen by which whether the residual gamble game is run is selected. That is to say, whether running the residual gamble game or returning to the idle state without running the residual gamble game is determined. In the meanwhile, when "GAMBLE-ODD SUM" is set, the payout of the remaining amount by the cashout button 32 is available on the display screen.

(Structure of Control Panel)

As shown in FIG. 19, the control panel 30 is provided with buttons 31 to 38, 45, and 46 (a change button 31, a cashout button 32, a help button 33, a 1-BET button 34, a 2-BET button 35, a 3-BET button 36, a 4-BET button 37, a 5-BET button 38, a gamble button 45, and a start button 46). Each of the button 31 to 38, 45, and 46 includes a light source therein, and the state of lighting of the light source (on/off) is viewable from the outside. When a game with a high-power mode is available, a high-power button may be provided.

When the RAM of the gaming machine 1 is empty, the buttons of the control panel 30 operate as below. When the change button 31 is pressed, the light is turned on or off. Although not illustrated, the change button 31 has a text string "CHANGE" or "RESERVE". The cashout button 32 is in the off state and cannot be operated. Although not illustrated, the cashout button 32 has a text string "CASHOUT/TAKE WIN", "CASHOUT", or "COLLECT". The help button 33 is in the on state and is operable. Although not illustrated, the help button 33 has a text string "HELP" or "GAME RULES". The BET buttons 34 to 38 (1-BET button 34, 2-BET button 35, 3-BET button 36, 4-BET button 37, and 5-BET button 38) are in the off state but are operable. Although not illustrated, the BET buttons 34 to 38 have text strings "BET1", "BET2", "BET3", "BET4", and "BET5", respectively. Alternatively, the text strings on the BET buttons 34 to 38 may be switched in accordance with a preset pattern of betting. The start button 46 is in the off state and cannot be operated. Although not illustrated, the start button 46 has a text string "SPIN". When the high-power button is provided, the button is in the off state and is not operable. The high-power button preferably has a text string "HIGH POWER".

(Details of Operations of Control Panel 30: Idle State (No Credits))

When the gaming machine 1 is in the idle state with no credits, the buttons on the control panel 30 are arranged as follows. When the change button 31 is pressed, the light is turned on or off. The cashout button 32 is in the off state and cannot be operated. The help button 33 is in the on state and is operable. The BET buttons 34 to 38 are arranged to indicate the betting in the previous game and are operable. That is to say, when 1 BET is made in the previous game, the 1-BET button 34 is in the on state whereas the 2-BET button 35, the 3-BET button 36, the 4-BET button 37, and the 5-BET button 38 are in the off state. The start button 46 is in the off state and cannot be operated. The high-power button is in the off state and cannot be operated.

(Details of Operations of Control Panel 30: Idle State (with Credit))

When the gaming machine 1 is in the idle state with a credit, the buttons on the control panel 30 operate as follows. When the change button 31 is pressed, the light is turned on or off. The cashout button 32 is in the on state and is operable. The help button 33 is in the on state and is operable. The BET buttons 34 to 38 indicate the betting in the previous game and are operable. The start button 46 is in the on or off state in accordance with the remaining credits. The button is operable when turned on, and cannot be operated when turned off. That is to say, the start button 46 is turned on when the credits that the player has betted is not larger than the remaining credits. When the start button 46 in this state is pressed, a game starts in the normal mode. When the credits betted by the player is larger than the remaining credits, the start button is turned off. The gamble button 45 is in the on or off state in accordance with the remaining credits. The gamble button is operable when turned on, and cannot be operated when turned off. That is to say, the gamble button 45 is turned on when the credits betted by the player is not larger than the remaining credits. If the high-power button is pressed in this state, a game starts in the high-power mode. When the credits betted by the player is larger than the remaining credits, the gamble button 45 is turned off.

When the gaming machine 1 is in an error state, the buttons of the control panel 30 are arranged as follows. The change button 31 is in the off state and is turned on when pressed. The cashout button 32 is in the off state and cannot be operated. The buttons other than the above are in the off state and cannot be operated.

When the gaming machine 1 is in a state of having recovered from an error, the buttons on the control panel 30 are arranged as follows. The change button 31 is in the off state and cannot be operated. However, the change button 31 is turned on or off when pressed, after 120 seconds elapse from the recover. The cashout button 32 is in the on state and is operable. The help button 33 is in the on state and is operable. The BET buttons 34 to 38 indicate the betting on the previous game and are operable. The start button 46 is in the on or off state in accordance with the remaining credits. The button is operable when turned on, and cannot be operated when turned off. The high-power button is in the on or off state in accordance with the remaining credits. The button is operable when turned on, and cannot be operated when turned off.

When on the control panel 30 the start button 46 or the high-power button is continuously pressed, the buttons on the control panel 30 are arranged as follows. It is noted that it is possible to start a game in the same conditions as in the previous game when the start button 46 or the high-power button is continuously pressed.

The buttons on the control panel 30 operate in a similar manner as in cases where the reels of the gaming machine 1 are spinning as described later or where WIN increment at the time of winning in a base game is being executed. However, in the case of WIN increment, the game is not over and the next game starts if a button which is in the on state is pressed. That is to say, the WIN increment ends and the next game starts at each winning. When no winning is achieved, the next game starts.

When a feature game is waited for, the start button 46 or the high-power button must be press again.

When the gaming machine 1 is in a state in which help information is displayed as the help button 33 is pressed (i.e., a help screen is displayed), the buttons on the control panel 30 are arranged as follows. When the change button 31 is pressed, the light is turned on or off. The cashout button 32 is in the off state and cannot be operated. The help button 33 is in the on state and the help screen disappears when the button is pressed. The 1-BET button 34 is in the on state, and the help screen is switched to the previous page when the button is pressed. The 2-BET button 35 is in the on state, and the help screen is switched to the next page when the button is pressed. The start button 46 is in the on state and the help screen disappears when the button is pressed. The high-power button is in the on state and the help screen disappears when the button is pressed. The buttons other than the above are in the off state and cannot be operated.

When the gaming machine 1 is in a state of the gamble game, the buttons on the control panel 30 are arranged as follows. The change button 31 is turned on or off when pressed. The cashout button 32 is in the on state. When this button is pressed, credits are obtained and the gamble game is over. The help button 33 is in the on state and is operable. The 1-BET button 34 is in the on state. When this button is pressed, one of two options is selected and the gamble game is run. The 2-BET button 35 is in the on state. When this button is pressed, the other one of two options is selected and the gamble game is run. The start button 46 is in the on state. When this button is pressed, credits are obtained and the next game starts in the normal mode. The high-power button is in the on state. When this button is pressed, credits are obtained and the next game starts in the high-power mode.

When the gaming machine 1 is executing the residual gamble game (with the gamble game), the buttons on the control panel 30 are arranged as follows. The change button 31 is turned on or off when pressed. The cashout button 32 is in the on state when the AUDIT is set at "GAMBLE-ODD SUM". The ATTENDANT PAY is paid out when the button is pressed. When the AUDIT is set at "GAMBLE-NONE", the cashout button 32 is in the off state and cannot be operated. The start button 46 is in the off state and cannot be operated. The high-power button is in the off state and the normal screen is reinstated when the button is pressed. The gamble button 45 is in the on state, and the residual gamble game is run when pressed. The buttons other than the above are in the off state and cannot be operated.

When the gaming machine 1 is running the residual gamble game (without the gamble game), the buttons on the control panel 30 are arranged as follows. The change button 31 is turned on or off when pressed. The cashout button 32 is in the on state when the AUDIT is set at "GAMBLE-ODD SUM", and the ATTENDANT PAY is carried out when pressed. When the AUDIT is set at "GAMBLE-NONE", the cashout button 32 is in the off state and cannot be operated. The start button 46 is in the on state and the residual gamble game is run when pressed. The high-power button is in the off state and the normal screen is reinstated when pressed. The buttons other than the above are in the off state and cannot be operated.

When the gaming machine 1 is waiting for the start of the gamble game or the acquisition of credits, the buttons on the control panel 30 are arranged as follows. The change button 31 is turned on or off when pressed. The cashout button 32 is in the on state. When the button is pressed, the credits are obtained and the gamble game becomes over. The help button 33 is in the on state and is operable. The BET buttons 34 to 38 indicate the betting on the previous game and are operable. The start button 46 is in the on state. When this button is pressed, credits are obtained and the next game starts in the normal mode. The high-power button is in the on state. When this button is pressed, credits are obtained and the next game starts in the high-power mode. When the gamble button 45 is pressed a GAMBLE screen is displayed.

When the gaming machine 1 is spinning the reels, the buttons on the control panel 30 are arranged as follows. The change button 31 is turned on or off when pressed. The start button 46 is in the on state and quick stop is carried out when the button is pressed. The high-power button is in the on state and quick stop is carried out when the button is pressed. The buttons other than the above are in the off state and cannot be operated.

When the gaming machine 1 is displaying an effect screen which is cancellable, the buttons on the control panel 30 are arranged as follows. The change button 31 is turned on or off when pressed. The help button 33 is in the off state and cannot be operated. The start button 46 is in the on state and the effect is canceled when pressed. The high-power button is in the on state and the effect is canceled when pressed. The buttons other than the above are in the off state and cannot be operated.

When the gaming machine 1 is displaying WIN increment (incremental display of obtained amount) at the time of achieving a winning in a base game, the buttons on the control panel 30 are arranged as follows. The change button 31 is turned on or off when pressed. The cashout button 32 is in the on state. When the button is pressed, the WIN increment is canceled and the game becomes over. The help button 33 is in the off state and cannot be operated. The BET buttons 34 to 38 indicate the betting on the previous game. When one of these buttons is pressed, the game becomes over and the BET corresponding to the button is selected. The start button 46 is in the on state. When the button is pressed, the WIN increment is canceled, the game becomes over, and the next game starts if the remaining credits allow repeat BET. The high-power button is in the on state. When the button is pressed, the WIN increment is canceled, the game becomes over, and the next game starts if the remaining credits allow repeat BET. When the gamble game is available, the WIN increment is canceled and the GAMBLE screen is displayed when the gamble button 45 is pressed.

When the gaming machine 1 is conducting the WIN increment (incremental display of obtained amount) at the time of achieving a winning in a free game, the buttons on the control panel 30 are arranged as follows. The change button 31 is turned on or off when pressed. The cashout button 32 is in the on state. When the button is pressed, the WIN increment is canceled and the next game starts if available. When the number of remaining games is zero, a screen indicating the total obtained credits in the free game is displayed. The help button 33 is in the off state and cannot be operated. The BET buttons 34 to 38 indicate the betting on the previous game. When one of the buttons is pressed, the WIN increment is canceled and the next game starts if available. When the number of remaining games is zero, a screen indicating the total obtained credits in the free game is displayed. The start button is turned on. When the button is pressed, the WIN increment is canceled and the next game starts if available. When the number of remaining games is zero, a screen indicating the total obtained credits in the free game is displayed. The high-power button is in the on state. When the button is pressed, the WIN increment is canceled and the next game starts if available. When the number of remaining games is zero, a screen indicating the total obtained credits in the free game is displayed.

When the gaming machine 1 wins a free game and a trigger payout is incremented, the buttons on the control panel 30 are arranged as follows. The change button 31 is turned on or off when pressed. The help button 33 is in the off state and cannot be operated. The start button 46 is in the on state, and the shifting to the next step is conducted when the button is pressed. The high-power button is in the on state, and the shifting to the next step is conducted when the button is pressed. The buttons other than the above are in the off state and cannot be operated.

When the gaming machine 1 is waiting for the selection in a selection game, the buttons on the control panel 30 are arranged as follows. The change button 31 is turned on or off when pressed. The cashout button 32 is in the off state and cannot be operated. The help button 33 is in the off state and cannot be operated. Each of the BET buttons 34 to 38 is in the off state and cannot be operated if it is not associated with a selection button. Each of the BET buttons 34 to 38 is in the on state and is operable if it is associated with the selection button. The start button 46 and the high-power button are in the off state and cannot be operated.

When the gaming machine 1 is displaying a screen indicating the total obtained credits after a free game in the normal mode (i.e., increment display of the total obtained credits), the buttons on the control panel 30 are arranged as follows. The change button 31 is turned on or off when pressed. The cashout button 32 is in the off state and cannot be operated. The start button 46 and the high-power button are in the off state and cannot be operated until four seconds elapse from the display of the screen. Furthermore, the start button 46 and the high-power button are turned on after four seconds elapse from the display of the screen, and the increment is canceled when one of the buttons is pressed. The buttons other than the above are in the off state and cannot be operated.

When the gaming machine 1 is displaying a screen indicating the total obtained credits after a free game in the high-power mode (i.e., increment display of the total obtained credits), the buttons on the control panel 30 are arranged as follows. The change button 31 is turned on or off when pressed. The cashout button 32 is in the off state and cannot be operated. The start button 46 and the high-power button are in the off state and cannot be operated until two seconds elapse from the display of the screen. Furthermore, the start button 46 and the high-power button are turned on after two seconds elapse from the display of the screen, and the increment is canceled when one of the buttons is pressed. The buttons other than the above are in the off state and cannot be operated.

(Control Panel: Button Effects)

The gaming machine 1 operates as below in response to inputs to the control panel. The operations can be enabled and disabled by the AUDIT. For example, the operations are enabled or disabled in accordance with the country of shipment of the gaming machine.

In the gaming machine 1, auto re-betting (making betting identical with the betting on the previous game) is performed when a button is continuously pressed. For example, a scatter-type gaming machine may be arranged so that auto re-betting is set only when the spin button (start button) is pressed, and the pressing of the button again is requested when a feature game is waited for. Furthermore, for example, a payline-type gaming machine may be arranged so that, auto re-betting is activated by means of a repeat bet button of the touch panel or the control panel, and the pressing of the button or a start feature again is requested when the feature game is waited for.

In the gaming machine 1, furthermore, it is possible to cancel a winning effect (such as increment) and to start the next game by pressing a button. In the gaming machine 1, furthermore, it is possible to skip the rotation of the reels (quick stop) by pressing a button while the reels are rotating. In the gaming machine 1, furthermore, it is possible to antecedently input the cancellation of a winning effect by pressing a button during the bound (e.g., during an effect at reel stop).

In the gaming machine 1, furthermore, it is possible to antecedently input the cancellation of a wining effect and the start of the next game by pressing a button during the bound (e.g., during an effect at reel stop).

(Help Screen: Basic Specification)

Figure 64:
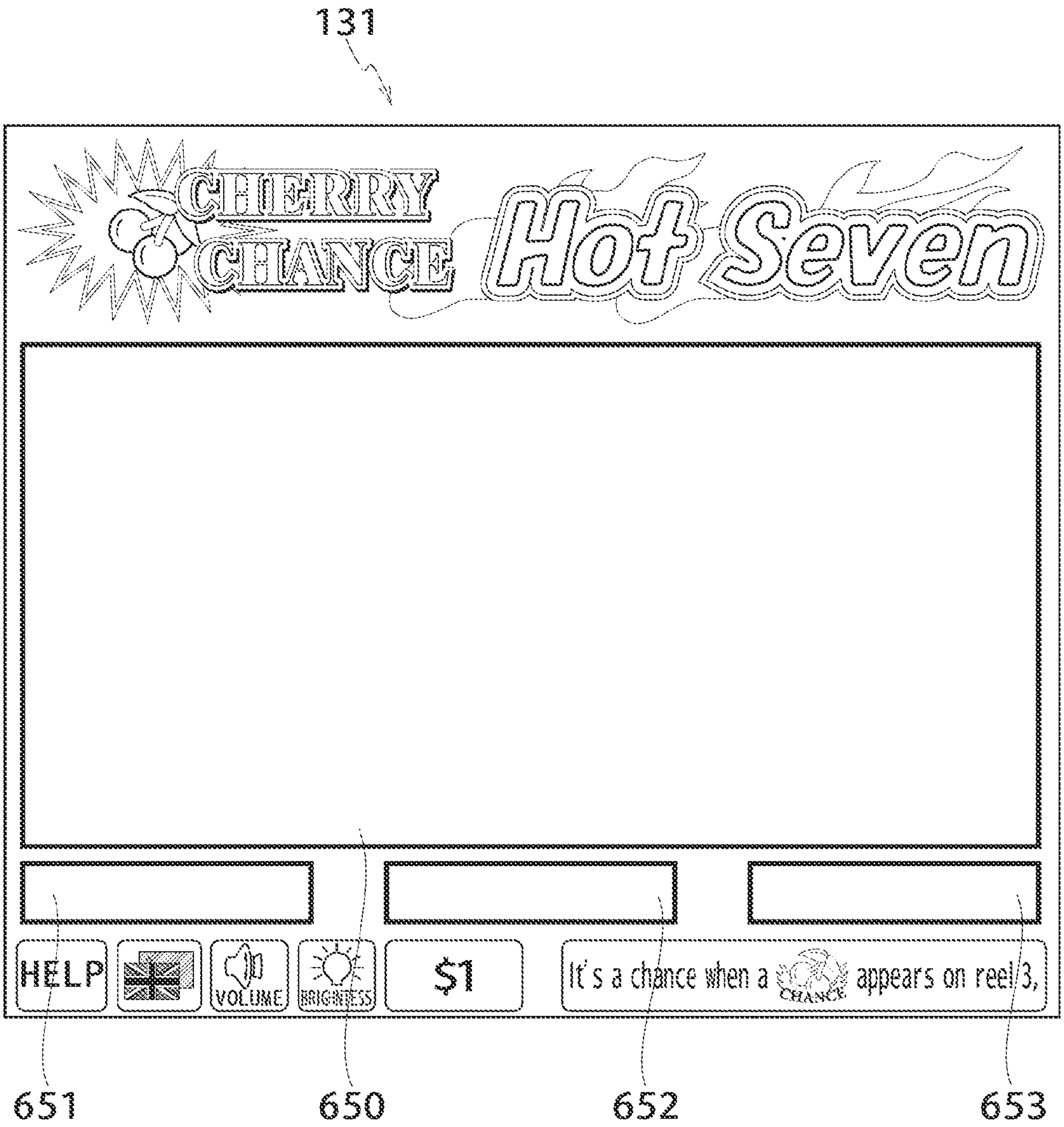
FIG. 64 shows a help screen displayed on the gaming machine.

As shown in FIG. 64, on the help screen, a help information display region 650, a help end explanation region 651, a previous page moving explanation region 652, and a next page moving explanation region 653. In the help information display region 650 is displayed help information. In the help end explanation region 651 is displayed explanation on how to end the help screen. For example, a text string "PRESS HELP TO EXIT" is displayed to explain that the help screen disappears when the help button 33 is pressed. In the previous page moving explanation region 652 is displayed an explanation on how to move to the previous page of the help information displayed on the help information display region 650. For example, a text string "PRESS BET1 FOR PREVIOUS PAGE" is displayed to explain that the previous page of the help information appears when the 1-BET button 34 is pressed. In the next page moving explanation region 653 is displayed an explanation on how to move to the next page of the help information displayed on the help information display region 650. For example, a text string "PRESS BET2 FOR NEXT PAGE" is displayed to explain that the next page of the help information appears when the 2-BET button 35 is pressed.

The explanations on the help end explanation region 651, the previous page moving explanation region 652, and the next page moving explanation region 653 are not limited to the above and displayed images may be changed in accordance with the names of the buttons. For example, when the help button 33 has a text string "GAME RULES", the help end explanation region 651 displays a text string "PRESS GAME RULES TO EXIT".

(Help Screen: Behavioral Specification)

To begin with, the operations when the help screen is displayed as the help button 33 is pressed will be described.

When the help button 33 is pressed while the gaming machine 1 is in the idle state, only the liquid crystal display device 134 displays a help screen while the upper image display panel 131 still displays the basic screen in the idle state. The basic screen in the idle state is different in each game.

When an error is occurring or during the AUDIT (i.e., the setting of the gaming machine 1 is being changed), the light source of the help button 33 is turned off so that the help screen is not displayed. Whether the help screen is displayed during a game is different in each game. The help screen is displayed from the first page.

Now, the operations while the help screen is being displayed will be described.

The second and subsequent pages of the help screen are arranged in accordance with each game. The change button 31 is turned off and becomes not operable (the turning on/off the change button 31 and the functions thereof are identical with those in the idle state). The cashout button 32 is in the off state and cannot be operated. The 1-BET button 34 (RED button) is turned on and the previous page of the help screen is displayed when pressed. The 2-BET button 34 (BLACK button) is turned on and the next page of the help screen is displayed when pressed. The help button 33 is turned on, and the help screen ends when this button is pressed, and the idle state is reinstated. The buttons other than the above are turned off and are not operable. As such, because a single button is associated with a single operation, it is possible to prevent the player from not knowing how to operate the machine.

When an error occurs or a door opens, the help screen disappears and a screen indicating that the error or the door open has occurred is displayed. When a bill or a coin is inserted while the help screen is displayed, the help screen disappears and the bill or coin is received. When a SAS bonus is inserted, the help screen disappears and the bonus is awarded. When an EFT is inserted, the help screen disappears and the EFT is received. When an AUDIT key is turned, the help screen disappears and the AUDIT is displayed. Thereafter, the idle state is reinstated when the AUDIT ends.

When power interruption occurs while the help screen is displayed, the help screen is not displayed when the power is turned on and the gaming machine becomes in the idle state. When no input is made for three minutes while the help screen is being displayed, the help screen disappears and the gaming machine becomes in the idle state. An input by a power saving key is not accepted while the help screen is being displayed. An image used for the help screen is changeable.

(Auto Play)

When a button on the control panel 30 is continuously pressed, auto play starts. The auto play is a function to continuously run games based on information of the previous game.

As the start button 46 is continuously pressed, the auto play starts with the betting on the previous game. As any of the BET buttons 34 to 38 is continuously pressed, the auto play starts with the betting amount corresponding to the at least one BET button being pressed. In case of a game in which the number of paylines to be activated is determined, the number of activated paylines is also succeeded. When more than one buttons are continuously pressed, the auto play starts based on the information of the button that is recognized first.

During the rotation of the reels in the auto play, the cashout button 32 is in the off state and cannot be operated. The cashout button 32 is turned on when a winning is achieved, and becomes operable. When the cashout button 32 is pressed, the WIN increment is skipped. When at least one credit remains in the idle state, the cash out button 32 is turned on and becomes operable.

When the pressing of the button is completed and the continuous pressing is dismissed, the auto play ends. When tilting occurs or the AUDIT is carried out, the auto play is dismissed even if a button is continuously pressed.

(Details of Display Screen: WIN Meter 402)

Figure 65:
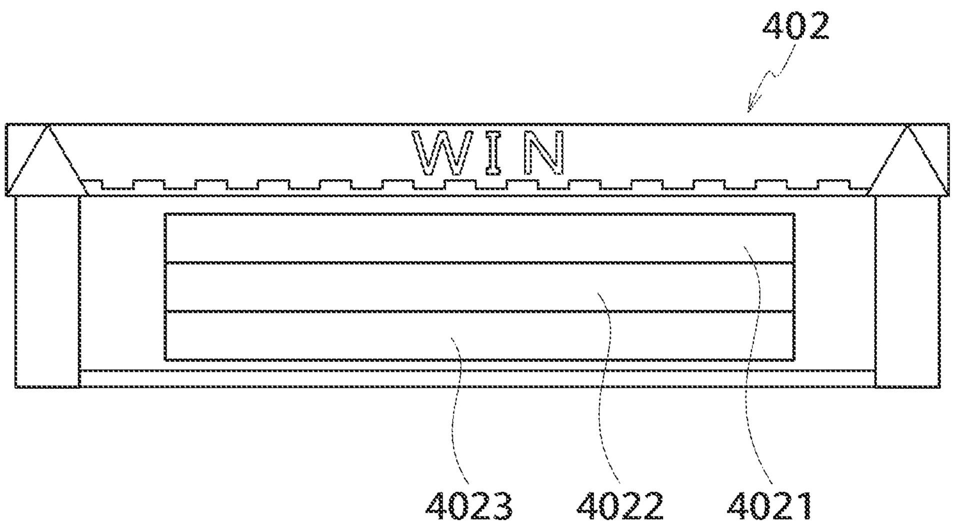
FIG. 65 illustrates a WIN meter.

The WIN meter 402 displays the WIN credit and the details thereof in a single meter, when a winning is achieved. The WIN meter 402 is, for example, displayed in the state shown in FIG. 65, and includes a WIN total amount display region 4021, a detail display region 4022, and a total display region 4023.

(Details of Display Screen: WIN Meter 402: WIN Total Amount Display Region 4021)

The WIN total amount display region 4021 displays WIN credits and amounts of money. The details of the image display will be given below. In the idle state, "0" is displayed on the WIN total amount display region 4021 as the total amount resulting from the winning immediately after the winning, and "0" is displayed in the detail display region 4022 and the total display region 4023. Furthermore, "0" is displayed when the start button 46 is pressed. Increment display is performed during the WIN increment. Furthermore, "0" is displayed during a bonus pick trigger (no winning is achieved during the trigger).

When a free game is introduced, the total amount obtained in the immediately preceding winning is displayed. During the rotation of the reels in the free game, the total amount obtained in the immediately preceding winning is displayed. Immediately after the stop of the rotation in the free game, the amount obtained in the winning in the free game is added to the total amount obtained in the immediately preceding winning and the increment display is carried out, in case immediately after the winning is achieved. In other cases, the total amount obtained in the immediately preceding winning is displayed. When a bonus is introduced, the total amount obtained in the immediately preceding winning is displayed. Immediately after the bonus, the winning achieved in the bonus or the jackpot is added to the total amount obtained in the immediately preceding winning, and the increment display is carried out.

The image display is arranged such that, the credits such as "12345678" are displayed in the upper stage, whereas the amount of money such as "$123,456.78" is displayed in the lower stage.

(Details of Display Screen: WIN Meter 402: Detail Display Region 4022)

The detail display region 4022 displays the number given to a winning line and the credits having been won after the fifth reel stops, during a base game or when a winning is achieved in a free game. When more than one line payout simultaneously occurs, the line payouts are displayed one by one at intervals of 0.5 second. The line payouts are serially displayed from the one having the smallest number, and the one having the smallest number is displayed again after the one having the largest number is displayed. The detail display region 4022 displays a text string "bonus WIN" and WIN credits in case of winning with a bonus and credit payout. Furthermore, the detail display region 4022 displays a text string "jackpot WIN" and WIN credits in case of obtaining a bonus in the jackpot.

Details of the image displays will be described below. In case of immediately after a normal winning in the idle state, the detail of the payout is displayed. When there are more than one payout, the details of the payouts are switched at intervals of 0.5 second. Nothing is displayed in other cases. Furthermore, nothing is displayed when the start button 46 is pressed. Detail of the payout is displayed during the WIN increment. When there are more than one WIN increment, the WIN increments are switched at intervals of 0.5 second. Furthermore, nothing is displayed at the time of a bonus pick trigger. Furthermore, nothing is displayed at the time of the introduction of a free game. Furthermore, nothing is displayed during the rotation of the reels in a free game. When a line winning exists immediately after the stop of the reels in a free game, the detail of the payout is displayed. When there are more than one payout, the details of the payouts are switched at intervals of 0.5 second. Nothing is displayed in other cases.

Nothing is displayed at the time of the introduction of a bonus. When a bonus (excluding jackpot) exists immediately after the end of the bonus, a bonus WIN is displayed, and a jackpot WIN is displayed when the jackpot is achieved. The bonus WIN is displayed immediately after achieving a credit payout. Nothing is displayed at the end of a bonus game (i.e., when returning to the game screen).

An example of the displayed image is "line xx WIN=12345678". This image display indicates a winning in a base game or in a free game. Another example of the displayed image is "bonus WIN=12345678". This image display indicates a winning in a bonus or a credit payout. Another example of the displayed image is "jackpot WIN=12345678". This image display indicates a winning at the time of obtaining jackpot in a bonus.

(Details of Display Screen: Win Meter 402: Total Display Region 4023)

The total display region 4023 displays the sum total of the amounts in the detail display region. Details of the image displays will be given below. The total winning is displayed in case of immediately after a normal winning in the idle state. Nothing is displayed in other cases. Nothing is displayed when the start button 46 is pressed. The total winning is displayed during the WIN increment. Nothing is displayed at the time of a bonus pick trigger. Nothing is displayed at the introduction of a free game. Nothing is displayed during the rotation of the reels in a fee game. When a line winning exists immediately after the stop of the rotation of the reels in a free game, the total winning is displayed. Nothing is displayed in other cases. Nothing is displayed at the introduction of a bonus. The total winning is displayed immediately after the end of a bonus. The total winning is displayed immediately after winning a credit payout. Nothing is displayed at the end of a bonus game (i.e., returning to the game screen). An example of the displayed image is "total WIN=12345678".

(Details of Display Screen: WIN Meter 402: Increment) (Basic Setting)

The count up is smoothly carried out upward. The control is executed in consideration of a difference between an actual amount of money (real amount of money) and an amount of money displayed at that time (displayed amount of money). The operation of the carry of a digit is done at the same time as the operation for lower digits. When a displayed amount of money is larger than a real amount of money (e.g., at the time of resetting in response to a winning), rewriting is immediately carried out.

(Details of Increment Operation)

The speed of the increment is determined in accordance with a remaining count number. When the remaining count number is increased during the operation, the speed of the increment is immediately changed to correspond to the increased remaining count number. The rewriting is performed when the remaining count number exceeds "101". More specifically, as shown in FIG. 66, the increment operation is carried out at a speed of increment (seconds) corresponding to each remaining count number.

(Details of Rewriting)

When the remaining count number exceeds "101", the rewriting is carried out with the value (remaining count number—60), and the count up is carried out based on a data table for the remaining 60 counts. For example, when the remaining count number is 110 counts, the target amount is rewritten so that 50 counts calculated by subtracting 60 from 110 are added to the target amount. At the same time as the rewriting, the remaining 60 counts are counted up. In the meanwhile, when the display amount becomes larger than the real amount due to resetting on account of progressive winning or the like, rewriting is immediately carried out. It is noted that the numbers above such as "101" and "60" are mere examples, and "101" may be any predetermined number and "60" may be any number to be subtracted.

When a progressive winning occurs, the increment is interrupted, the rewriting to the amount of money having been won is carried out, and a flickering effect starts. The flickering is not performed while the increment is being interrupted.

The speed of the increment may be controlled based on how many times an amount won by winning is larger than a bet. For example, when an amount won by winning is four times larger than a bet, the speed of the increment is set at four seconds with reference to the relationship between control thresholds and seconds defined in, for example, a data table shown in FIG. 67. Furthermore, after the speed of the increment is determined based on the data table of FIG. 67, the data table of FIG. 67 may be rewritten based on the determined value. For example, when the speed of the increment is determined to be four seconds in the case where an amount won by winning is four times larger than a bet as above, the second for the remaining count number (1 to 2) in the data table of FIG. 67 is set at four seconds, and the other remaining count numbers are changed to values calculated based on a predetermined ratio.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A slot machine comprising:

a reel unit including a plurality of mechanical reels having symbols on an outer circumferential side, a plurality of motors for driving the plurality of mechanical reels, and a backlight unit being provided on an inner circumferential side of the mechanical reels, the backlight unit being configured to execute an effect regarding the game and the reel unit being configured to display a result of a game by drivingly rotating the mechanical reels to rearrange the symbols;

a storage device configured to store a plurality of indication effect random determination tables and data for indication effects including sound data, each of the plurality of indication effect random determination tables including a plurality of effect combinations and a plurality of timings assigned to the plurality of effect combinations respectively, each of the plurality of effect combinations coupled with one or more of the indication effects and the plurality of effect combinations being associated with probabilities; and a controller by which the game starts, the controller being provided within the slot machine, the controller being programmed to execute the steps, as a result of a bet having been made, of:

(A) randomly determining the symbols to be rearranged on the reel unit;

(B) determining a combination formed by the symbols determined in the step (A);

(C) selecting an indication effect random determination table based on the combination determined in the step (B) from among the plurality of indication effect random determination tables, and randomly selecting an effect combination to be executed before the symbols are rearranged on the reel unit from among the plurality of effect combinations included in the selected indication effect random determination table; and (D) executing the effect combination selected in the step (C) at a timing assigned to the selected effect combination, wherein at least one of the plurality of effect combinations includes an indication effect for a silent effect or a delay effect, and wherein, in a case that the effect combination selected in the step (C) includes the indication effect for the silent effect or the delay effect, when at least one of the plurality of reels is stopped, the controller outputs a data containing no sound to execute the indication effect for the silent effect or the delay effect.

2. The slot machine according to claim 1, wherein the controller further outputs a data containing a reel stop sound after outputting the data containing no sound during a predetermined time to execute the indication effect for the silent effect or the delay effect.

3. A slot machine comprising:

a reel unit including a plurality of mechanical reels having symbols on an outer circumferential side, a plurality of motors for driving the plurality of mechanical reels, and a backlight unit being provided on an inner circumferential side of the mechanical reels, the backlight unit being configured to execute an effect regarding the game and the reel unit being configured to display a result of a game by drivingly rotating the mechanical reels to rearrange the symbols;

an input device used for receiving an instruction regarding the game;

a storage device configured to store a plurality of indication effect random determination tables and data for indication effects including sound data, each of the plurality of indication effect random determination tables including a plurality of effect combinations and a plurality of notification timings assigned to the plurality of effect combinations respectively, each of the plurality of effect combinations coupled with one or more of the indication effects and the plurality of effect combinations being associated with probabilities; and a controller configured to start the game based on the instruction input to the input device and award a payout when a combination of the symbols rearranged on the reel unit includes a winning combination, the controller being provided within the slot machine, the controller being programmed to execute the steps, as a result of a bet having been made, of:

(A) randomly determining the symbols to be rearranged on the reel unit;

(B) determining a combination formed by the symbols determined in the step (A);

(C) selecting an indication effect random determination table based on the combination determined in the step (B) from among the plurality of indication effect random determination tables, and randomly selecting an effect combination to be executed before the symbols are rearranged on the reel unit from among the plurality of effect combinations included in the selected indication effect random determination table; and (D) executing the effect combination selected in the step (C) at a timing assigned to the selected effect combination, wherein at least one of the plurality of effect combinations includes an indication effect for a silent effect or a delay effect, and wherein, in a case that the effect combination selected in the step (C) includes the indication effect for the silent effect or the delay effect, when at least one of the plurality of reels is stopped, the controller outputs a data containing no sound to execute the indication effect for the silent effect or the delay effect.

4. The slot machine according to claim 3, wherein the controller further outputs a data containing a reel stop sound after outputting the data containing no sound during a predetermined time to execute the indication effect for the silent effect or the delay effect.

5. A slot machine comprising:

a reel unit including a plurality of mechanical reels having symbols on an outer circumferential side, a plurality of motors for driving the plurality of mechanical reels, and a backlight unit being provided on an inner circumferential side of the mechanical reels, the backlight unit being configured to execute an effect regarding the game and the reel unit having a payline and being configured to display a result of a game by drivingly rotating the mechanical reels to rearrange the symbols in a matrix manner;

an input device used for receiving an instruction regarding the game;

a storage device configured to store a plurality of indication effect random determination tables and data for indication effects including sound data, each of the plurality of indication effect random determination tables including a plurality of effect combinations and a plurality of notification timings assigned to the plurality of effect combinations respectively, each of the plurality of effect combinations coupled with one or more of the indication effects and the plurality of effect combinations being associated with probabilities; and a controller configured to start the game based on the instruction input to the input device, and when a combination of the symbols rearranged on the reel unit is a winning combination in which a predetermined number or more of symbols of a same kind are rearranged on the payline, award a payout in accordance with the winning combination, the controller being provided within the slot machine, the controller being programmed to execute the steps, as a result of a bet having been made, of:

(A) randomly determining the symbols to be rearranged on the reel unit;

(B) determining the combination formed by the symbols formed in the step (A);

(C) selecting an indication effect random determination table based on the combination determined in the step (B) from among the plurality of indication effect random determination tables, and randomly selecting an effect combination to be executed before the symbols are rearranged on the reel unit from among the plurality of effect combinations included in the selected indication effect random determination table; and (D) executing the indication effect selected in the step (C) at a timing assigned to the selected effect combination, wherein at least one of the plurality of effect combinations includes an indication effect for a silent effect or a delay effect, and wherein, in a case that the effect combination selected in the step (C) includes the indication effect for the silent effect or the delay effect, when at least one of the plurality of reels is stopped, the controller outputs a data containing no sound to execute the indication effect for the silent effect or the delay effect.

6. The slot machine according to claim 5, wherein the controller further outputs a data containing a reel stop sound after outputting the data containing no sound during a predetermined time to execute the indication effect for the silent effect or the delay effect.

7. A slot machine comprising:

a reel unit including a plurality of mechanical reels having symbols on an outer circumferential side, a plurality of motors for driving the plurality of mechanical reels, and a backlight unit being provided on an inner circumferential side of the mechanical reels, the backlight unit being configured to execute an effect regarding the game and the reel unit being configured to display a result of a game by drivingly rotating the mechanical reels to rearrange the symbols;

a storage device configured to store a plurality of indication effect random determination tables and data for indication effects including sound data, each of the plurality of indication effect random determination tables including a plurality of effect combinations and a plurality of notification timings assigned to the plurality of effect combinations respectively, each of the plurality of effect combinations coupled with one or more of the indication effects and the plurality of effect combinations being associated with probabilities; and a controller by which the game starts, the controller being programmed to execute the steps, as a result of a bet having been made, of:

(A) randomly determining the symbols to be rearranged on the reel unit;

(B) determining a combination formed by the symbols determined in the step (A);

(C) selecting an indication effect random determination table based on the combination determined in the step (B) from among the plurality of indication effect random determination tables, and randomly selecting an effect combination to be executed before the symbols are rearranged on the reel unit from among the plurality of effect combinations included in the selected indication effect random determination table; and (D) executing the effect combination selected in the step (C) at a timing assigned to the selected effect combination, wherein at least one of the plurality of effect combination includes an indication effect for a silent effect or a delay effect, and wherein, in a case that the effect combination selected in the step (C) includes the indication effect for the silent effect or the delay effect, when at least one of the plurality of reels is stopped, the controller outputs a data containing no sound to execute the indication effect for the silent effect or the delay effect.

8. The slot machine according to claim 7, wherein the controller further outputs a data containing a reel stop sound after outputting the data containing no sound during a predetermined time to execute the indication effect for the silent effect or the delay effect.

9. A slot machine comprising:

a reel unit including a plurality of mechanical reels having symbols on an outer circumferential side, a plurality of motors for driving the plurality of mechanical reels, and a backlight unit being provided on an inner circumferential side of the mechanical reels, the backlight unit being configured to execute an effect regarding the game and the reel unit being configured to display a result of a game by drivingly rotating the mechanical reels to rearrange the symbols;

an input device used for receiving an instruction regarding the game;

a storage device configured to store a plurality of indication effect random determination tables and data for indication effects including sound data, each of the plurality of indication effect random determination tables including a plurality of effect combinations and a plurality of notification timings assigned to the plurality of effect combinations respectively, each of the plurality of effect combinations coupled with one or more of the indication effects and the plurality of effect combinations being associated with probabilities; and a controller configured to start the game based on the instruction input to the input device and award a payout when a combination of the symbols rearranged on the reel unit includes a winning combination, the controller being programmed to execute the steps, as a result of a bet having been made, of:

(A) randomly determining the symbols to be rearranged on the reel unit;

(B) determining a combination formed by the symbols determined in the step (A);

(C) selecting an indication effect random determination table based on the combination determined in the step (B) from among the plurality of indication effect random determination tables, and randomly selecting an effect combination to be executed before the symbols are rearranged on the reel unit from among the plurality of effect combinations included in the selected indication effect random determination table; and (D) executing the effect combination selected in the step (C) at a timing assigned to the selected effect combination, wherein at least one of the plurality of effect combinations includes an indication effect for a silent effect or a delay effect, and wherein, in a case that the effect combination selected in the step (C) includes the indication effect for the silent effect or the delay effect, when at least one of the plurality of reels is stopped, the controller outputs a data containing no sound to execute the indication effect for the silent effect or the delay effect.

10. The slot machine according to claim 9, wherein the controller further outputs a data containing a reel stop sound after outputting the data containing no sound during a predetermined time to execute the indication effect for the silent effect or the delay effect.

11. A slot machine comprising:

a reel unit including a plurality of mechanical reels having symbols on an outer circumferential side, a plurality of motors for driving the plurality of mechanical reels, and a backlight unit being provided on an inner circumferential side of the mechanical reels, the backlight unit being configured to execute an effect regarding the game and the reel unit having a payline and being configured to display a result of a game by drivingly rotating the mechanical reels to rearrange the symbols in a matrix manner;

an input device used for receiving an instruction regarding the game;

a storage device configured to store a plurality of indication effect random determination tables and data for indication effects including sound data, each of the plurality of indication effect random determination tables including a plurality of effect combinations and a plurality of notification timings assigned to the plurality of effect combinations respectively, each of the plurality of effect combinations coupled with one or more of the indication effects and the plurality of effect combinations being associated with probabilities; and a controller configured to start the game based on the instruction input to the input device, and when a combination of the symbols rearranged on the reel unit is a winning combination in which a predetermined number or more of symbols of a same kind are rearranged on the payline, award a payout in accordance with the winning combination, the controller being programmed to execute the steps, as a result of a bet having been made, of:

(A) randomly determining the symbols to be rearranged on the reel unit;

(B) determining the combination formed by the symbols formed in the step (A);

(C) selecting an indication effect random determination table based on the combination determined in the step (B) from among the plurality of indication effect random determination tables, and randomly selecting an effect combination to be executed before the symbols are rearranged on the reel unit from among the plurality of effect combinations included in the selected indication effect random determination table; and (D) executing the effect combination selected in the step (C) at a timing assigned to the selected effect combination, wherein at least one of the plurality of effect combinations includes an indication effect for a silent effect or a delay effect, and wherein, in a case that the effect combination selected in the step (C) includes the indication effect for the silent effect or the delay effect, when at least one of the plurality of reels is stopped, the controller outputs a data containing no sound to execute the indication effect for the silent effect or the delay effect.

12. The slot machine according to claim 11, wherein, the controller executes the sub-steps of:

in the step (B), determining whether the symbols in the payline forming the combination are all specific symbols; and in the step (C), executing the step of selecting the effect combination when all of the symbols in the payline forming the combination are the specific symbols.

13. The slot machine according to claim 11, wherein, the controller executes the sub-steps of:

in the step (B), determining whether the combination of the symbols is a combination in which the number of the specific symbols on the payline is one short of the predetermined number; and in the step (C), executing the step of selecting the effect combination when the combination of the symbols is the combination in which the number of the specific symbols on the payline is one short of the predetermined number.

14. The slot machine according to claim 11, wherein, the controller executes the sub-steps of:

in the step (B), determining whether the combination of the symbols is a combination in which all of the symbols on the payline are of a same kind different from the specific symbol and with which a payout not smaller than a first payout amount is to be awarded; and in the step (C), executing the effect combination when the combination of the symbols is the combination in which all of the symbols on the payline are of a same kind different from the specific symbol and with which a payout not smaller than a first payout amount is to be awarded.

15. The slot machine according to claim 11, wherein, the controller executes the sub-steps of:

in the step (B), determining whether the combination of the symbols is a combination with which a payout not smaller than a second payout amount is to be awarded; and in the step (C), selecting the effect combination when the combination of the symbols is the combination with which a payout not smaller than the second payout amount is to be awarded.

16. The slot machine according to claim 11, wherein the controller further outputs a data containing a reel stop sound after outputting the data containing no sound during a predetermined time to execute the indication effect for the silent effect or the delay effect.

* * * * *